United States Patent [19]

Tezuka et al.

[11] Patent Number: 6,018,769

[45] Date of Patent: *Jan. 25, 2000

[54] INTEGRATED NETWORK INSTALLATION SYSTEM

[75] Inventors: Satoru Tezuka; Satoru Matsumura, both of Yokohama; Kenichi Kihara, Fujisawa; Hiroshi Furukawa, Yokohama; Shigeru Miyake, Tokyo-to; Yousuke Tsuyuki, Kamakura, all of Japan

[73] Assignee: Hitachi, Ltd., Tokyo, Japan

[ * ] Notice: This patent is subject to a terminal disclaimer.

[21] Appl. No.: 08/895,555

[22] Filed: Jul. 16, 1997

Related U.S. Application Data

[63] Continuation of application No. 08/332,772, Nov. 1, 1994, Pat. No. 5,687,315, which is a continuation-in-part of application No. 08/046,942, Apr. 16, 1993, Pat. No. 5,845,078.

[30] Foreign Application Priority Data

| Apr. 16, 1992 | [JP] | Japan | 4-096279 |
| Jul. 21, 1992 | [JP] | Japan | 4-194195 |
| Aug. 12, 1992 | [JP] | Japan | 4-235165 |
| Oct. 22, 1992 | [JP] | Japan | 4-284175 |
| Nov. 1, 1993 | [JP] | Japan | 5-273757 |

[51] Int. Cl.[7] .......................... G06F 11/30; G06F 15/177
[52] U.S. Cl. .......................... 709/220; 709/227; 345/969
[58] Field of Search ................ 395/200.5, 652, 395/653, 200.57, 200.52, 701, 712, 828; 345/356, 357, 969; 709/200, 220, 221, 222, 224, 227, 228, 229, 249, 250; 710/10, 104; 713/1, 2, 100; 340/825.06, 825.5

[56] References Cited

U.S. PATENT DOCUMENTS

| 5,021,949 | 6/1991 | Morten et al. | 395/200.61 |
| 5,142,680 | 8/1992 | Ottman et al. | 395/712 |
| 5,155,847 | 10/1992 | Kirouac et al. | 395/200.51 |
| 5,202,985 | 4/1993 | Goyal | 707/4 |
| 5,208,912 | 5/1993 | Nakayama et al. | 395/200.35 |
| 5,226,120 | 7/1993 | Brown et al. | 395/200.54 |
| 5,247,683 | 9/1993 | Holmes et al. | 395/200.51 |
| 5,276,789 | 1/1994 | Besaw et al. | 345/440 |
| 5,280,627 | 1/1994 | Flaherty et al. | 395/652 |
| 5,295,244 | 3/1994 | Dev et al. | 345/357 |
| 5,353,432 | 10/1994 | Richek et al. | 395/500 |
| 5,367,686 | 11/1994 | Fisher et al. | 395/712 |
| 5,381,534 | 1/1995 | Shi | 395/200.33 |
| 5,394,522 | 2/1995 | Sanchez-Frank | 345/349 |
| 5,504,921 | 4/1996 | Dev et al. | 395/200.53 |
| 5,519,878 | 5/1996 | Dolin, Jr. | 395/200.5 |
| 5,615,372 | 3/1997 | Nishina | 395/653 |
| 5,619,656 | 4/1997 | Graf | 395/200.54 |
| 5,687,315 | 11/1997 | Tezuka et al. | 395/200.5 |

FOREIGN PATENT DOCUMENTS

| 3-235125 | 10/1991 | Japan | G06F 9/445 |

OTHER PUBLICATIONS

"Challenge! Personal Computer LAN", published Oct. 1991, pp. 238–244 & 308–319, by Nikkei Business Publications, Inc. no translation.

Mamram, "Maintenance of System Software on a Wide Area Network of Mainframes", IEEE, 1991, pp. 113–119.

Pau, et al., "SOFTM: A Software Maintenance Expert System in Prolog", IEEE, 1988, pp. 306–311.

Flavin, et al., "Management of Distributed Applications in Large Networks", IEEE, 1988, pp. 232–241.

Primary Examiner—John A. Follansbee
Attorney, Agent, or Firm—Antonelli, Terry, Stout & Kraus, LLP

[57] ABSTRACT

An integrated network installation system which comprises an execution section having function specification means for specifying a network function of an information processor connected to a network, and preparation means for preparing installation data corresponding to the network function of the information processor specified by the specification means and a display section for connecting the information processor to the network based on the installation data from the execution section, and displaying it.

7 Claims, 52 Drawing Sheets

- CLIENT ON/OFF BUTTON — 510
- FILE SERVER ON/OFF BUTTON — 520
- CLIENT SETTING BUTTON — 540
- FILE SERVER SETTING BUTTON — 550
- PRINT SERVER SETTING BUTTON — 560
- COMPUTER NAME FIELD — 570
- PRINT SERVER ON/OFF BUTTON — 530

— PRINTER NAME FIELD — 610

— PRINTER NAME FIELD — 610
EJECT BUTTON — 630

FIG.49

| | | | | | | | | |
|---|---|---|---|---|---|---|---|---|
| 4910 — NETWORK CONFIGURATION LIST (1/1)    PERSON IN CHARGE: ___ — 4920 ||||||||||
| 4930 — NETWORK NAME: ___ ||||||||||
| 4931 — IPX NETWORK NUMBER: ___   FRAME TYPE: ___ — 4932 ||||||||||
| 4933 — NETWARE VERSION: ___   EIN VERSION: ___ — 4934 ||||||||||
| 4935 — NO. OF PERSONAL COMPUTERS: ___ NO. OF PRINTERS: ___ — 4936 ||||||||||
| 4937 — NO. OF FILE SERVERS: ___ NO. OF CLIENTS: ___ NO. OF PRINT SERVERS: ___ — 4939 ||||||||||

4940 — FILE SERVER INFORMATION LIST — 4938

| No. | FILE SERVER NAME | PERSONAL COMPUTER MODEL | LAN BOARD NAME | PRINT SERVER NAME |
|---|---|---|---|---|
| 01 | 4941 | 4942 | 4943 | 4944 |

4950 — FILE SERVER DISK INFORMATION LIST

| No. | HD BOARD NAME | HD1CAPACITY | HD2CAPACITY | HD3CAPACITY | HD4CAPACITY | HD5CAPACITY | HD6CAPACITY | HD7CAPACITY |
|---|---|---|---|---|---|---|---|---|
| 01 | 4951 | 4952 | 4953 | 4954 | 4955 | 4956 | 4957 | 4958 |

4960 — CLIENT INFORMATION LIST

| No. | CLIENT NAME | PERSONAL COMPUTER MODEL | LAN BOARD NAME | PRINT SERVER NAME |
|---|---|---|---|---|
| 01 | | | | |
| 02 | 4961 | 4962 | 4963 | 4964 |

4970 — PRINT SERVER INFORMATION LIST

| No. | PRINTSERVER NAME | SUPPORT PRINTER NAME | PRINTER MODEL | CONNECTED PERSONAL COMPUTER MODEL |
|---|---|---|---|---|
| 01 | 4971 | 4972 | 4973 | 4974 |

5010 — FILE SERVER WORK SHEET (1/2)    PERSON IN CHARGE: ____ — 5020
5030 — NETWORK NAME: ____5036____ 5033____
5031 — FILE SERVER NAME: ____
5032 — MODEL NAME: ____ NETWARE VERSION: ____ EIN VERSION: ____ — 5034
5035 — IPX NETWORK NUMBER: ____ BOOT DRIVE: __ NO. OF HD BOARDS: __ NO. OF LANBOARDS: __ — 5038
5040 — HD BOARD 01 INFORMATION     5037

| HD BOARD NO. | DRIVER TYPE | GENERAL NAME OF BOARD | INTERRUPT LEVEL | DMA CHANNEL | I/O PORT ADDRESS | SLOT NO. | COMMON MEMORY ADDRESS | NO. OF CONNECTED HDS. |
|---|---|---|---|---|---|---|---|---|
| 01 | | | | | | | | |

5041  5042  5043  5044  5045  5046  5047  5048

5050 — HD BOARD 01: HD INFORMATION

| HD NUMBER | 01 | 02 | 03 | 04 | 05 | 06 | 07 |
|---|---|---|---|---|---|---|---|
| 5051 — DISK CAPACITY | | | | | | | |

5060 — HD01 PARTITION INFORMATION       5065 — HD02 PARTITION INFORMATION

| | PARTITION NUMBER | |
|---|---|---|
| | 01 | 02 |
| 5061 — DISK CAPACITY | | |
| 5062 — USED OS | | |

| | PARTITION NUMBER | |
|---|---|---|
| | 01 | 02 |
| 5066 — DISK CAPACITY | | |
| 5067 — USED OS | | |

5070 — HD03 PARTITION INFORMATION       5075 — HD04 PARTITION INFORMATION

| | PARTITION NUMBER | |
|---|---|---|
| | 01 | 02 |
| 5071 — DISK CAPACITY | | |
| 5072 — USED OS | | |

| | PARTITION NUMBER | |
|---|---|---|
| | 01 | 02 |
| 5076 — DISK CAPACITY | | |
| 5077 — USED OS | | |

5080 — HD05 PARTITION INFORMATION       5085 — HD06 PARTITION INFORMATION

| | PARTITION NUMBER | |
|---|---|---|
| | 01 | 02 |
| 5081 — DISK CAPACITY | | |
| 5082 — USED OS | | |

| | PARTITION NUMBER | |
|---|---|---|
| | 01 | 02 |
| 5086 — DISK CAPACITY | | |
| 5087 — USED OS | | |

5090 — HD07 PARTITION INFORMATION

| | PARTITION NUMBER | |
|---|---|---|
| | 01 | 02 |
| 5091 — DISK CAPACITY | | |
| 5092 — USED OS | | |

5000

FILE SERVER WORK SHEET (2/2)
NETWORK NAME:
FILE SERVER NAME:
PERSON IN CHARGE: _____ ~5120

LAN BOARD: HARDWARE SETUP INFORMATION

| LAN BOARD NO. | DRIVER TYPE | GENERAL NAME OF BOARD | INTERRUPT LEVEL | DMA CHANNEL | I/O PORT ADDRESS | SLOT NO. | COMMON MEMORY ADDRESS | CABLE TYPE. |
|---|---|---|---|---|---|---|---|---|
| 01 | | | | | | | | |
| | 5141 | 5142 | 5143 | 5144 | 5145 | 5146 | 5147 | 5148 |

LAN BOARD: SOFTWARE SETUP INFORMATION

| LAN BOARD NO. | BOARD NAME | NETWORK NO. | NODE ADDRESS | FRAME TYPE | NO. OF PACKET TRANSFER RETRIES |
|---|---|---|---|---|---|
| 01 | | | | | |
| | 5151 | 5152 | 5153 | 5154 | 5155 |

LAN BOARD: TOKEN RING SETUP INFORMATION

| LAN BOARD NO. | LINK STATION NO. | STATION NO. | NO. OF TRANSFER BUFFERS | TRANSFER BUFFER CAPACITY |
|---|---|---|---|---|
| 01 | | | | |
| | 5161 | 5162 | 5163 | 5164 |

CLIENT WORK SHEET (1/1)　　　PERSON IN CHARGE: ~5220
NETWORK NAME: _____
CLIENT NAME: _____　5233
MODEL NAME: _____ NETWARE VERSION: _____ ~5234
BOOT DRIVE: _____ OS TYPE: _____ EIN VERSION: _____ ~5237
　　　　　　　　　　　　EXPANDED MEMORY: _____
　　　　　　　　　　　　5236

LAN BOARD:HARDWARE SETUP INFORMATION

| LAN BOARD NO. | DRIVER TYPE | GENERAL NAME OF BOARD | INTERRUPT LEVEL | DMA CHANNEL | I/O PORT ADDRESS | SLOT NO. | COMMON MEMORY ADDRESS | CABLE TYPE. |
|---|---|---|---|---|---|---|---|---|
| 01 | | | | | | | | |
| | 5241 | 5242 | 5243 | 5244 | 5245 | 5246 | 5247 | 5248 | 5249 |

LAN BOARD:SOFTWARE SETUP INFORMATION

| LAN BOARD NO. | NODE ADDRESS | FRAME TYPE |
|---|---|---|
| 01 | | |
| | 5251 | 5252 |

| | | | |
|---|---|---|---|
| 5310 — PRINT SERVER WORK SHEET (1/4) | | PERSON IN CHARGE: ____ — 5320 | |
| 5330 — NETWORK NAME: ____ | | | |
| 5331 — PRINT SERVER NAME: ____ | | | |
| 5332 — NETWARE VERSION: ____ | | EIN VERSION: ____ — 5333 | |
| 5334 — PASSWORD: ____ | | | |
| 5335 — PRINT SERVER OPERATOR: ____ | | | |
| 5336 — PRINT SERVER USER: ____ | | | |

5340 — PRINTER INFORMATION

| PRINTER NO. | PRINTER NAME. | PRINTER MODEL NAME | IDENTIFIER FOR EACH MANUFACTURER |
|---|---|---|---|
| 01 | | | |
| 02 | 5341 | 5342 | 5343 |
| 03 | | | |
| 15 | | | |
| 16 | | | |

5350 — PRINTER:NETWORK CONNECTION INFORMATION

| PRINTER NO. | CONNECTION MACHINE NAME | CONNECTION FORM | CONNECTION PORT | PORT NO. | INTERRUPT LEVEL | BUFFER SIZE |
|---|---|---|---|---|---|---|
| 01 | | | | | | |
| 02 | 5351 | 5352 | 5353 | 5354 | 5355 | 5356 |
| 03 | | | | | | |
| 15 | | | | | | |
| 16 | | | | | | |

| 5410 | PRINT SERVER WORK SHEET (2/4) | PERSON IN CHARGE: | 5420 |

5430 — NETWORK NAME:
5431 — PRINT SERVER NAME:

5440 — PRINTER: NET PORT INFORMATION

| PRINTER NO. | NET PORT NAME. | NET PORT ID |
|---|---|---|
| 01 | | |
| 02 | 5441 | 5442 |
| 03 | | |
| 15 | | |
| 16 | | |

5450 — PRINTER: SERIAL SETUP INFORMATION

| PRINTER NO. | TRANSMISSION SPEED (BPS) | DATA BIT LENGTH (BITS) | STOP BIT LENGTH (BITS) | PARITY | X-ON/X-OFF CONTROL |
|---|---|---|---|---|---|
| 01 | | | | | |
| 02 | 5451 | 5452 | 5453 | 5454 | 5455 |
| 03 | | | | | |
| 15 | | | | | |
| 16 | | | | | |

| PRINTER NO. | PRINT JOB ENVIRONMENT INFORMATION | CODE CONVERSION | PRINT PAPER | USER SPECIFICATION PAPER NO. |
|---|---|---|---|---|
| 01 | | | | |
| 02 | 5541 | 5542 | 5543 | 5544 |
| 03 | | | | |
| 15 | | | | |
| 16 | | | | |

5510 — PRINT SERVER WORK SHEET (3/4)  PERSON IN CHARGE: ____ — 5520
5530 — NETWORK NAME: ____
5531 — PRINT SERVER NAME: ____
5540 — PRINTER: PRINT JOB ENVIRONMENT INFORMATION
5500

FIG.56

| 5610 | PRINT SERVER WORK SHEET (4/4) | PERSON IN CHARGE: | 5620 |
| 5630 | NETWORK NAME: | | |
| 5631 | PRINT SERVER NAME: | | |

5640 — PRINTER: PRINT QUEUE INFORMATION 1

| PRINTER NO. | PRINT QUEUE NAME | PRINT QUEUE PRIORITY | PRINT QUEUE SERVICE MODE |
|---|---|---|---|
| 01 | | | |
| 02 | 5641 | 5642 | 5643 |
| 03 | | | |
| 15 | | | |
| 16 | | | |

5650 — PRINTER: PRINT QUEUE INFORMATION 2

| PRINTER NO. | PRINT QUEUE OPERATOR | PRINT QUEUE USER |
|---|---|---|
| 01 | | |
| 02 | 5651 | 5652 |
| 03 | | |
| 15 | | |
| 16 | | |

TABLE SCSI DEVICES

| No. | PARAMETER NAME | PARAMETER CONTENTS | REMARKS |
|---|---|---|---|
| 1 | HDType | DEVICE DRIVER NAME | |
| 2 | HDTypeSV | DEVICE DRIVER NAME | |
| 3 | HDInt | IRQ | |
| 4 | HDDMA | DMA Channel # | |
| 5 | HDPort | I/O Port | |
| 6 | HDSlot | Slot # | |
| 7 | HDMem | COMMON MEMORY | |
| 8 | HDDrvLabel | DRIVER DISK NAME | |
| 9 | HDTypeName | GENERAL NAME OF BOARD | MANUFACTURER NAME + MODEL NUMBER |
| 10 | HDDrvPath | DRIVER FULL PATH INFORMATION | |
| 11 | HDDrvName | DRIVER VOLUME NAME | |

TABLE DISK DEVICE (GENERAL STORAGE)

| No. | PARAMETER NAME | PARAMETER CONTENTS | REMARKS |
|---|---|---|---|
| 1 | HDCapacity | ALL DISK CAPACITY | |

FIG.60

TABLE LAN DEVICES

| No. | PARAMETER NAME | PARAMETER CONTENTS | REMARKS |
|---|---|---|---|
| 1 | LANType | DEVICE DRIVER NAME | |
| 2 | LANTypeSV | DEVICE DRIVER NAME | |
| 3 | LANInt | IRQ | |
| 4 | LANDMA | DMA Channel # | |
| 5 | LANPort | I/O Port | |
| 6 | HDSlot | Slot # | |
| 7 | LANMem | COMMON MEMORY | |
| 8 | LANCable | CABLE TYPE | |
| 9 | LANFrame | FRAME TYPE | |
| 10 | LANConfNum | OPTION NUMBER | CONTAINING COMBINATION INFORMATION |
| 11 | LANDrvLabel | DRIVER VOLUME NAME | |
| 12 | LANTypeName | GENERAL NAME OF BOARD | MANUFACTURER NAME + MODEL NUMBER |
| 13 | LANDrvPath | DRIVER FULL PATH INFORMATION | |
| 14 | LANDrvName | DRIVER DISK NAME | |

FIG.61

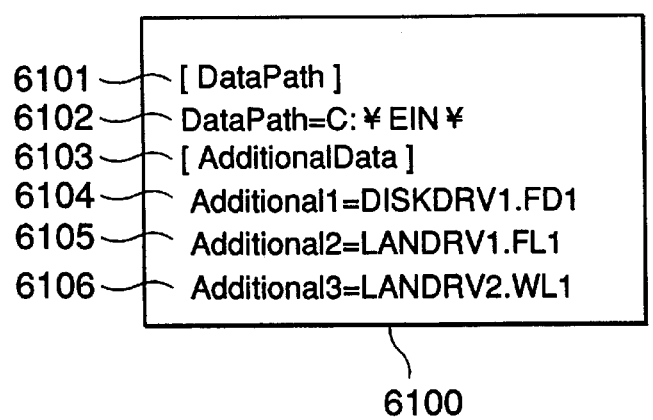

INTEGRATED NETWORK INSTALLATION SYSTEM

This application is a continuation of application Ser. No. 08/332,722, filed Nov. 1, 1994, now U.S. Pat. No. 5,687,315, which is a continuation-in-part of U.S. application Ser. No., 08/046,942 filed on Apr. 16, 1994now U.S. Pat. No. 5,845,078, the contents of which are incorporated herein by reference in their entirety.

BACKGROUND OF THE INVENTION

1. Field of the Invention

This invention relates to an integrated network installation system which aids in facilitating integrated installation of a network and more particularly to an integrated network installation system which displays a network block diagram on a display section for enabling the user to set the network configuration visually when installing a network.

2. Description of the Related Art

Hitherto, to install a network, the installation operator has needed to set parameters directly in object machines and register a network system mainly through a keyboard as a parameter input interface while referencing manuals and imaging the network configuration. Further, the installation operator must have technical knowledge to avoid duplicate setup parameters, etc.

Thus, network installation takes time and is difficult to carry out.

An example of the related art is given in "CHALLENGE! PERSONAL COMPUTER LAN," an article in the October 1991 issue of Nikkei Byte (Nikkei BP).

SUMMARY OF THE INVENTION

It is therefore an object of the invention to provide an integrated network installation system which can set installation parameters while simulating the network to be installed and more particularly to an integrated network installation system which enables the operator to set network functions of information processors connected to the network as printers, clients, or servers while visually recognizing them.

It is another object of the invention to provide an integrated network installation system appropriate for the operator to install a network while understanding it.

It is a further object of the invention to provide an integrated network installation system which can prevent duplication of or discrepancy in parameters among information processors connected to the network when network installation parameters are set.

It is another object of the invention to provide an integrated network installation system which reduces the number of operator's setting operations as much as possible when a network is installed.

To these ends, according to the invention, there is provided an integrated network installation system comprising an execution section having machine specification means for specifying a plurality of information processors to be connected to a network, means for specifying a network function of each of the information processors specified by the machine specification means, means for preparing installation data of the information processors corresponding to the machines and network functions of the information processors specified by the means, means for storing the installation data for each of the information processors prepared by the preparation means, match means for comparing the installation data of one of the information processors prepared by the preparation means with that of another and matching the installation data of the information processors, and print data preparation means for receiving the installation data of the information processors connected to the network from the storage means and preparing print data; a print section for printing setup parameters of the information processors based on the information from the execution section; and a display section for connecting the information processors to the network based on the installation data from the execution section and displaying them.

Thus, the integrated network installation system of the invention easily creates parameter files in which the types of machines connected to the network, the form of connection to the network, the functions of information processors in the network system, etc., are described by displaying a network block diagram containing the machine types, addresses, etc., on the GUI display section corresponding to the network block diagram of the actual machines connected to the network. The files are referenced at the machines for easily installing the network.

The system also displays the network functions of the information processors connected to the network in relation to the information processors.

When network installation parameters are set, the system can set the parameters among the information processors connected to the network based on the unified criterion for preventing duplication of, or discrepancy in, the setup parameters.

When the operator changes the setup parameters of some information processors connected to the network at the time of network installation, update means for appropriately changing the setup parameters of other information parameters affected by changing the parameters can be provided for reducing the number of operator's setting operations as much as possible.

Further, the installation data prepared by the execution section can be used to easily generate a network system report by the function of printing the installed network system.

BRIEF DESCRIPTION OF THE DRAWINGS

The present invention will be more apparent then the following detailed description when taking in connection with the accompanying drawings in which:

FIG. 49 is a drawing of a work sheet example of a network component list;

FIG. 50 is a drawing showing a file server work sheet example;

FIG. 51 is a drawing showing a file server work sheet example;

FIG. 52 is a drawing showing a client work sheet example;

FIG. 53 is a drawing showing a print server work sheet example;

FIG. 54 is a drawing showing a print server work sheet example;

FIG. 55 is a drawing showing a print server work sheet example;

FIG. 56 is a drawing showing a print server work sheet example;

FIG. 59 is a table which lists entries defined in a disk board information definition file;

FIG. 60 is a table which lists entries defined in a LAN board information definition file;

FIG. 61 is a drawing showing the format of a program initialization file;

DESCRIPTION OF THE PREFERRED EMBODIMENTS

Referring now to the accompanying drawings, there are shown preferred embodiments of the invention.

Figure 1:
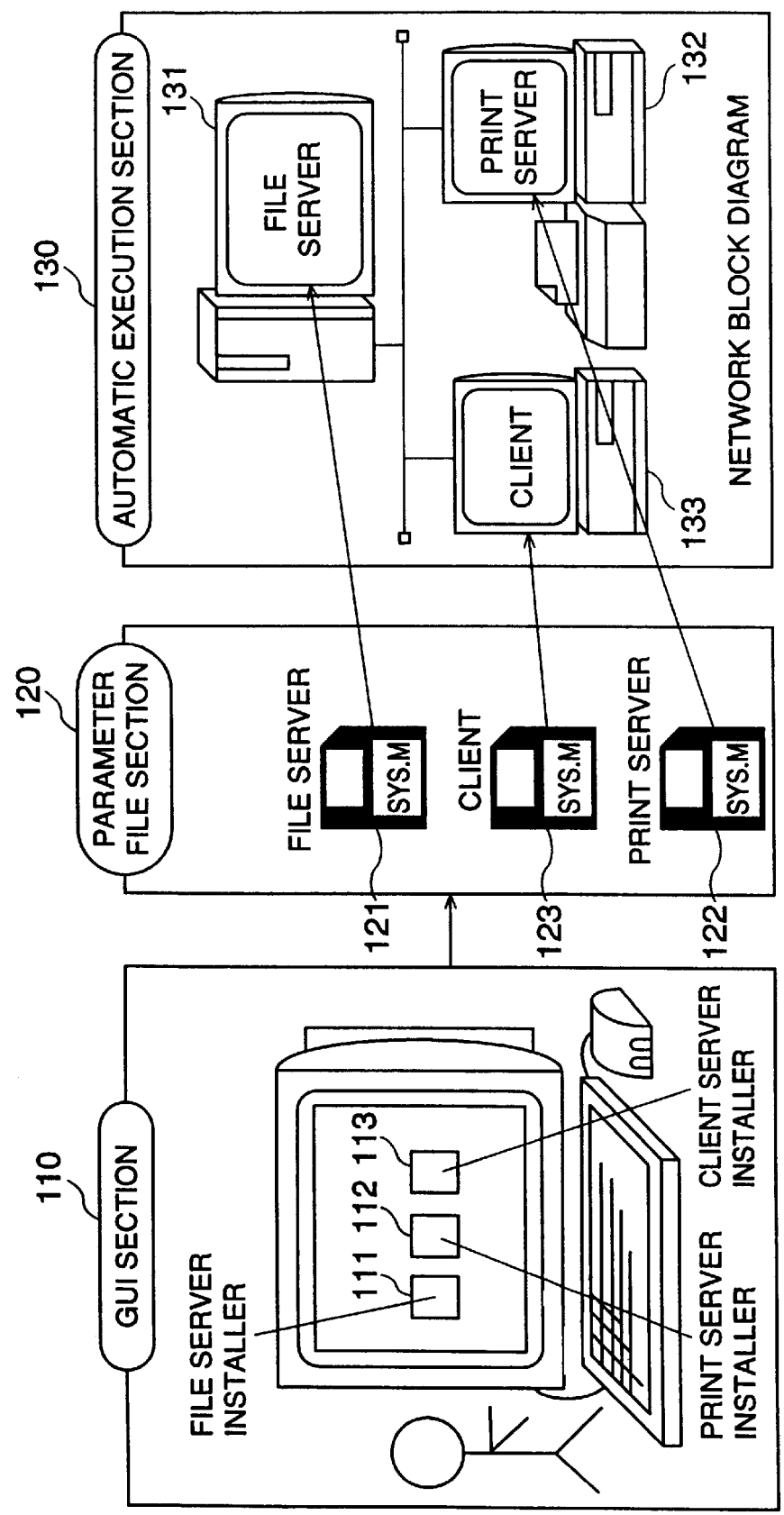
FIG. 1 is a block diagram of a network installation method on which the invention is predicated.

First, a network installation method on which the invention is predicated will be briefly described. FIG. 1 is the system configuration showing the network installation method. The configuration is made up of a GUI (graphical user interface) section 110, a parameter file section 120, and an automatic execution section 130.

The GUI section 110 consists of a file server installer GUI 111, a print server installer GUI 112, and a client installer GUI 113. The parameter file section 120 consists of a file server installer parameter file 121, a print server installer parameter file 122, and a client installer parameter file 123. The automatic execution section consists of an automatic file server execution program 131, an automatic print server execution program 132, and an automatic client execution program 133 for the network configuration.

First, the operator starts the file server installer GUI 111 and sets parameters required to install a file server according to the easy-to-use GUI, then stores the setup parameters in the file server installer parameter file 121. The file server installer parameter file 121 which stores the parameters is brought to the automatic file server execution program 131 for actual installation. The automatic file server execution program 131 installs the file server based on the setup parameters stored in the file server installer parameter file 121. Likewise, the operator uses the print server installer and the client installer to install printer servers and clients.

The invention is applied to the GUI section 110 in the configuration of such a network installation system.

Network block diagram screens will be described with reference to FIGS. 3 to 19.

Figure 3:
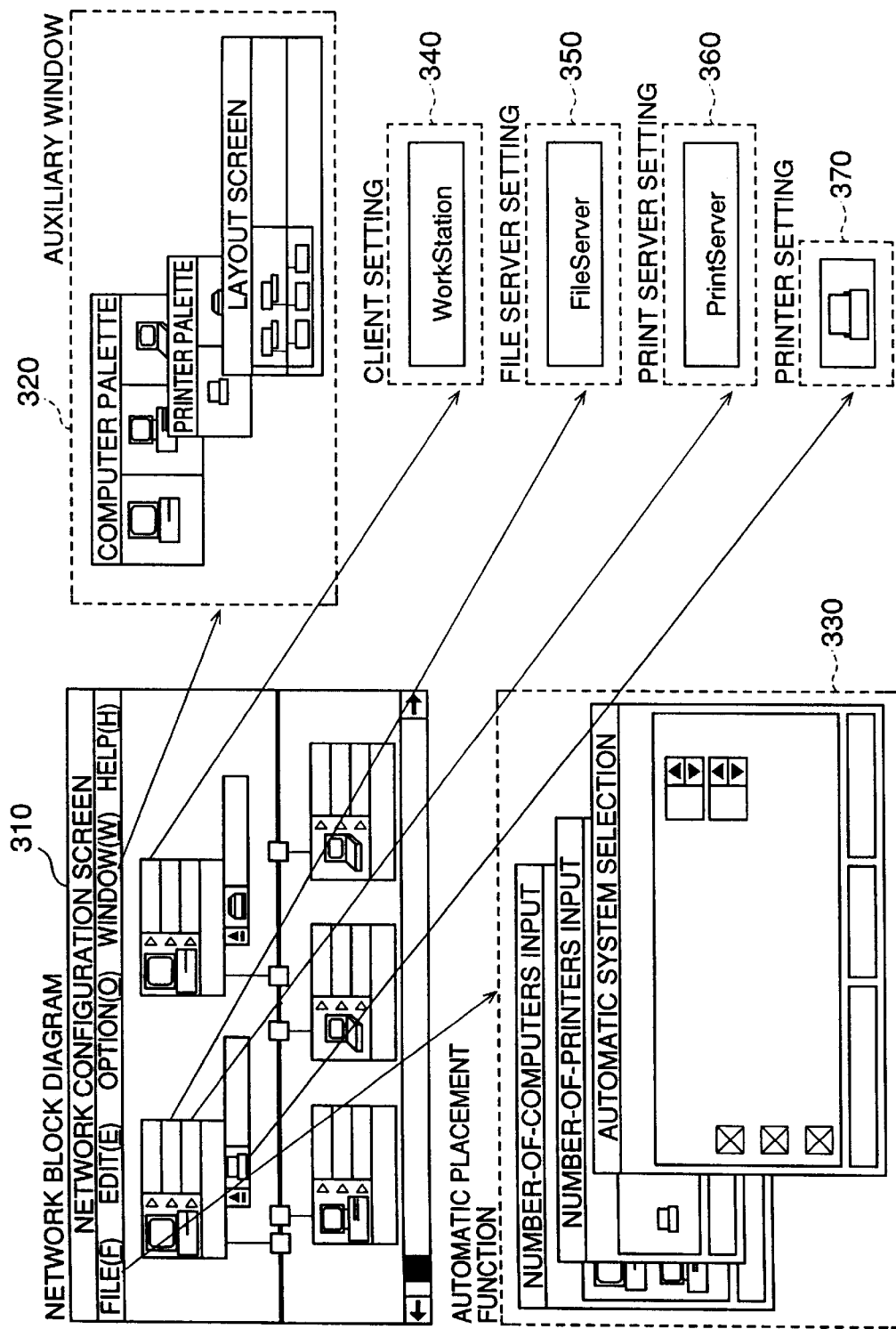
FIG. 3 is a drawing showing one embodiment of the entire configuration of a network block diagram.

FIG. 3 shows the entire configuration of the invention. Numeral 310 is a network configuration screen, numeral 320 is an auxiliary window, numeral 330 is an automatic placement function, numeral 340 is a client setting button, numeral 350 is a file server setting button, numeral 360 is a print server setting button, and numeral 370 is a printer setting button.

Figure 4:
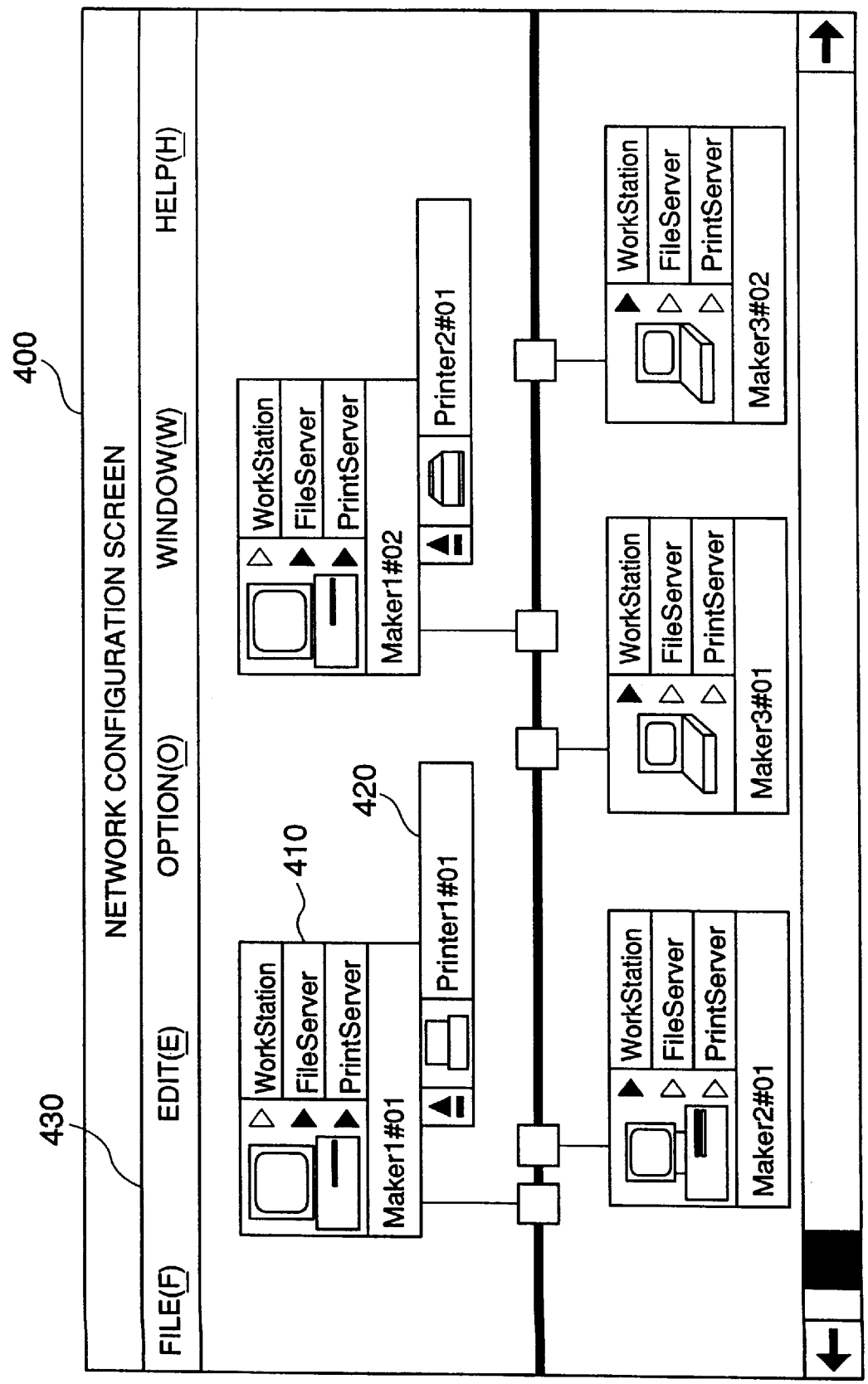
FIG. 4 is a drawing showing an example of the network block diagram.

FIG. 4 shows an example of the network configuration screen 310 in FIG. 3. Numeral 400 is a network block diagram window screen, numeral 410 is a computer plate, and numeral 420 is a printer plate. A menu 430 is placed on the window screen of the network block diagram 400. The computer plate 410 and the printer plate 420 are normally prepared from the auxiliary screen 320 in FIG. 3, but can also be selected on the menu 430 for preparation. The computer plates 410 and the printer plates 420 are displayed on the network block diagram 400, and screens for entering parameters required to install file servers, clients, and printer servers can be started on the plates. The computer plate 410 can be placed anywhere on the network block diagram. The operator moves a mouse cursor to the computer icon and presses the left button of the mouse, then moves the mouse. The computer plate 410 moves with movement of the mouse. The operator releases the left button of the mouse at the position where the computer plate 410 is to be placed. Moving the computer plate is now complete. If a printer is connected to the moved computer, the corresponding printer plate 420 also moves with movement of the computer plate 410. Likewise, the printer plates 420 can be moved.

Figure 5:
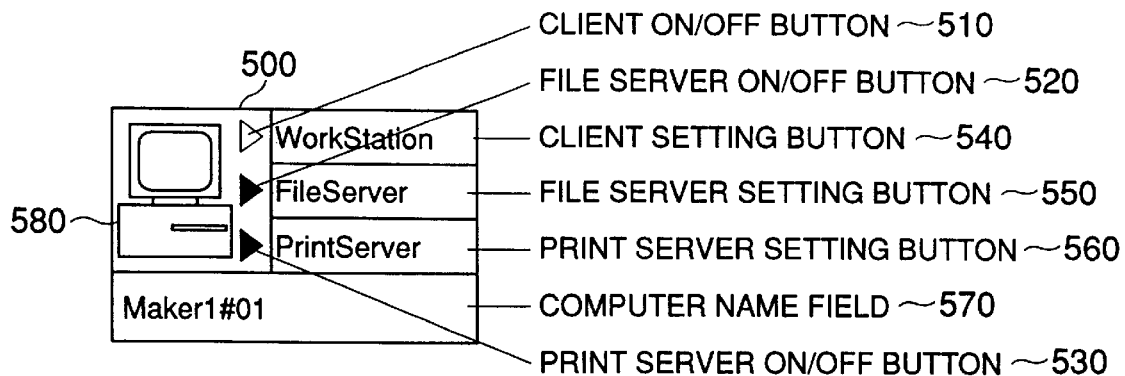
FIG. 5 is a drawing showing an example of a computer plate.

FIG. 5 shows the computer plate, wherein numeral 500 is a computer plate consisting of seven parts. Numeral 510 is a client On/Off button, numeral 520 is a file server On/Off button, numeral 530 is a printer server On/Off button, numeral 540 is a client setting button, numeral 550 is a file server setting button, numeral 560 is a print server setting button, numeral 570 is a computer name field, and numeral 580 is a computer icon.

The operator clicks on the client On/Off button 510 to determine whether or not the client function is to be installed in the computer icon 580. To install the function, the operator clicks on On; to not install the function, the operator clicks on Off. If the function cannot be installed, the button color goes black, in which case On and Off cannot be switched even if the operator clicks on the button. The button color can be used properly to indicate whether the current client is On or Off. In the embodiment, if the button color is black, it means Off; if white, it means On. The file server On/Off button 520 and the print server On/Off button 530 also function like the client On/Off button 510. However, it is desired that the buttons differ from each other in display color.

When the operator clicks on the client setting button 540, a client setting screen is opened, enabling the operator to input parameters required to install the client. The file server setting button 550 and the print server setting button 560 also function like the client setting button 540. The computer name field 570 displays the name of the computer.

Figure 6:
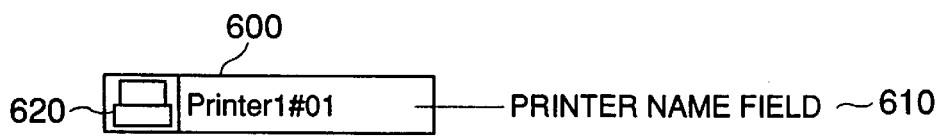
FIG. 6 is a drawing showing an example of a printer plate.
Figure 7:
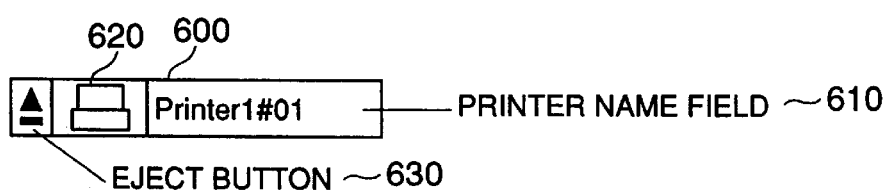
FIG. 7 is a drawing showing another example of a printer plate.

FIGS. 6 and 7 are drawings of embodiments of the printer plates, wherein numeral 600 is a printer plate, numeral 610 is a printer name field, numeral 620 is a printer icon, and numeral 630 is an eject button. The printer plate 600 may have the appearance shown in either FIG. 6 or 7. FIG. 6 is the appearance of the printer plate 600 when it is not connected to a computer plate. The printer plate 600 can be placed anywhere on the network block diagram. The operator moves a mouse cursor to the printer icon 620 and presses the left button of the mouse, then moves the mouse. The printer plate 600 moves with movement of the mouse. The operator releases the left button of the mouse at the position where the printer plate 600 is to be placed. Moving the printer plate is now complete. When the printer plate 600 is moved, if a computer plate exists at the place to which the printer plate 600 is moved, the printer plate 600 can be connected to the computer plate.

When the operator double clicks on the printer icon 620, a printer setting screen is opened, enabling the operator to set printer information required to install the print server. The printer name field 610 displays the name of the printer.

FIG. 7 shows the appearance of the printer plate 600 when it is connected to a computer plate. When the printer plate 600 is connected to a computer plate, it cannot be moved. As the computer plate to which the printer plate 600 is connected moves, the printer plate 600 also moves. The operator can click on the eject button 630 to disconnect the printer plate 600 from the computer plate.

Figure 8:
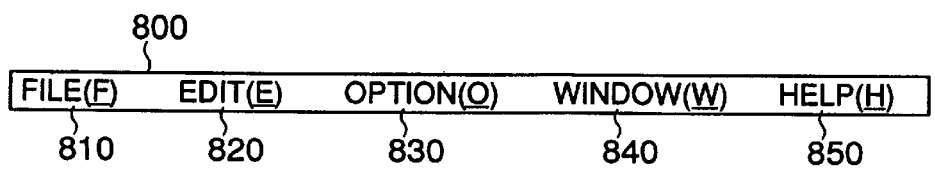
FIG. 8 is a drawing showing one embodiment of a network block diagram menu.

FIG. 8 shows a network configuration screen menu 800 consisting of entries of File (F) 810, Edit (E) 820, Option (O) 830, Window (W) 840, and Help (H) 850.

Figure 9:
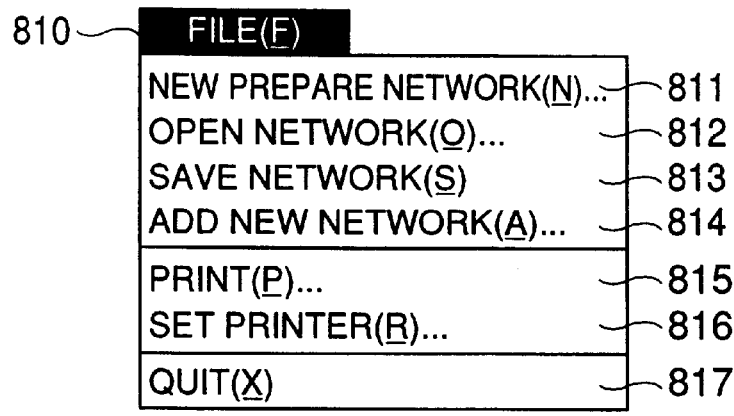
FIG. 9 is a drawing showing one embodiment of a file menu.

FIG. 9 shows File (F) 810 consisting of entries of Newly prepare network (N) 811, Open network (0) 812, Save network (S) 813, Add new network (A) 814, Print (P) 815, Set Printer (R) 816, and Quit (X) 817.

Newly prepare network (N) 811 erases the current setup state and calls the automatic placement function. Open network (0) 812 reads a network block diagram from a file. Save network (S) 813 saves the network block diagram setup contents in a file with the current network name, an identifier. Add new network (A) 814 saves the network block diagram setup contents in a file with a new network name, an identifier. Print (P) 815 is a menu entry for providing a document output function using network installation parameters for the network block diagram setup contents. The document output function using network installation parameters will be described below in detail with reference to FIGS. 46 to 56. Set printer (R) 815 sets the environment of the printer used in printing.

Figure 10:
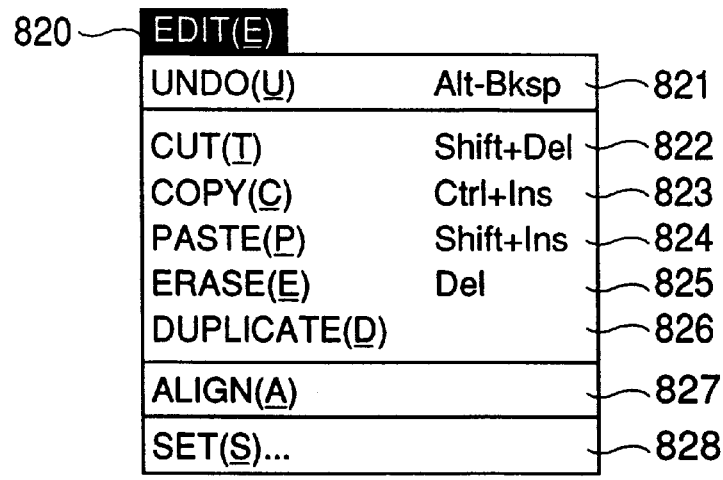
FIG. 10 is a drawing showing one embodiment of an edit menu.

FIG. 10 shows Edit (E) 820 consisting of entries of Undo (U) 821, Cut (T) 822, Copy (C) 823, Paste (P) 824, Erase (E) 825, Duplicate (D) 826, Align (A) 827, and Set (S) 828.

Undo (U) 821 cancels the immediately preceding edit operation for restoring to the state before the edit operation. Cut (T) 822 moves an object such as the currently selected computer plate or printer plate to a copy buffer of the setting machine. Copy (C) 823 copies the currently selected object into the copy buffer of the setting machine. Paste (P) 824 copies the object stored in the copy buffer of the setting machine onto the screen. Erase (E) 825 erases the currently selected object. Duplicate (D) 826 duplicates the currently selected object. Align (A) 827 automatically aligns the positions of all objects. Set (S) 828 opens a setting screen of the currently selected object.

Figure 11:
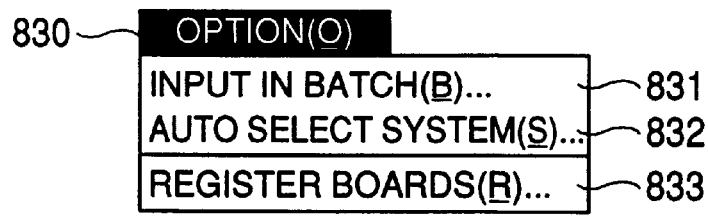
FIG. 11 is a drawing showing one embodiment of an option menu.

FIG. 11 shows Option (O) 830 consisting of entries of input in Batch (B) 831, auto Select system (S) 832, and Register boards (R) 833.

Input in Batch (B) 831 inputs the number of computer plates and printer plates to be placed in batch. Auto Select system (S) 832 automatically selects a file server, client, print server function system of the computer plates to be placed. Register boards (R) 833 is a menu entry for providing a function to newly register any network component machines such as LAN boards in the setting information of file servers, clients, print servers, etc. The new addition function of the network component machine information will be described below in detail with reference to FIGS. 57 to 65.

Figure 12:
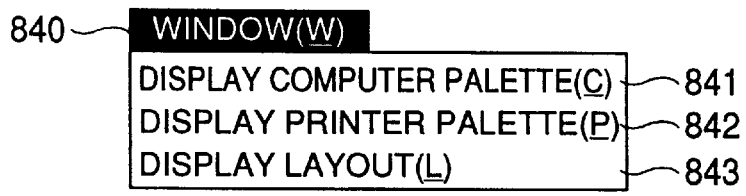
FIG. 12 is a drawing showing one embodiment of a window menu.

FIG. 12 shows Window (W) 840 consisting of entries of display Computer palette (C) 841, display Printer palette (P) 842, and display Layout (L) 843.

Display Computer palette (C) 841, display Printer palette (P) 842, and display Layout (L) 843 switch display/ nondisplay of a computer palette on which a computer plate list is placed, a printer palette on which a printer plate list is placed, and a layout window on which a network configuration screen layout is displayed, respectively.

Figure 13:
FIG. 13 is a drawing showing one embodiment of a help menu.

FIG. 13 is Help (H) 850 consisting of an entry About easy installer (A) 851 for displaying version information, etc., of the easy installer.

Figure 14:
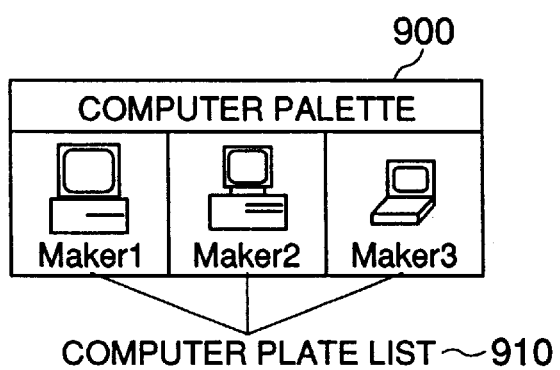
FIG. 14 is a drawing showing one embodiment of a computer palette.
Figure 15:
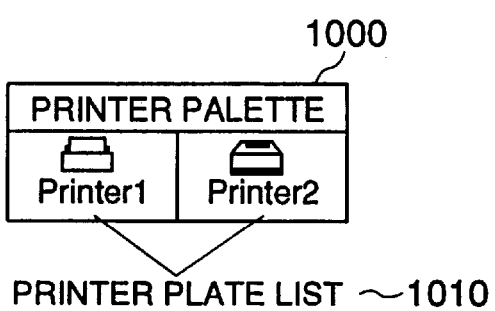
FIG. 15 is a drawing showing one embodiment of a printer palette.
Figure 16:
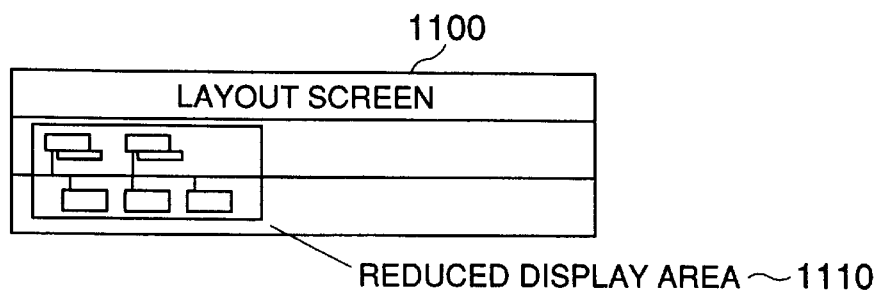
FIG. 16 is a drawing showing one embodiment of a layout screen.

The network configuration screen has three auxiliary windows of a computer palette 900 shown in FIG. 14, a printer palette 1000 shown in FIG. 15, and a layout screen 1100 shown in FIG. 16.

The computer palette 900 consists of a computer plate list 910. The operator selects one computer out of the computer plate list 900, a list of computers connected to the network, for displaying a computer plate corresponding to the computer and holds down the left button of the mouse on the displayed computer plate while moving the mouse, then releases the left button on the network configuration screen. A new computer plate is prepared on the network block diagram.

The operator can also use the printer palette 1000 like the computer palette 900 to prepare a new printer plate on the network block diagram.

The layout screen 1100 shows a reduced network block diagram; the actual display range on the network configuration screen is within a frame. If the operator presses the left button of the mouse in a reduced display area 1110, the display portion of the network block diagram moves to a region with the mouse cursor position as the center.

The automatic placement function will be described with reference to FIGS. 17 to 19.

The automatic placement function is a function to aid in preparation of a number of computer plates and printer plates when a new network configuration is prepared. It comprises a number-of-computers input screen 1200 in FIG. 17, a number-of-printers input screen 1300 in FIG. 18, and an automatic system selection screen 1400 in FIG. 19.

Figure 17:
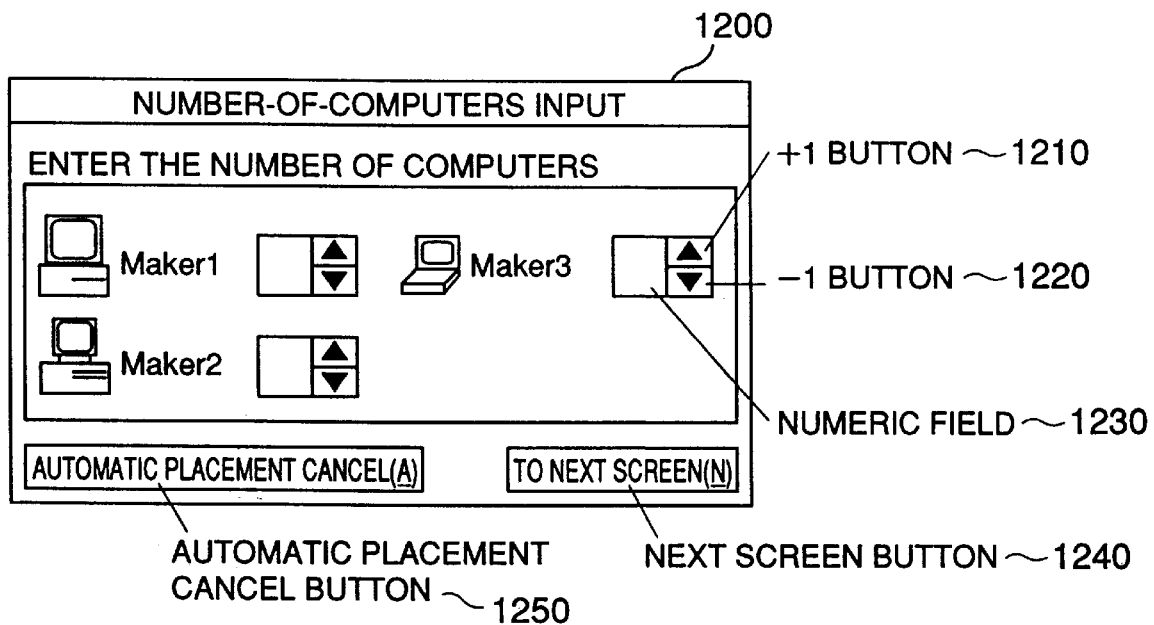
FIG. 17 is a drawing showing one embodiment of a number-of-computers input screen.

The number-of-computers input screen 1200 in FIG. 17 is a screen for inputting computer plates placed on the network block diagram for each model or maker in batch; the computer plates are automatically placed at appropriate positions so as to prevent the computer plates from overlapping each other on the network block diagram.

The operator uses a +1 button 1210 or a −1 button 1220 to set a value in a numeric field 1230 displaying the number of computers for each model. The operator can enter a value directly in the numeric field 1230 through a keyboard. When the operator clicks on a next screen button 1240, the number-of-computers input screen 1200 is terminated and the number-of-printers input screen 1300 is opened. When the operator clicks on an automatic placement cancel button 1250, the number-of-computers input screen 1200 is closed and control returns to the network configuration screen.

Figure 18:
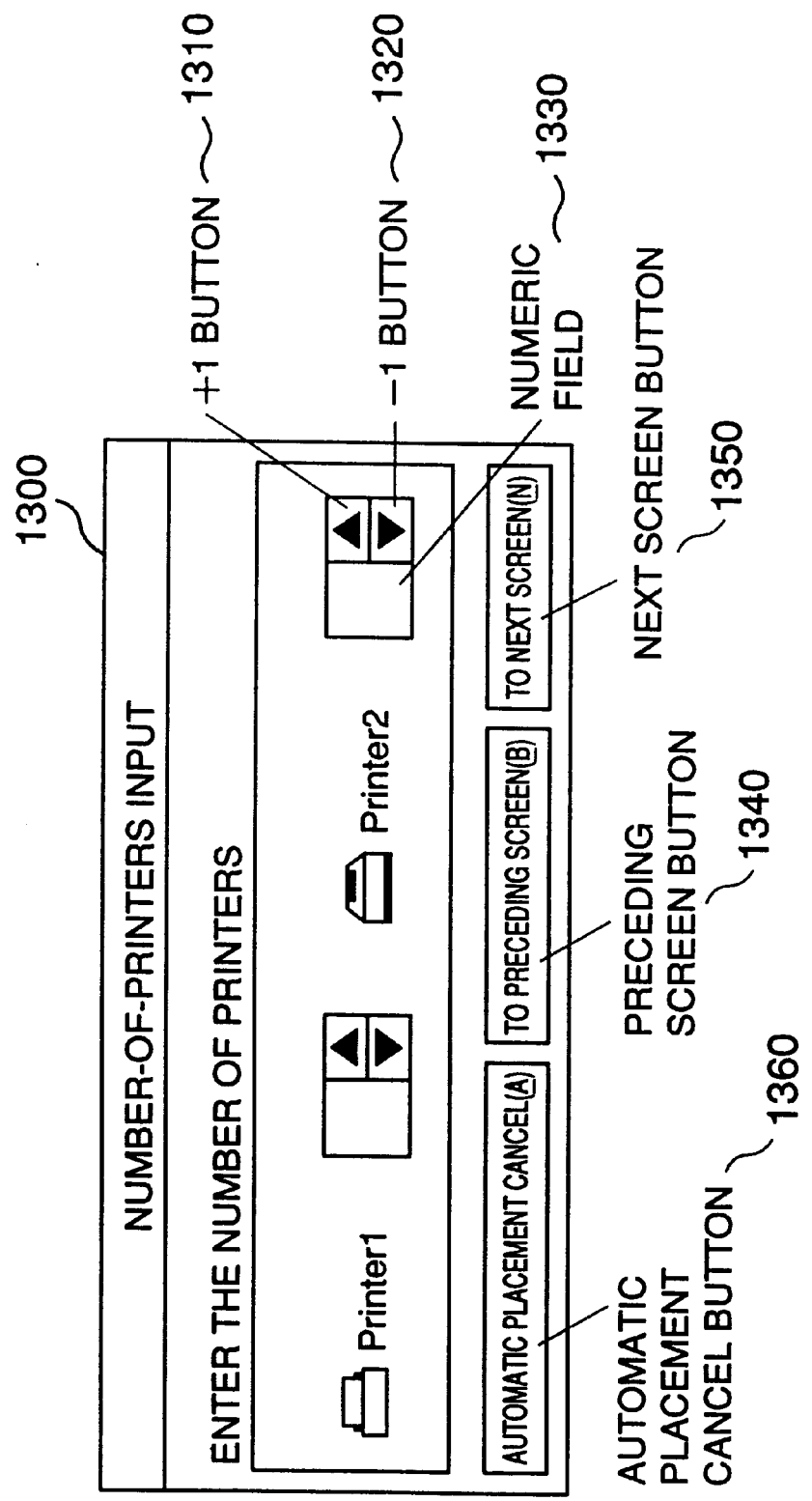
FIG. 18 is a drawing showing one embodiment of a number-of-printers input screen.

The number-of-printers input screen 1300 in FIG. 18 is a screen for inputting printer plates placed on the network block diagram for each model in batch; the printer plates are automatically placed at appropriate positions on the network block diagram.

The number-of-printers input screen 1300 provides a +1 button 1310, a −1 button 1320, a numeric field 1330, a preceding screen button 1340, a next screen button 1350, and an automatic placement cancel button 1360. The operator sets printers by using the buttons, etc., like those on the number-of-computers input screen 1200.

Figure 19:
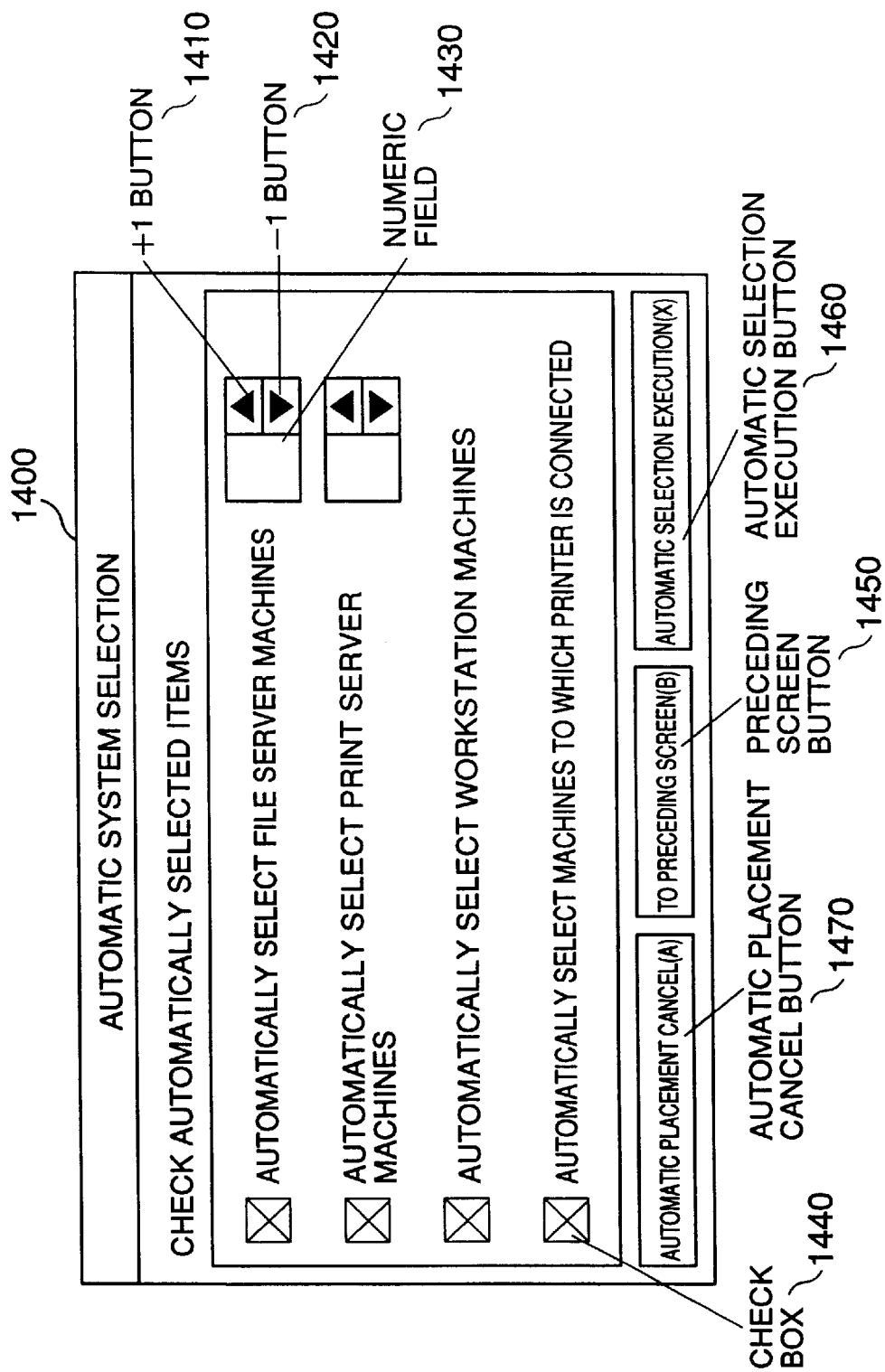
FIG. 19 is a drawing showing one embodiment of an automatic system selection screen.

The automatic system selection screen 1400 in FIG. 19 is a screen for automatically placing file server, print server, and workstation machines at appropriate positions so as to prevent the machines from overlapping each other on the network block diagram.

The automatic system selection screen 1400 provides a +1 button 1410, a −1 button 1420, a numeric field 1430, check boxes 1440, a preceding screen button 1450, an automatic selection execution button 1460, and an automatic placement cancel button 1470. The operator can also use the buttons, etc., like those on the number-of-computers input screen 1200. To specify whether each function is effective or ineffective, the operator clicks on the check box 1440 corresponding to the function. If the box is marked with X, it indicates that the function is effective.

When the operator clicks on the automatic selection execution button 1460, the automatic system selection screen 1400 is terminated and the computer palettes and the printer palettes are automatically placed on the network configuration screen for automatic system selection based on the information set in FIGS. 17 to 19, then control returns to the network configuration screen.

When installing a network of file servers, print servers, and clients, formerly the operator was careful so as not to make mistakes in setting parameters of network addresses, etc. In the invention, the operator uses the network block diagram to set the network addresses, etc., thus whether or not the parameters are set correctly can be determined automatically when they are set, and the parameters of the network addresses, etc., can be managed under the unified standard.

Likewise, a combination of computers, printers, and other machines that can be connected can be automatically determined when they are set.

Since the network configuration can be easily understood visually at a glance, it can be easily recognized when the network configuration is planned or designed; this merit can be used for customer service. Further, when the customer requests addition or deletion of network machines to or from the network configuration or a change of the setup values, the demands can be promptly met. Thus, network configuration data can be managed, applied, maintained, and used for each customer so that customer service quality can be improved and savings can be passed on to customers.

Next, the hardware configuration, module block diagrams, and internal data drawings to provide network block diagram screens as described above, and internal processing charts corresponding to main processing on the network block diagram screens will be discussed with reference to FIGS. 20 to 46 and 66.

Figure 2:
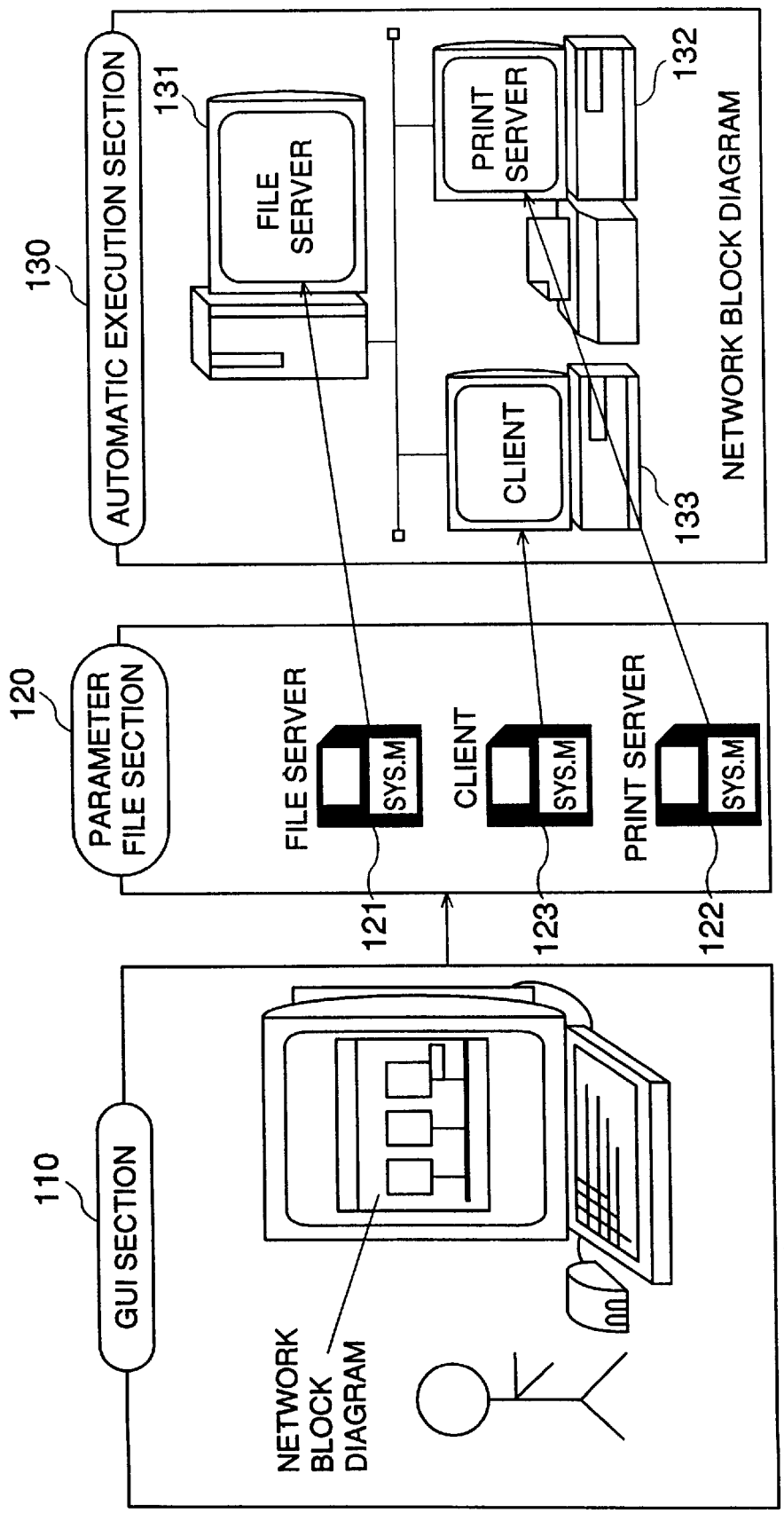
FIG. 2 is a drawing showing an outline of the invention.
Figure 66:
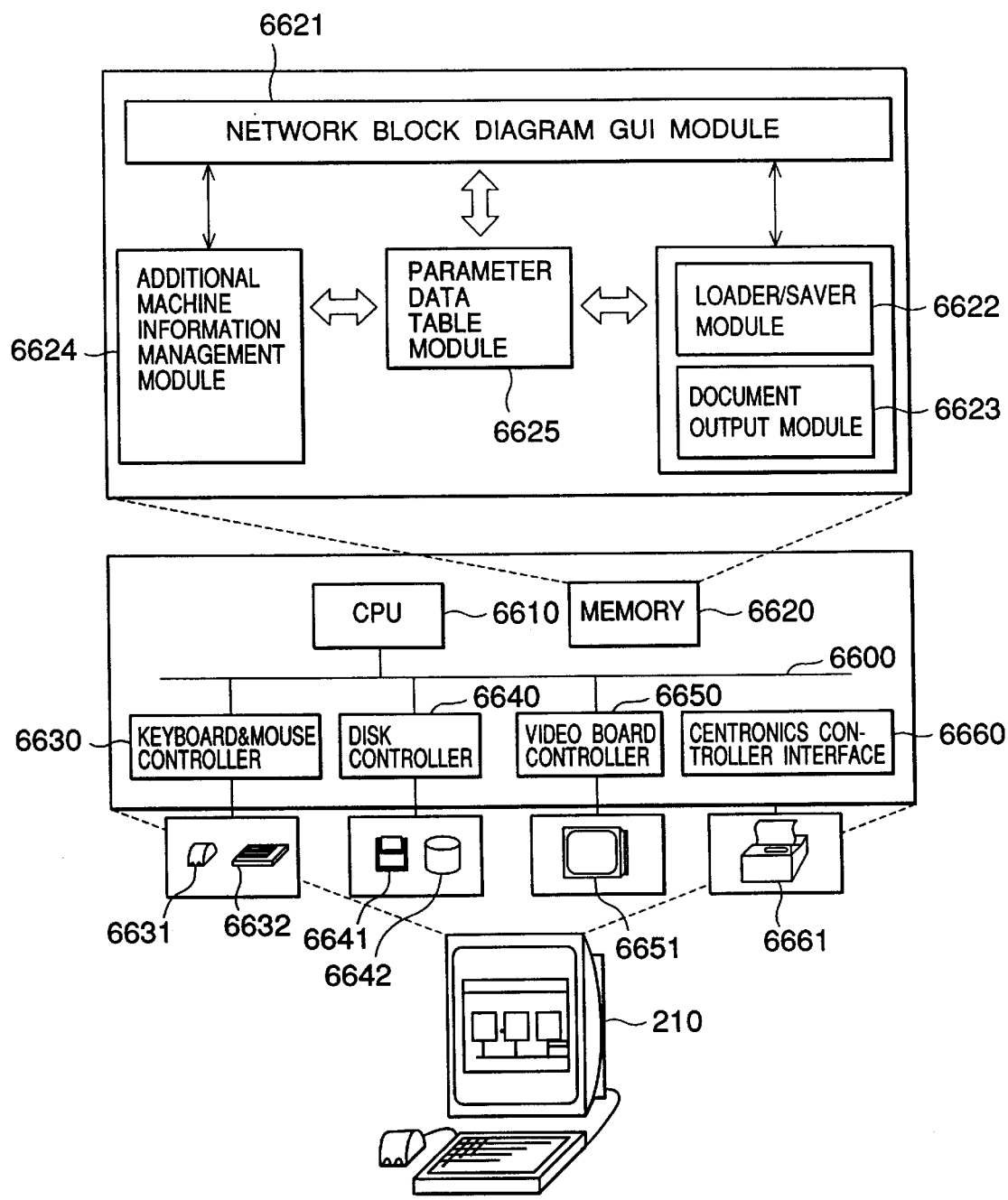
FIG. 66 is a drawing showing the hardware configuration of the GUI section of the invention and the module configuration of GUI section programs resident in a GUI section memory.

FIG. 66 shows the hardware configuration of the GUI section 210 in FIG. 2 for setting parameters using a network block diagram and the module configuration of a GUI section program resident in a memory of the GUI section.

In FIG. 66, a system bus 6600 is provided to transfer instructions and data among GUI hardware components, a CPU 6610 controls the hardware, and a memory 6620 stores the GUI section program (GUI program) for setting parameters using a network block diagram. The module configuration of the GUI program will be described in detail below. A keyboard and mouse controller 6630 controls a keyboard 6631, a mouse 6632, etc., a disk controller 6640 controls a floppy disk 6641, a hard disk 6642, etc., a video board controller 6650 controls a display 6651, etc., and a centronics interface controller 6660 controls a printer 6661, etc.

These hardware components operate as follows:

When the operator operates the mouse 6631 or the keyboard 6632 on the network block diagram screen, the keyboard and mouse controller 6630 receives the operation and sends an appropriate operation message via the system bus 6600 to the CPU 6610. The CPU 6610 sends an instruction corresponding to the message via the system bus 6600 to the GUI program in the memory 6620, which then executes processing in response to the instruction.

When the operator saves or calls data on the network block diagram screen, the GUI program in the memory 6620 sends an appropriate operation message via the system bus 6600 to the CPU 6610. The CPU 6610 sends an instruction corresponding to the message via the system bus 6600 to the disk controller 6640, which then accesses the floppy disk 6641 or the hard disk 6642 and executes processing in response to the instruction.

When the operator updates the display on the network block diagram screen, the GUI program in the memory 6620 sends an appropriate operation message via the system bus 6600 to the CPU 6610. The CPU 6610 sends an instruction corresponding to the message via the system bus 6600 to the video controller 6650, which then executes processing on the display 6651 in response to the instruction.

When the operator makes a print output request on the network block diagram screen, the GUI program in the memory 6620 sends an appropriate operation message via the system bus 6600 to the CPU 6610. The CPU 6610 sends an instruction corresponding to the message via the system bus 6600 to the centronics interface controller, which then executes processing at the printer 6661 in response to the instruction.

Numerals 6621 to 6625 are an example of the module configuration of the GUI program resident in the memory 6620.

The detailed contents of a network block, diagram GUI module 6621, the main unit of the GUI program will be described with reference to FIGS. 20 and 21.

A loader/saver module 6622 which saves and calls setup parameters is called from the network block diagram GUI module.

A document output module 6623 provides a document function for printing out setup parameters and is called from the network block diagram GUI module. The document output function will be described below in detail with reference to FIGS. 46 to 56. An additional machine information management module 6624 provides a new addition function of network component information for adding and deleting new network machine information to and from the network configuration screen; the module is called from the network block diagram GUI module. The new addition function of network component information will be described in detail below with reference to FIGS. 57 to 65.

A parameter data table module 6625 manages setup parameters used in the modules 6621 to 6624 in the data table format as common data.

Figure 20:
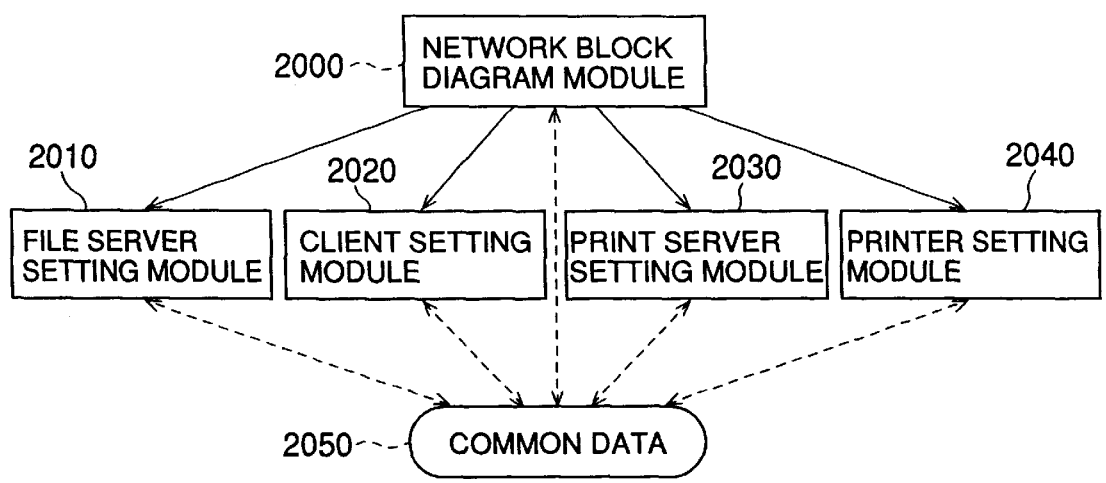
FIG. 20 is a module relationship diagram in a network block diagram GUI section.

FIG. 20 shows the relationships among modules in the network block diagram GUI module 6621 in FIG. 66 and between the modules and common data in the parameter data table module 6625 in FIG. 66.

In FIG. 20, a network block diagram module 2000 is a module integrating the functions of the file server installer 111, the client installer 112, and the print server installer 113 in FIG. 1; this module is the nucleus of the invention.

When the operator clicks on the file server setting button 550 in FIG. 5, a file server setting module 2010 is called from the network block diagram module 2000, and sets a file server, a network function. The setup parameters are stored in the common data 2050 as information.

A client setting module 2020, a print server setting module 2030, and a printer setting module 2040 are also called from the network block diagram module 2000, and they respectively set network functions of clients, print servers, and printers required in installing the print servers. The setup parameters are stored in the common data 2050 as information.

When the operator clicks on the printer icon 620 in FIG. 6, the printer setting module 2040 is called from the network block diagram module 2000, and sets parameters. The setup parameters are stored in the common data 2050 as information.

The setup values among the modules are managed in the common data 2050 and the common data can be used to check, change, correct, set, etc., the setup values of network addresses, etc. The contents of the common data 2050 will be described in detail below with reference to FIGS. 22 to 30.

Figure 21:
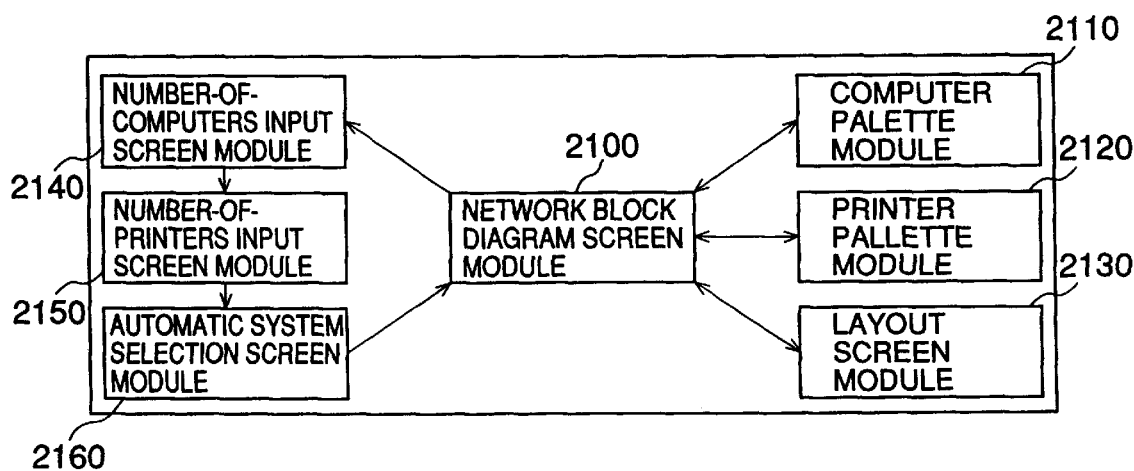
FIG. 21 is a module relationship diagram of network block diagram screens.

FIG. 21 is a module relationship diagram of the network block diagram module 2000 in FIG. 20 for each window screen.

In FIG. 21, numeral 2100 is a module for providing the network block diagram screen 400 in FIG. 4. This module provides a place for carrying out the main operation on the network configuration screens explained in FIGS. 31 to 45 and internal processing using the computer plate 500 in FIG. 5 and the printer plate 600 in FIG. 6. As shown in arrows in FIG. 21, the module calls window modules such as a computer palette module 2110 for providing the computer palette 900 in FIG. 14, a printer palette module 2120 for providing the printer palette 1000 in FIG. 15, a layout screen module 2130 for providing the layout screen 1100 in FIG. 16, a number-of-computers input screen module 2140 for providing the number-of-computers input screen 1200 in FIG. 17, a number-of-printers input screen module 2150 for providing the number-of-printers input screen 1300 in FIG. 18, and an automatic system selection screen module 2160 for providing the automatic system selection screen 1400 in FIG. 19.

Figure 22:
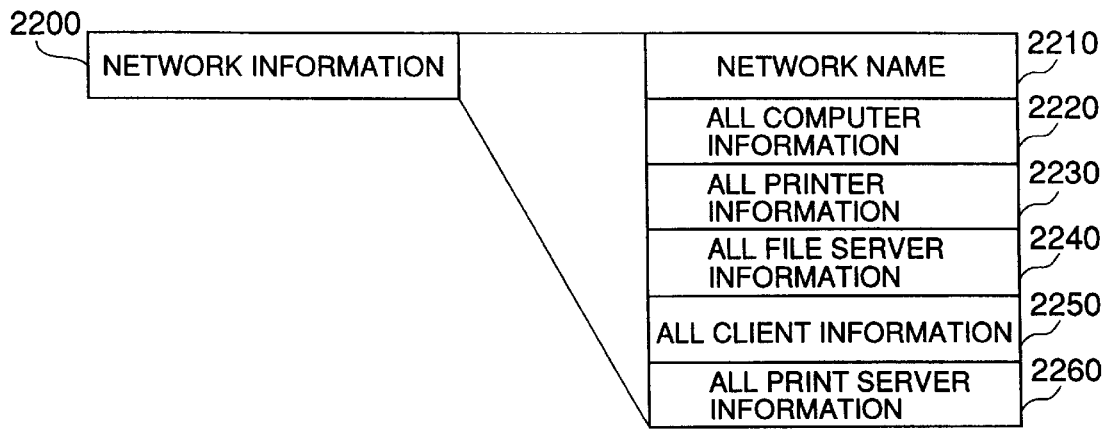
FIG. 22 is a network information block diagram of a common data block diagram.

FIGS. 22 to 30 are block diagrams of the common data 2050 in FIG. 20, which is discussed in detail below:

The common data is managed as unified network information 2200, as shown in FIG. 22. The network information consists of a network name 2210, an identifier used to manage the setup value of the network, all computer information 2220 consisting of information on all computers on the network configuration, all printer information 2230 consisting of information on all printers on the network configuration, all file server information 2240 consisting of information on all file servers on the network configuration, all client information 2250 consisting of information on all clients on the network configuration, and all print server information 2260 consisting of information on all print servers on the network configuration.

Figure 23:
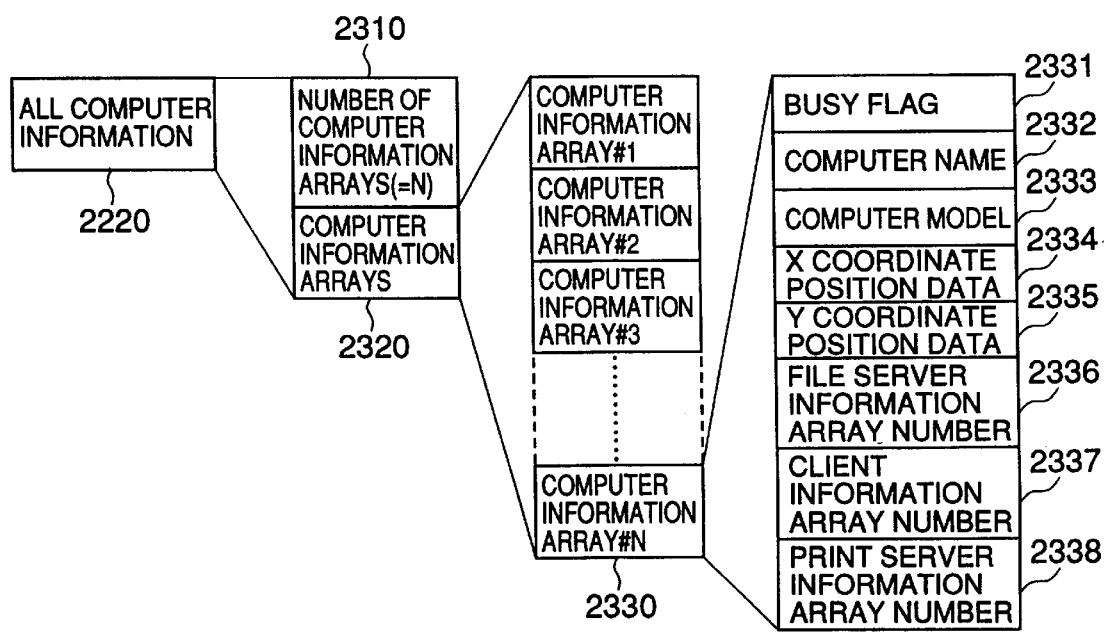
FIG. 23 is an all computer information block diagram of a common data block diagram.

The all computer information 2220 consists of entries as shown in FIG. 23.

First, the all computer information 2220 is divided into two sections of the number of computer information arrays 2310 and computer information arrays 2320 containing as many computer information arrays #1 to #N 2330 as the number of computer information arrays 2310 (N). Each of the computer information arrays #1 to #N 2330 consists of elements 2331 to 2338.

Numeral 2331 is a setup value reservation area of a busy flag. When a computer plate is prepared or duplicated on the network configuration screen, the setup value becomes valid; when a computer plate is erased or cut, the setup value becomes invalid. The computer plate can be edited again easily from the beginning by changing the busy flag from the invalid value to the valid value or from the valid value to the invalid value.

Numeral 2332 is a setup value reservation area of a computer name indicating the identifier of a computer plate. The value displayed in the computer name field 570 in FIG. 5 is entered in the computer name. When a computer name is prepared or duplicated, the network block diagram screen module 2100 in FIG. 21 checks the computer name based on the computer names of already existing computer plates, and sets the initial computer name provided by the system. When computer name setting is changed, the module 2100 checks a new computer name for duplication of any of the computer names of already existing computer plates, and picks out a setting mistake, if present, and corrects it.

Numeral 2333 is a setup value reservation area of a computer model indicating the computer device type. As many computer models as shown on the computer plate list 910 in FIG. 14 exist, and the value corresponding to the computer plate icon is entered.

Numerals 2334 and 2335 are setup value reservation areas of X and Y coordinate position data indicating the horizontal and vertical relative coordinate positions of a computer plate on the network block diagram. For the coordinates, the coordinates in the upper left corner of the computer plate are entered.

Numeral 2336 is a setup value reservation area of the file server information array number when the file server function, a network function, is installed on a computer plate. When the file server On/Off button 520 in FIG. 5 is On, the value set in the area becomes valid, and the digit or digits following # of the file server information array 2630 in FIG. 26, file server information set on the computer plate, are entered.

Numeral 2337 is a setup value reservation area of the client information array number indicating which information array contains its setup information when the client function, a network function, is installed on a computer plate. When the client On/Off button 510 in FIG. 5 is On, the value set in the area becomes valid, and the digit or digits following # of the client information array 2830 in FIG. 28, client information set on the computer plate, are entered.

Numeral 2338 is a setup value reservation area of the print server information array number when the print server function, a network function, is installed on a computer plate. When the print server On/Off button 530 in FIG. 5 is On, the value set in the area becomes valid, and the digit or digits following # of the print server information array 3030 in FIG. 30, print server information set on the computer plate, are entered.

Figure 24:
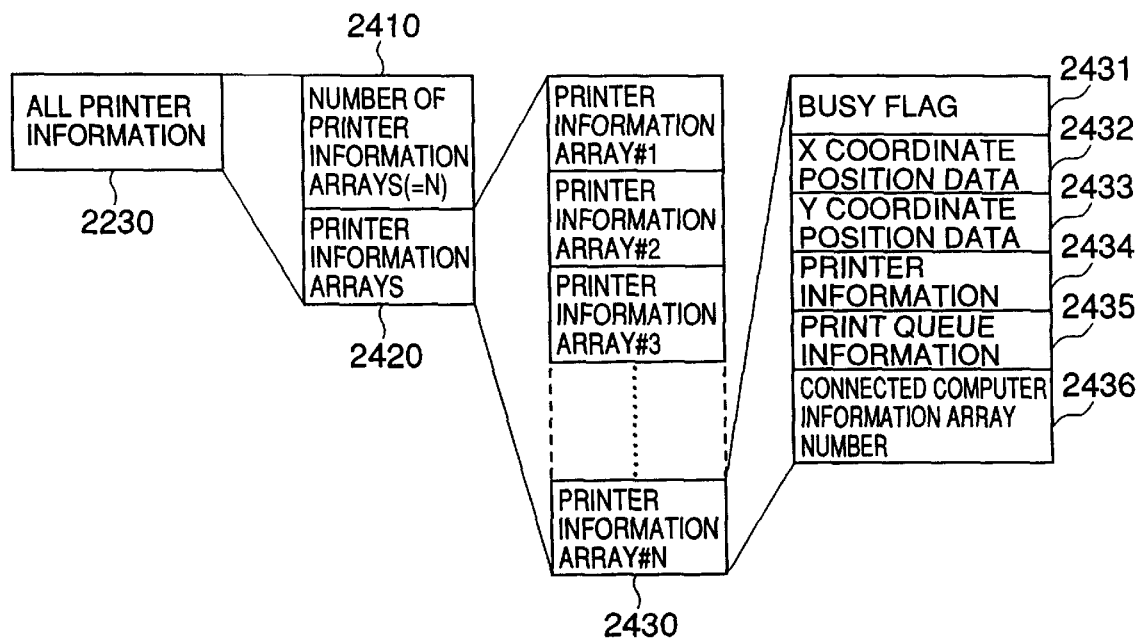
FIG. 24 is an all printer information block diagram of a common data block diagram.

The all printer information 2230 consists of entries as shown in FIG. 24, like the all computer information in FIG. 23. Numeral 2431 is a setup value reservation area of a busy flag. When a printer plate is prepared or duplicated on the network configuration screen, the setup value becomes valid; when a printer plate is erased or cut, the setup value becomes invalid. The printer plate can be edited again easily from the beginning by changing the busy flag from the invalid value to the valid value or from the valid value to the invalid value.

Numeral 2432 is a setup value reservation area of X coordinate position data indicating the horizontal relative coordinate position of a printer plate on the network block diagram.

Numeral 2433 is a setup value reservation area of Y coordinate position data indicating the vertical relative coordinate position of a printer plate on the network block diagram. For the coordinates, the coordinates in the upper left corner of the printer plate are entered.

Numeral 2434 is an area in which printer information, printer parameters set in the printer setting module 2040 in FIG. 20, is entered. The area will be discussed in detail below with reference to FIG. 25.

Numeral 2435 is an area in which print queue information, print queue parameters set in the printer setting module 2040 in FIG. 20, is entered. The area will be discussed in detail below with reference to FIG. 25.

Numeral 2436 is a setup value reservation area of the computer information array number of the connected computer, when the corresponding printer plate is connected to a computer plate, indicating which information array contains the computer plate setup information. When the printer plate is connected to the computer plate, the value set in the area becomes valid, and the digit or digits following # of the computer information array 2330 in FIG. 23, computer information of the connected computer plate, are entered.

Figure 25:
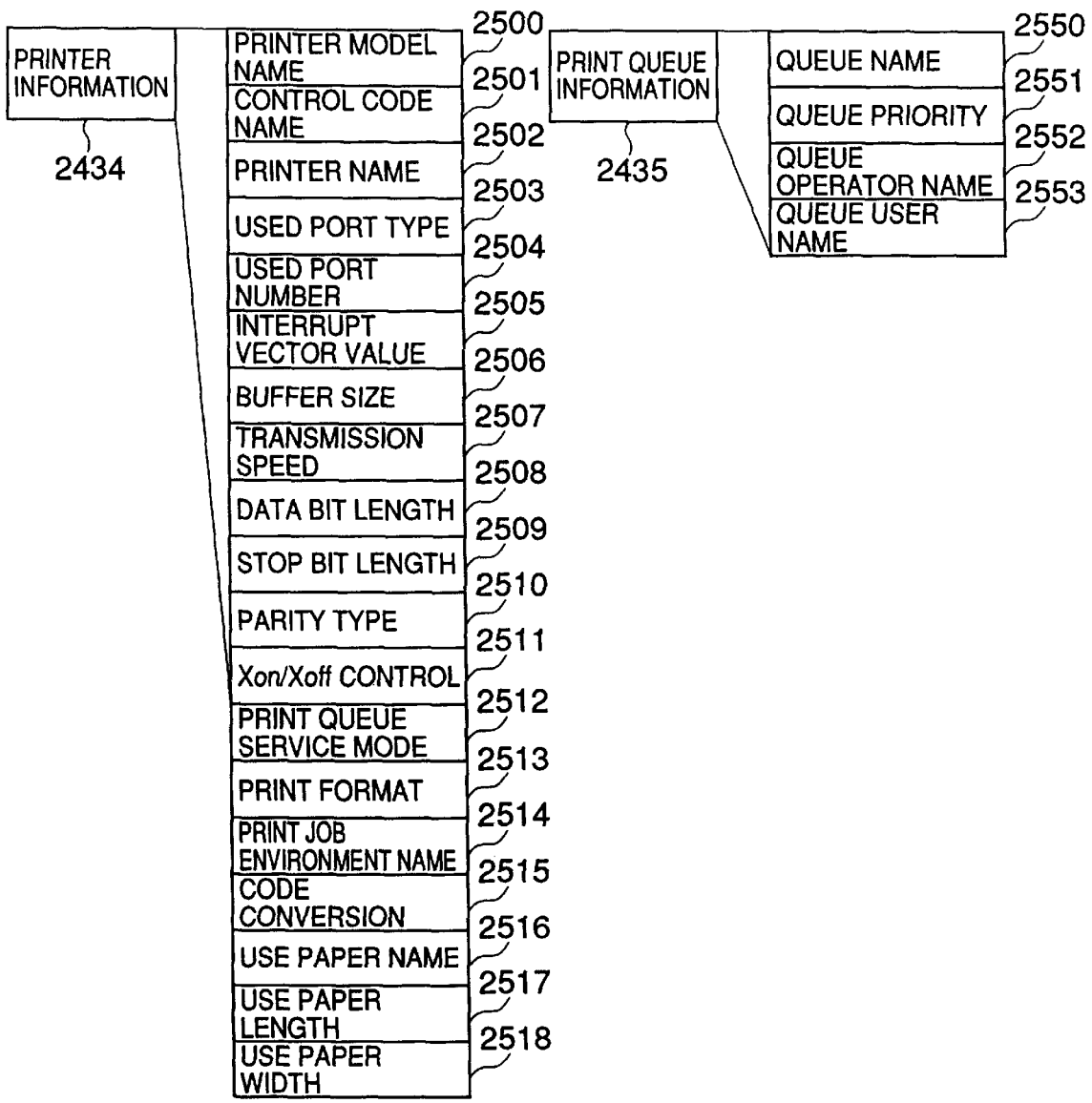
FIG. 25 is a printer information block diagram of a common data block diagram.

The printer information 2434 and the print queue information 2435 have entries as shown in FIG. 25.

Numeral 2500 is a setup value reservation area of a printer model indicating the printer device type. As many printer models as shown on the printer plate list 1010 in FIG. 15 exist, and the value corresponding to the printer plate icon is entered. Numeral 2501 is a setup value reservation area in which the value of the control code name corresponding to the printer model 2500 is entered. Numeral 2502 is a setup value reservation area of a printer name indicating the identifier of a printer plate. The value displayed in the printer name field 610 in FIG. 6 is entered in the printer name. When a printer name is prepared or duplicated, the network block diagram screen module 2100 in FIG. 21 checks the printer name based on the printer names of already existing printer plates, and sets the initial printer name provided by the system. When printer name setting is changed, the module 2100 checks a new printer name for duplication of any of the printer names of already existing printer plates, and picks out a setting mistake, if present, and corrects it. Numeral 2503 is a setup value reservation area of the used port type in which the value indicating the printer slot type (serial or parallel) is entered. Numeral 2504 is a setup value reservation area of the used port number in which the value indicating the printer slot number is entered. Numeral 2505 is a setup value reservation area of the interrupt vector value in which the value indicating the interrupt vector of the printer is entered. Numeral 2506 is a setup value reservation area of the buffer size in which the value indicating the transfer buffer size of the printer is entered. Numeral 2507 is a setup value reservation area of the transmission speed in which the value indicating the transmission speed of the printer is entered. Numeral 2508 is a setup value reservation area of the data bit length in which the value indicating the data bit length of the printer is entered. Numeral 2509 is a setup value reservation area of the stop bit length in which the value indicating the stop bit length of the printer is entered. Numeral 2510 is a setup value reservation area of the parity type in which the value indicating parity control of the printer is entered. Numeral 2511 is a setup value reservation area of Xon/Xoff control in which the value indicating whether or not X control of the printer is to be performed is entered. Numeral 2512 is a setup value reservation area of the print queue service mode in which the value indicating the network service mode of the printer is entered. Numeral 2513 is a setup value reservation area of the print format in which the value indicating the network output format of the printer is entered. Numeral 2514 is a setup value reservation area of the print job environment name in which the value indicating the network output environment identifier of the printer is entered. Numeral 2515 is a setup value reservation area of code conversion in which the value indicating whether or not network output code of the printer is to be converted is entered. Numeral 2516 is a setup value reservation area of the use paper name in which the value indicating the network output paper identifier of the printer is entered. Numeral 2517 is a setup value reservation area of the use paper length in which the value indicating the network output paper length of the printer is entered. Numeral 2518 is a setup value reservation area of the use paper width in which the value indicating the network output paper width of the printer is entered.

Numeral 2550 is a setup value reservation area of the queue name in which the value indicating the identifier of a print queue is entered. Numeral 2551 is a setup value reservation area of the queue priority in which the value indicating the network priority level of the print queue is entered. Numeral 2552 is a setup value reservation area of the queue operator name in which the value indicating the person who can set the print queue on the network is entered. Numeral 2553 is a setup value reservation area of the queue user name in which the value indicating the person who can use the print queue on the network is entered.

These entries 2500–2518 and 2550–2553 are set in the printer setting module 2040 in FIG. 20.

Figure 26:
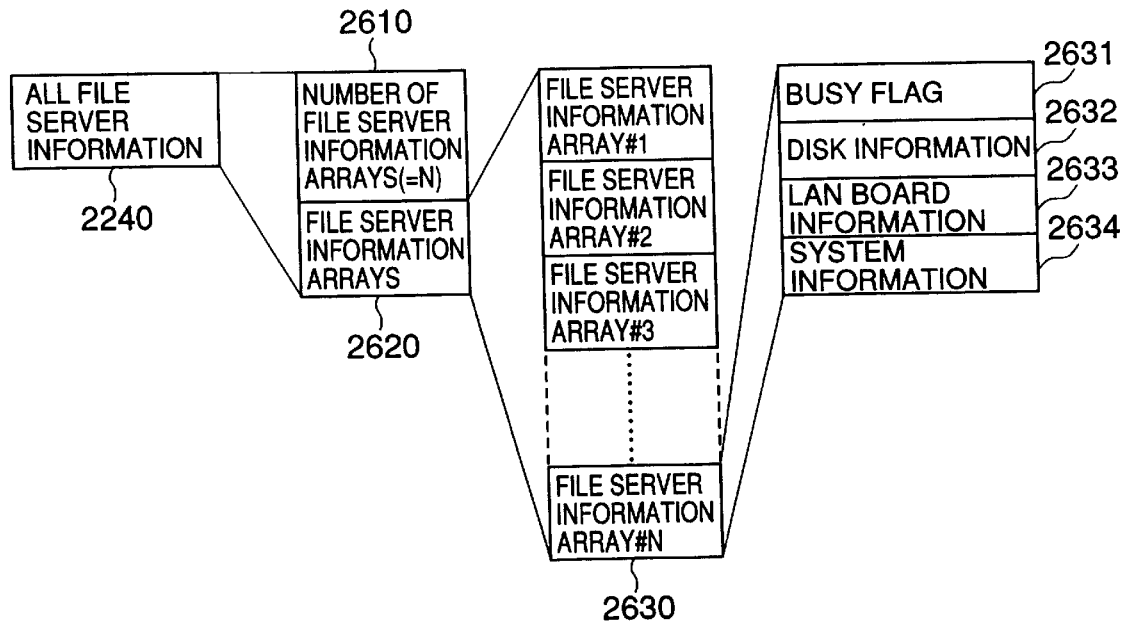
FIG. 26 is an all file server information block diagram of a common data block diagram.

The all file server information 2240 consists of entries as shown in FIG. 26.

First, the all file server information 2240 is divided into two sections of the number of file server information arrays 2610 and file server information arrays 2620 containing as many file server information arrays #1 to #N 2630 as the number of file server information arrays 2610 (N). Each of the file server information arrays #1 to #N 2630 consists of elements 2631 to 2634.

Numeral 2631 is a busy flag area. When the file server On/Off button on the computer plate on the network configuration screen is On, the value set in the area becomes valid; when the file server On/Off button is Off, the setup value becomes invalid. Numeral 2632 is an area in which disk information, hard disk parameters, is entered. The area will be discussed in detail below with reference to FIG. 27. Numeral 2633 is an area in which LAN board information, communication board parameters, is entered. The area will be discussed in detail below with reference to FIG. 27. Numeral 2634 is an area in which system information, network system parameters, is entered. The area will be discussed in detail below with reference to FIG. 27. These elements 2631 to 2634 are set in the file server setting module 2010 in FIG. 20.

Figure 27:
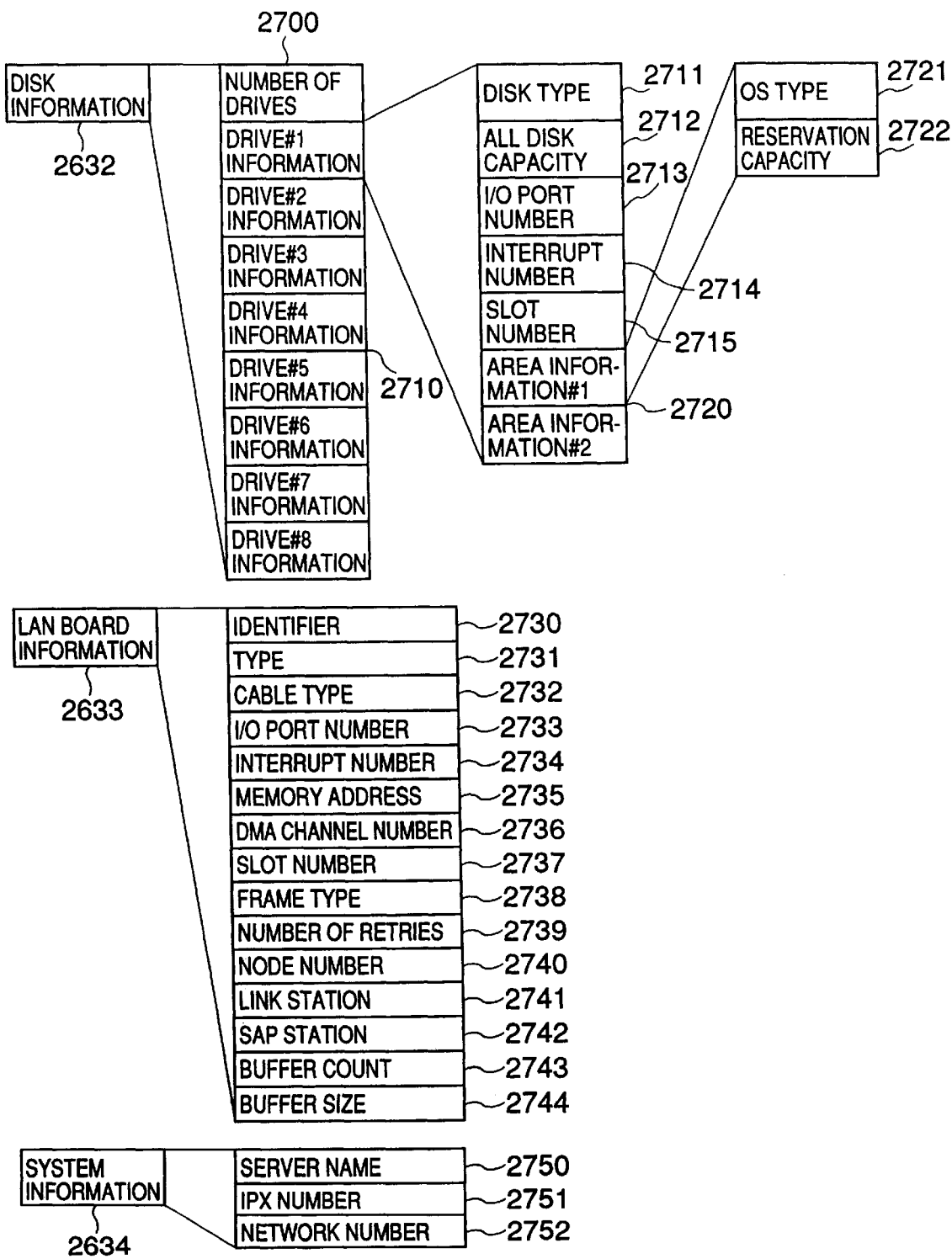
FIG. 27 is a disk information, LAN board information, and system information block diagram of a common data block diagram.

The disk information 2632, the LAN board information 2633, and the system information 2634 have entries as shown in FIG. 27.

The disk information 2632 is divided into a setup value reservation area of the number of drives 2700 and drive information #x 2710 (x is 1–8). Each drive information #x 2710 contains setup value reservation areas 2711 to 2715 and area information #y 2720 (y is 1–2). Each area information #y consists of setup value reservation areas 2721 and 2722.

Numeral 2711 is a setup value reservation area of the disk type in which the value indicating the type of hard disk driver is entered. Numeral 2712 is a setup value reservation area of all disk capacity in which the value indicating overall hard disk capacity is entered. Numeral 2713 is a setup value reservation area of the I/O port number in which the value indicating the I/O port address of the hard disk driver is entered. Numeral 2714 is a setup value reservation area of the interrupt number in which the value indicating the interrupt value of the hard disk driver is entered. Numeral 2715 is a setup value reservation area of the slot number in which the value indicating the slot position of the hard disk driver is entered.

Numeral 2721 is a setup value reservation area of the operating system type in which the value indicating the operating system type for each partition in hard disk is entered. Numeral 2722 is a setup value reservation area of reservation capacity in which the value indicating the disk reservation capacity for each partition in hard disk is entered.

These entries 2711–2715 and 2721–2722 are set in the file server setting module in FIG. 20.

The LAN board information 2633 consists of setup value reservation areas 2730 to 2744.

Numeral 2730 is a setup value reservation area of the identifier in which the value indicating the identifier of the communication board is entered. Numeral 2731 is a setup value reservation area of the type in which the value indicating the communication board type is entered. Numeral 2732 is a setup value reservation area of the cable type in which the value indicating a connection connector of the communication board is entered. Numeral 2733 is a setup value reservation area of the I/O port number in which the value indicating the I/O port address of the communication board is entered. Numeral 2734 is a setup value reservation area of the interrupt number in which the value indicating the interrupt value of the communication board is entered. Numeral 2735 is a setup value reservation area of the memory address in which the value indicating the memory allocation address of the communication board is entered. Numeral 2736 is a setup value reservation area of the DMA channel number in which the value indicating the DMA channel number of the communication board is entered. Numeral 2737 is a setup value reservation area of the slot number in which the value indicating the slot position of the communication board is entered. Numeral 2738 is a setup value reservation area of the frame type in which the value indicating the packet format of the communication board is entered. These entries 2730–2738 are set in the file server setting module in FIG. 20.

When a new file server or client is set, the network block diagram screen module 2100 in FIG. 21 checks the frame type of the new file server based on the frame type of already setup file servers and clients for setting so as to unify the initial frame types provided by the system. When frame type setting is changed, the module 2100 checks whether or not a new frame type differs from the frame type of already setup file servers and clients, and picks out a setting mistake, if present, and corrects it so as to match the frame type of already setup file servers and clients.

Numeral 2739 is a setup value reservation area of the number of error retries in which the value indicating the number of entries for a communication error of the communication board, set in the file server setting module 2010 in FIG. 20 is entered.

Numeral 2740 is a setup value reservation area of the node number in which the value indicating the identification number of the communication board, set in the file server setting module 2010 in FIG. 20 is entered. When a new file server or client is set, the network block diagram screen module 2100 in FIG. 21 checks the node number of the new file server or client based on the node numbers of already setup file servers and clients and sets the initial node number provided by the system. When node number setting is changed, the module 2100 checks a new node number for duplication of any of the node numbers of already setup file servers and clients, and picks out a setting mistake, if present, and corrects it.

Numeral 2741 is a setup value reservation area of the link station in which the value indicating the setup value of token format communication board is entered. When a new file server is set, the network block diagram screen module 2100 in FIG. 21 automatically checks the link station of the new file server based on the link stations of already setup file servers and sets the initial link station provided by the system. When link station setting is changed, the module 2100 checks a new link station for duplication of any of the link stations of already setup file servers, and picks out a setting mistake, if present, and corrects it.

Numeral 2742 is a setup value reservation area of the SAP station in which the value indicating the setup value of a token format communication board, set in the file server setting module 2010 in FIG. 20, is entered. When a new file server is set, the network block diagram screen module 2100 in FIG. 21 checks the SAP station of the new file server based on the SAP stations of already setup file servers and sets the initial SAP station provided by the system. When SAP station setting is changed, the module 2100 checks a new SAP station for duplication of any of the SAP stations of already setup file servers, and picks out a setting mistake, if present, and corrects it.

Numeral 2743 is a setup value reservation area of the buffer count in which the value indicating the setup value of token format communication board, set in the file server setting module 2010 in FIG. 20 is entered.

Numeral 2744 is a setup value reservation area of the buffer size in which the value indicating the setup value of token format communication board, set in the file server setting module 2010 in FIG. 20 is entered.

The system information 2634 consists of setup value reservation areas 2750 to 2752.

Numeral 2750 is a setup value reservation area of the server name in which the value indicating the identifier of the file server in the network system, set in the file server setting module 2010 in FIG. 20 is entered. When a new file server is set, the network block diagram screen module 2100 in FIG. 21 checks the server name of the new file server based on the server names of already setup file servers and sets the initial server name provided by the system. When server name setting is changed, the module 2100 checks a new server name for duplication of any of the server names of already setup file servers, and picks out a setting mistake, if present, and corrects it.

Numeral 2751 is a setup value reservation area of the IPX number in which the value indicating the identification number for each communication board in the network system, set in the file server setting module 2010 in FIG. 20 is entered. When a new file server is set, the network block diagram screen module 2100 in FIG. 21 checks the IPX number of the new file server based on the IPX numbers of already setup file servers and sets the initial IPX number provided by the system. When IPX number setting is changed, the module 2100 checks a new IPX number for duplication of any of the IPX numbers of already setup file servers, and picks out a setting mistake, if present, and corrects it.

Numeral 2752 is a setup value reservation area of the network number in which the value indicating the identification number for each network system, set in the file server setting module 2010 in FIG. 20, is entered. When a new file server is set, the network block diagram screen module 2100 in FIG. 21 checks the network number of the new file server based on the network number of already setup file servers, for setting so as to unify the network numbers provided by the system. When network number setting is changed, the module 2100 checks whether or not a new network number differs from the network number of already setup file servers, and picks out a setting mistake, if present, and corrects it so as to match the network number of already setup file servers.

Figure 28:
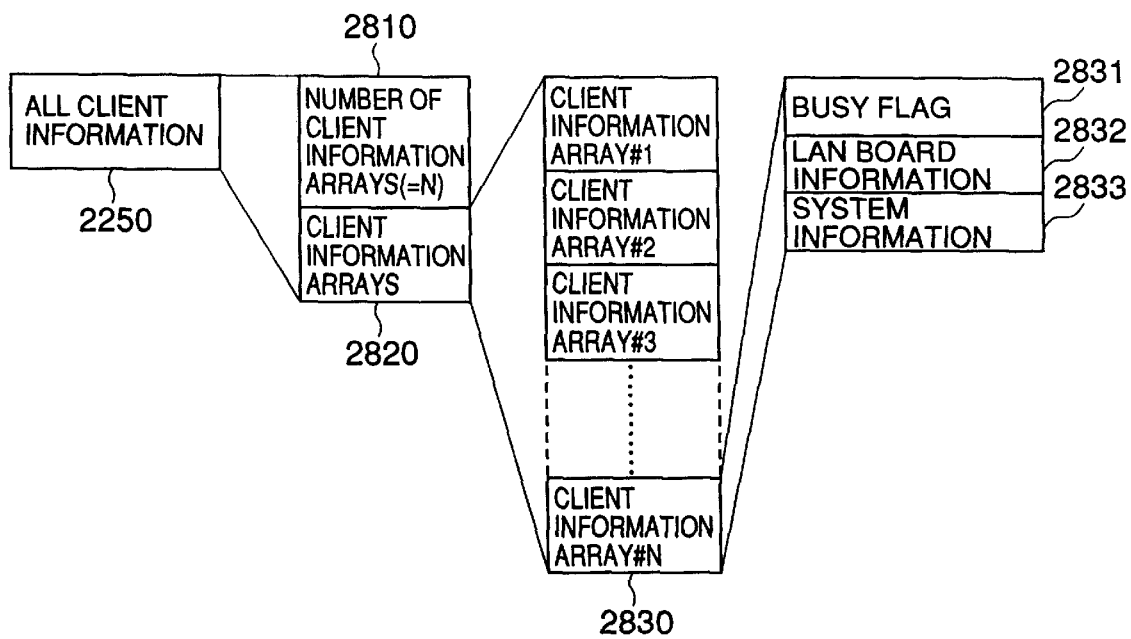
FIG. 28 is an all client information block diagram of a common data block diagram.

The all client information 2250 consists of entries as shown in FIG. 28.

First, the all client information 2250 is divided into two sections of the number of client information arrays 2810 and client information arrays 2820 containing as many client information arrays #1 to #N 2830 as the number of client information arrays 2810 (N). Each of the client information arrays #1 to #N 2830 consists of elements 2831 to 2833.

Numeral 2831 is a busy flag area. When the client On/Off button on the computer plate on the network configuration screen is On, the value set in the area becomes valid; when the client On/Off button is Off, the setup value becomes invalid. Numeral 2832 is an area in which LAN board information, communication board parameters, set in the client setting module 2020, is entered. The area will be discussed in detail below with reference to FIG. 29. Numeral 2833 is an area in which system information, network system parameters, set in the client setting module 2020 is entered. The area will be discussed in detail below with reference to FIG. 29.

Figure 29:
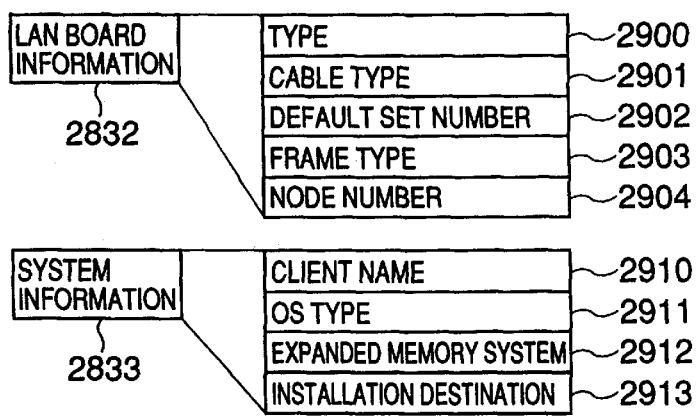
FIG. 29 is a LAN board information and system information block diagram of a common data block diagram.

The LAN board information 2832 and the system information 2833 have entries as shown in FIG. 29.

The LAN board information 2832 consists of setup value reservation areas 2900 to 2904.

Numeral 2900 is a setup value reservation area of the type, in which the value indicating the communication board type, set in the client setting module 2020, is entered.

Numeral 2901 is a setup value reservation area of the cable type, in which the value indicating a connection connector of the communication board, set in the client setting module 2020, is entered.

Numeral 2902 is a setup value reservation area of the default set number, in which the value indicating a combination of the I/O port address, interrupt value, memory allocation address, DMA channel number, and slot position of the communication board, set in the client setting module 2020, is entered.

Numeral 2903 is a setup value reservation area of the frame type, in which the value indicating the packet format of the communication board, set in the client setting module 2020, is entered. When a new file server or client is set, the network block diagram screen module 2100 in FIG. 21 checks the frame type of the new file server based on the frame type of already setup file servers and clients for setting so as to unify the initial frame types provided by the system. When frame type setting is changed, the module 2100 checks whether or not a new frame type differs from the frame type of already setup file servers and clients, and picks out a setting mistake, if present, and corrects it so as to match the frame type of already setup file servers and clients.

Numeral 2904 is a setup value reservation area of the node number in which the value indicating the identification number of the communication board, set in the client setting module 2020 is entered. When a new file server or client is set, the network block diagram screen module 2100 in FIG. 21 checks the node number of the new file server or client based on the node numbers of already setup file servers and clients and sets the initial node number provided by the system. When node number setting is changed, the module 2100 checks a new node number for duplication of any of the node numbers of already setup file servers and clients, and picks out a setting mistake, if present, and corrects it.

The system information 2833 consists of setup value reservation areas 2910 to 2913.

Numeral 2910 is a setup value reservation area of the client name in which the value indicating the identifier of the client in the network system, set in the client setting module 2020 is entered. When a new client is set, the network block diagram screen module 2100 in FIG. 21 checks the client name of the new client based on the client names of already setup clients and sets the initial client name provided by the system. When client name setting is changed, the module 2100 checks a new client name for duplication of any of the client names of already setup clients, and picks out a setting mistake, if present, and corrects it.

Numeral 2911 is a setup value reservation area of the operating system type, in which the value indicating the type of operating system used by the client, set in the client setting module 2020, is entered.

Numeral 2912 is a setup value reservation area of the expanded memory system, in which the value indicating the memory system used by the client, set in the client setting module 2020, is entered.

Numeral 2913 is a setup value reservation area of the installation destination in which the value indicating the location in which the network system of the client is to be installed, set in the client setting module 2020 is entered.

Figure 30:
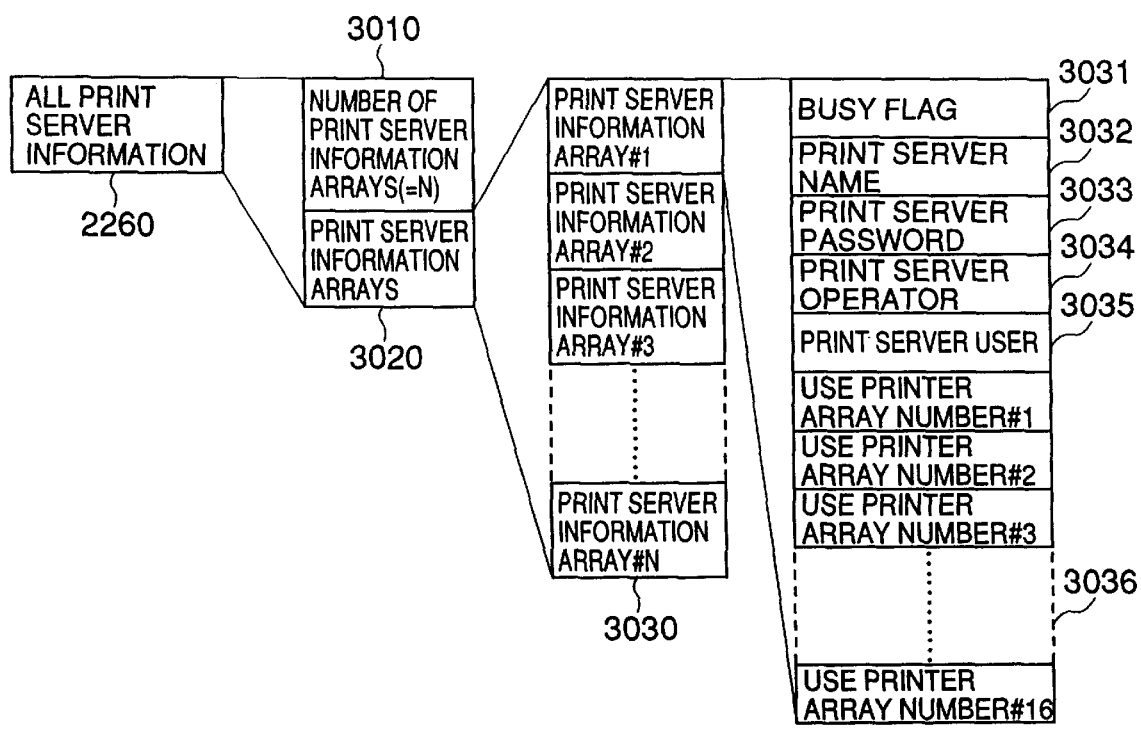
FIG. 30 is an all print server information block diagram of a common data block diagram.

The all print server information 2260 consists of entries as shown in FIG. 30.

First, the all print server information 2260 is divided into two sections of the number of print server information arrays 3010 and print server information arrays 3020 containing as many print server information arrays #1 to #N 3030 as the number of print server information arrays 3010 (N). Each of the print server information arrays #1 to #N 3030 consists of elements 3031 to 3036.

Numeral 3031 is a busy flag area. When the print server On/Off button on the computer plate on the network configuration screen is On, the value set in the area becomes valid; when the print server On/Off button is Off, the setup value becomes invalid.

Numeral 3032 is a setup value reservation area of the print server name in which the value indicating the identifier of the print server in the network system, set in the print server setting module 2030 in FIG. 20 is entered. When a new print server is set, the network block diagram screen module 2100 in FIG. 21 checks the print server name of the new print, server based on the print server names of already setup print servers and sets the initial print server name provided by the system. When print server name setting is changed, the module 2100 checks a new print server name for duplication of any of the print server names of already setup print servers, and picks out a setting mistake, if present, and corrects it.

Numeral 3033 is a setup value reservation area of the print server password in which the value indicating the password of the print server in the network system, set in the print server setting module 2030 is entered.

Numeral 3034 is a setup value reservation area of the print server operator in which the value indicating the person who can set the print server on the network, set in the print server setting module 2030 is entered.

Numeral 3035 is a setup value reservation area of the print server user in which the value indicating the person who can use the print server on the network, set in the print server setting module 2030 is entered.

Numeral 3036 is a setup value reservation area of the printer array number #x (x is 1–16) in which the value indicating the printer where the corresponding print server service can be used, set in the print server setting module 2030 is entered. Specifically, the digit or digits following # of the printer 44 information array 2430 in FIG. 24, printer information of the selected printer are entered.

A network installation data flow when the invention is used will be discussed with reference to FIG. 67 which shows how the data set as a file server is installed in a file server machine.

Figure 67:
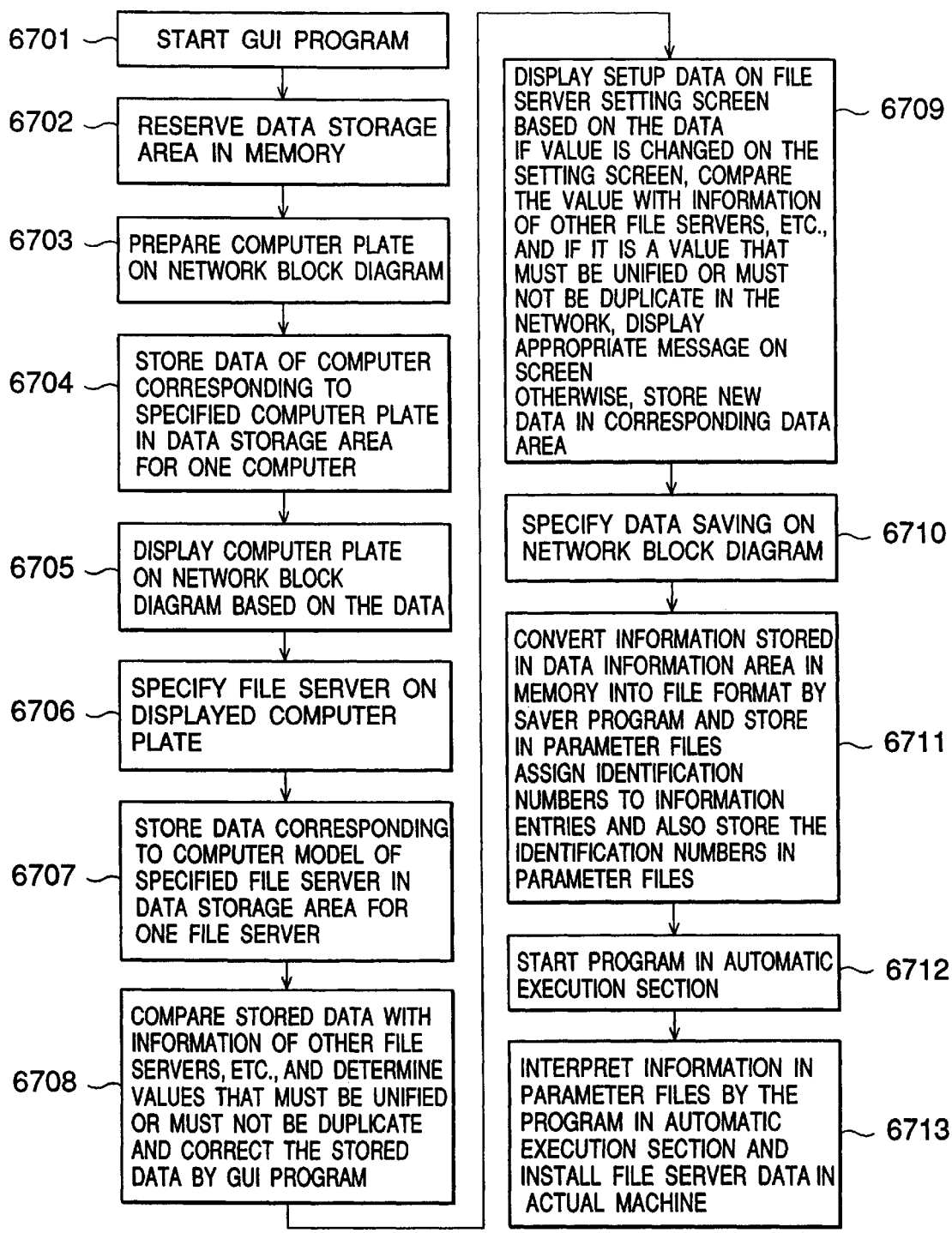
FIG. 67 is a flowchart of data to install a computer as a file server.

When the operator starts the GUI program described in FIG. 66 at step 6701 in FIG. 67, the common data area (6625 in FIG. 66) described in FIGS. 22 to 30 is reserved in the memory at step 6702. The common data area is simply reserved at this point in time and actual data is not yet entered in the area.

Next, the operator starts preparing a computer plate on a network block diagram at step 6703.

At step 6704, the GUI program acquires position data on the screen before display, and stores the values in the position data areas 2234 and 2235 in FIG. 23. Also, the GUI program sets the initial values of data such as the computer model and the computer name corresponding to the specified computer plate, and stores the values in the corresponding data areas 2332, 2333, etc., in FIG. 23.

At step 6705, the GUI program displays the computer plate on the network block diagram based on the data set at step 6704.

At step 6706, the operator specifies setting as a file server on the computer plate displayed at step 6705 by turning on the file server ON/OFF button 520 in FIG. 5.

At step 6707, the GUI program stores the initial values corresponding to the specified computer plate in the data areas of the file server in FIGS. 26 and 27. Specifically, for example, if a computer plate of model "A" is specified as a file server, the GUI program stores the standard disk type and disk capacity supported by the model "A" in 2711 and 2712, the LAN board type and LAN board name in 2731 and 2730, and values such as the interrupt number at the time of factory shipment corresponding to the disk type 2711 and the LAN board type 2731 in 2713–2715, 2721–2722, and 2732–2744. Further, the GUI program stores the initial values that the GUI program has in 2750–2752.

At step 6708, values that must be unified or must not be duplicated in the network in the information stored at step 6707 are determined; if the values that must be unified exist, the GUI program automatically changes the stored data. Specifically, for example, when a computer plate of model "B" is already specified as a file server and a computer plate of model "A" is specified as another file server, if the server name 2750 is duplicated, the GUI program changes the server name of the computer plate of the model "A" to a unique name. This also applies to the IPX number 2751. Also, the network number 2752, file server information of the computer plate of the model "A" must be the same as the network number stored as the file server information of the computer plate of the model "B," thus the GUI program changes it to the same value.

When the file server setting screen is started, the file server information stored at steps 6706 and 6707 is referenced and displayed in the corresponding display section at step 6709. If the operator changes the values set on the file server setting screen, new values are stored in the corresponding data areas. When the operator changes the value, if it is a value that must be unified or must not be duplicated, the GUI program displays an appropriate message. Specifically, for example, when computer plates of models "A" and "B" are specified as file servers and the operator changes the server name of the computer plate of the model "A" to another one, if it is identical with the server name of the computer plate of the model "B," a message indicating that the server name cannot be changed is displayed. This also applies to the IPX numbers. Also, if the operator changes the network number of the computer plate of the model "A," a message indicating that the network number 2752 of the computer plate of the model "B" will also be changed is displayed, and the value is changed to the new network number.

At step 6710, if the operator specifies saving of network information on the network block diagram by clicking on 813 or 814 in FIG. 9, control is transferred to the loader/saver 6622 in FIG. 66.

At step 6711, the network information in the common data area is converted from memory format into file format and the information is stored in parameter files according to the step 6710. The information in the memory in FIGS. 22 to 30 is stored as files for each of computer information, file server information, client information, and print server information, in computer units. At this time, identification numbers are also given to the information entries in the files for indicating what the information entries contain. Specifically, for example, identification numbers S10 and S20 are assigned to the information entries of server name of file server and IPX number respectively.

At step 6712, the programs in the automatic execution section 130 in FIG. 2 are executed at the machine where the network is to be installed. In the embodiment, the automatic execution program for the file server is executed.

At step 6713, the program started at step 6712 automatically sets the network information in the machine based on the information stored in the parameter files at step 6711. At the time of setting, the program uses the assigned identification numbers at step 6711 to interpret the parameters and determines the locations to set the information entries. For example, to set the file server name, the value stored in S10 is used for setting in the actual machine.

We have discussed a data flow to install a computer as a file server with reference to FIG. 67, but similar data processing is also performed to install computers as clients and print servers.

FIGS. 31 to 45 are flowcharts of the main operation and internal processing of the network block diagram screen module 2100 in FIG. 21.

Figure 31:
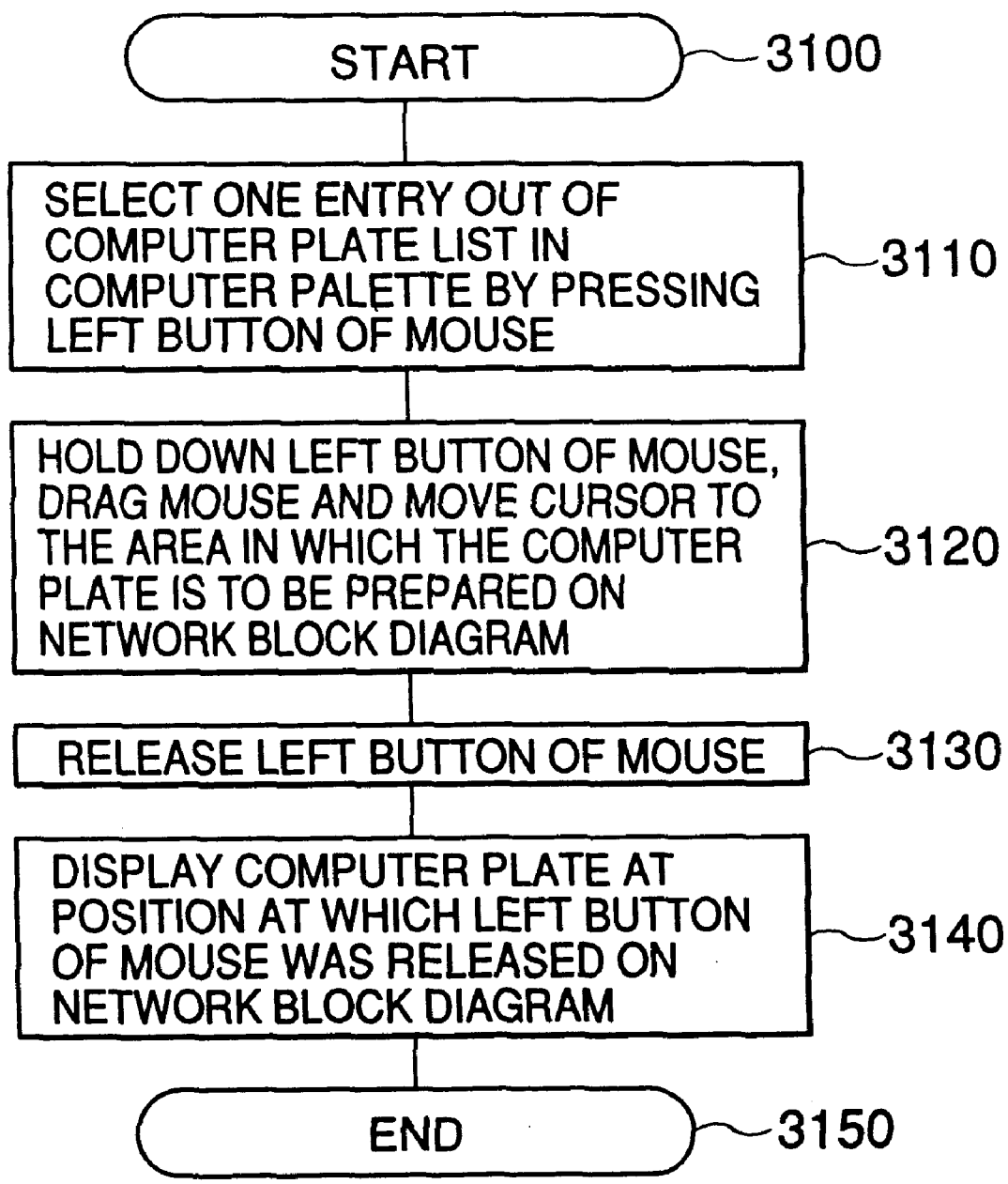
FIG. 31 is a flowchart of a computer plate preparation operating procedure.

FIG. 31 is a flowchart showing an operating procedure when the operator prepares a computer plate 500 in FIG. 5 on the network configuration screen 400 in FIG. 4.

At step 3100, the procedure is started.

At step 3110, first the operator selects one computer plate of the model to be prepared out of the computer plate list in the computer palette 900 in FIG. 14 by pressing the left button of the mouse on the corresponding computer plate list entry.

At step 3120, the operator holds down the left button of the mouse while moving the mouse cursor to the destination at which the computer plate is to be prepared on the network block diagram.

At step 3130, the operator releases the left button of the mouse at the destination.

At step 3140, the computer plate of the model to be prepared is displayed, at the position at which the operator released the left button of the mouse, on the network block diagram.

At step 3150, the procedure is terminated.

Figure 32:
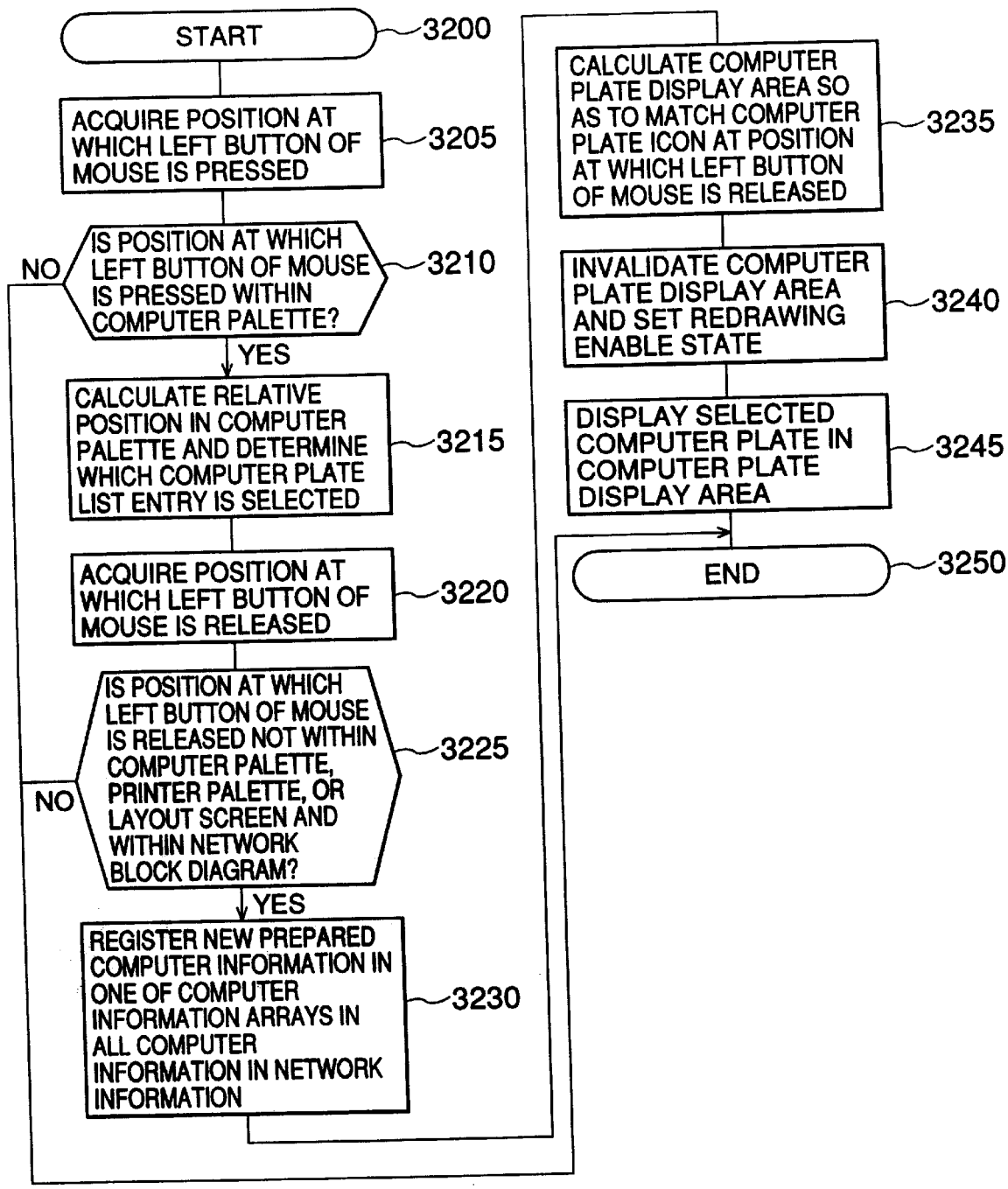
FIG. 32 is a flowchart of internal processing of the computer plate preparation operation in FIG. 31.

FIG. 32 is a flowchart of internal processing indicating how the computer plate preparation operating procedure in FIG. 31 is carried out in the network block diagram screen module 2100 in FIG. 21.

At step 3200, the processing is started.

At step 3205, the module receives a message indicating that the left button of the mouse is pressed from the system, and acquires the press position.

At step 3210, the module determines whether or not the position at which the left button of the mouse is pressed, acquired at step 3205 is within the computer palette. If the left button of the mouse is not pressed within the computer palette, the computer plate preparation process is terminated; if pressed, control advances to step 3215.

At step 3215, the module calculates the relative position within the computer palette based on the position at which the left button of the mouse is pressed, acquired at step 3205, and determines which computer plate list entry is pressed.

At step 3220, the module receives a message indicating that the left button of the mouse is released from the system, and acquires the release position.

At step 3225, the module determines whether or not the position at which the left button of the mouse is released, acquired at step 3220, is within the network block diagram and whether or not the left button of the mouse is released within the computer palette, printer palette, or layout screen. If the determination result is false, the computer plate preparation process is terminated; if it is true, control advances to step 3230.

At step 3230, the module registers newly prepared computer plate data in one of the computer information arrays 2330 in FIG. 23.

At step 3235, the module calculates the computer plate display area based on the position at which the left button of the mouse is released, acquired at step 3220 so that the relative position at which the left button of the mouse is pressed on the computer plate list icon and the relative position at which the left button of the mouse is released on the displayed computer plate icon become the same.

At step 3240, the module invalidates the computer plate display area found at step 3235 in order to request the system to perform redrawing processing.

At step 3245, the selected computer plate is displayed.

At step 3250, the process is terminated.

We have discussed the operating procedure and internal processing of computer plate preparation with reference to FIGS. 31 and 32, but the description can also be applied to those of printer plate preparation simply by changing the computer plate to a printer plate and registering data in one of printer information arrays 2430 in FIG. 24 rather than the computer information array.

Figure 33:
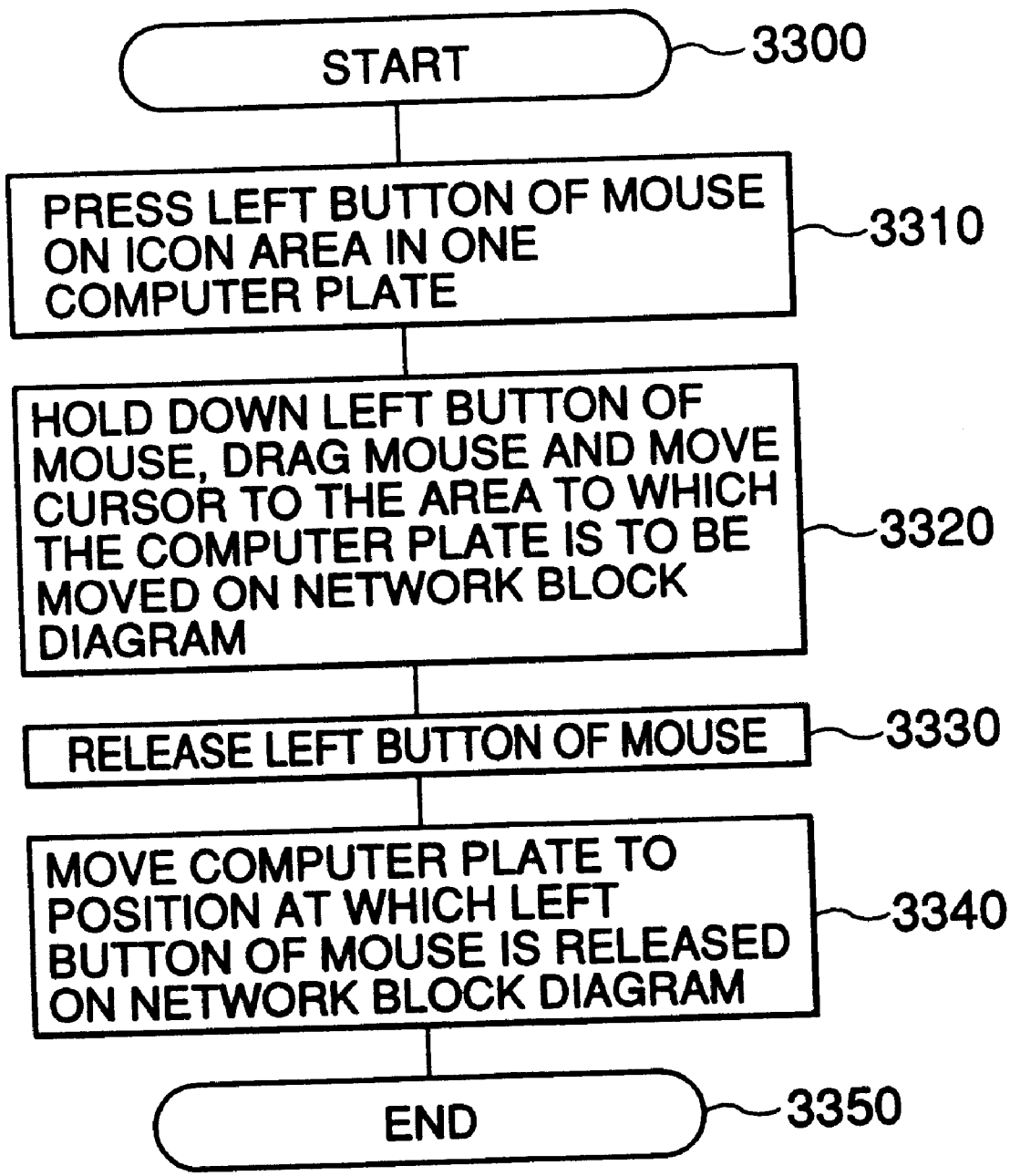
FIG. 33 is a flowchart of a computer plate move operating procedure.

FIG. 33 is a flowchart showing an operating procedure when the operator moves a computer plate 500 in FIG. 5 on the network configuration screen 400 in FIG. 4.

At step 3300, the procedure is started.

At step 3310, first the operator presses the left button of the mouse on the computer icon in one computer plate on the network block diagram screen.

At step 3320, the operator holds down the left button of the mouse while moving the mouse cursor to the area to which the computer plate is to be moved on the network block diagram.

At step 3330, the operator releases the left button of the mouse after moving the mouse cursor.

At step 3340, the computer plate is displayed at the position at which the operator released the left button of the mouse on the network block diagram.

At step 3350, the procedure is terminated.

Figure 34:
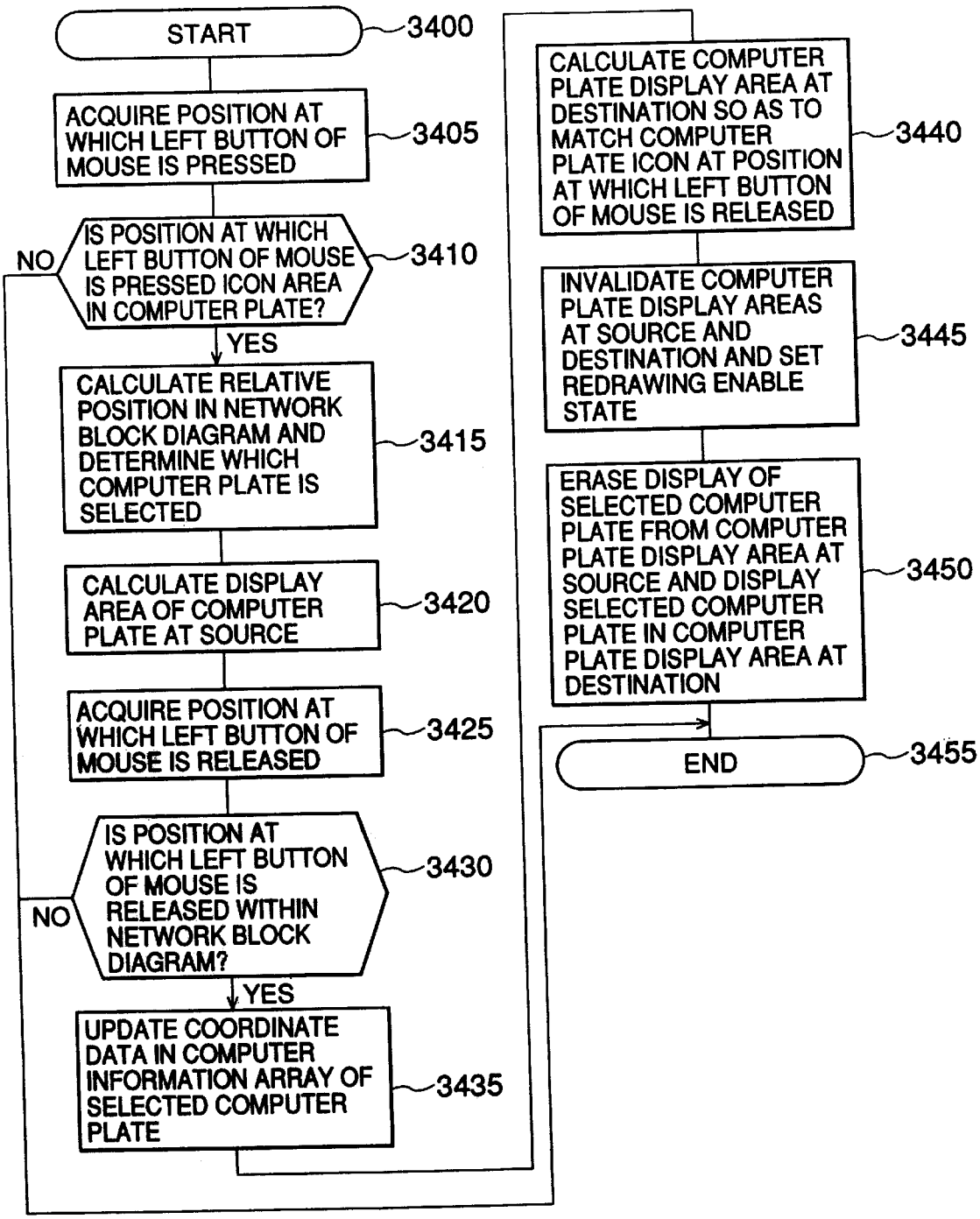
FIG. 34 is a flowchart of internal processing of the computer plate move operation in FIG. 33.

FIG. 34 is a flowchart of internal processing indicating how the computer plate move operating procedure in FIG. 33 is carried out in the network block diagram screen module 2100 in FIG. 21.

At step 3400, the processing is started.

At step 3405, the module receives a message, indicating that the left button of the mouse is pressed, from the system, and acquires the press position.

At step 3410, the module determines whether or not the position at which the left button of the mouse is pressed, acquired at step 3405, is within the icon area in the computer plate. If the determination result is false, the computer plate move process is terminated; if it is true, control advances to step 3415.

At step 3415, the module calculates the relative position within the network block diagram based on the position at which the left button of the mouse is pressed, acquired at step 3405, and determines which computer plate is selected.

At step 3420, the module calculates the display area of the computer plate selected at step 3415, before a move.

At step 3425, the module receives a message indicating that the left button of the mouse is released from the system, and acquires the release position.

At step 3430, the module determines whether or not the position at which the left button of the mouse is released, acquired at step 3425, is within the network block diagram. If the determination result is false, the computer move preparation process is terminated; if it is true, control advances to step 3435.

At step 3435, the module changes the coordinate data in the computer information array of the computer plate being moved (2334 and 2335 in FIG. 23) to new coordinates after the move.

At step 3440, the module calculates the computer plate display area based on the position at which the left button of the mouse is released, acquired at step 3425 so that the relative position at which the left button of the mouse is pressed on the computer plate icon and the relative position at which the left button of the mouse is released on the computer plate icon displayed after the move become the same.

At step 3445, the module invalidates the computer plate display areas found at step 3420 and 3440 for requesting the system to perform redrawing processing.

At step 3450, the display of the computer plate in the display area before the move is erased and the computer plate is displayed in the display area after the move.

At step 3455, the process is terminated.

We have discussed the operating procedure and internal processing of computer plate moving with reference to FIGS. 33 and 34, but the description can also be applied to those of a printer plate move simply by changing the computer plate to a printer plate and updating data in one of printer information arrays 2430 in FIG. 24 rather than the computer information array.

Figure 35:
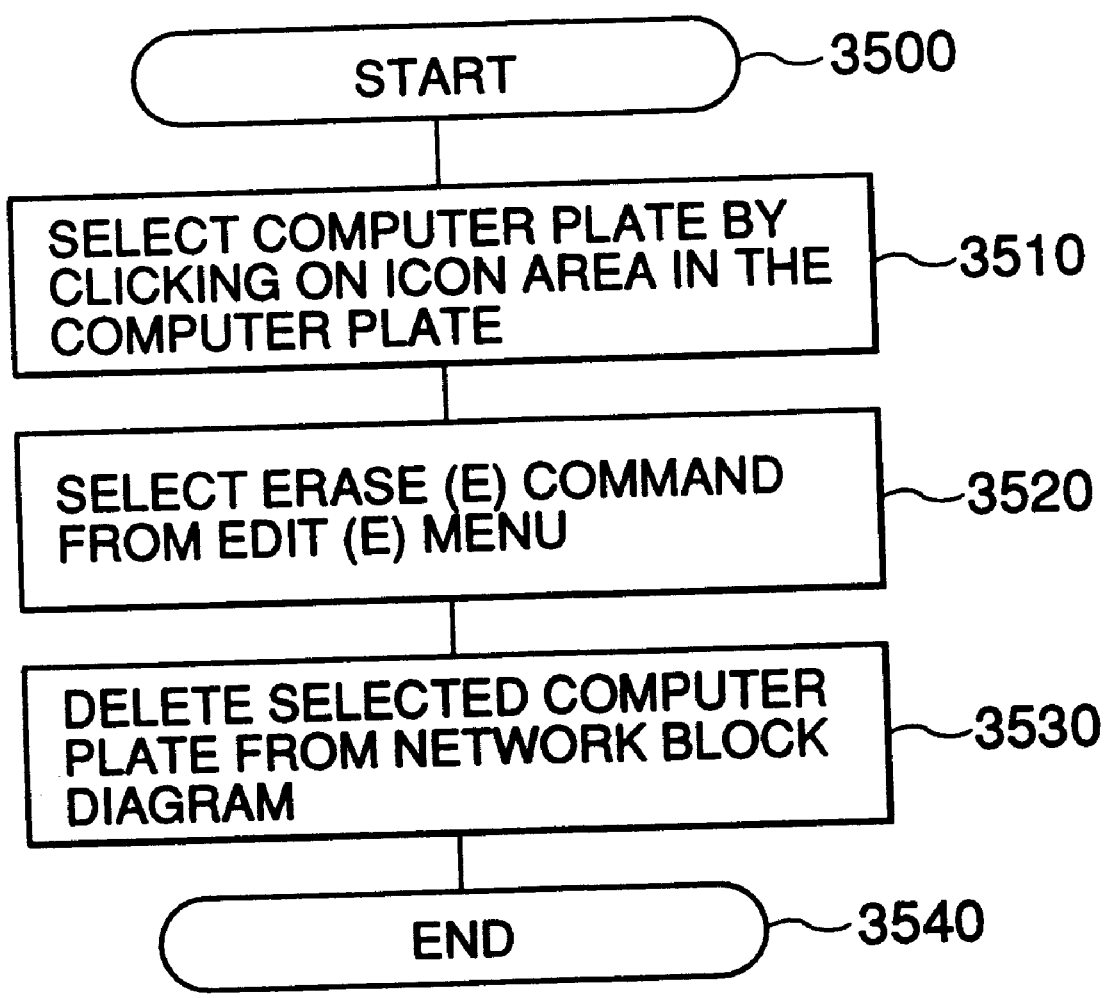
FIG. 35 is a flowchart of a computer plate deletion operating procedure.

FIG. 35 is a flowchart showing an operating procedure when the operator deletes a computer plate 500 in FIG. 5 on the network configuration screen 400 in FIG. 4.

At step 3500, the procedure is started.

At step 3510, first the operator selects a computer plate to be deleted by clicking on the computer icon in the computer plate on the network block diagram screen.

At step 3520, the operator selects Erase (E) 825 from the edit menu 820 in FIG. 10.

At step 3530, the computer plate selected at step 3510 is deleted from the network screen in response to the selection of Erase (E) at step 3520.

At step 3540, the procedure is terminated.

Figure 36:
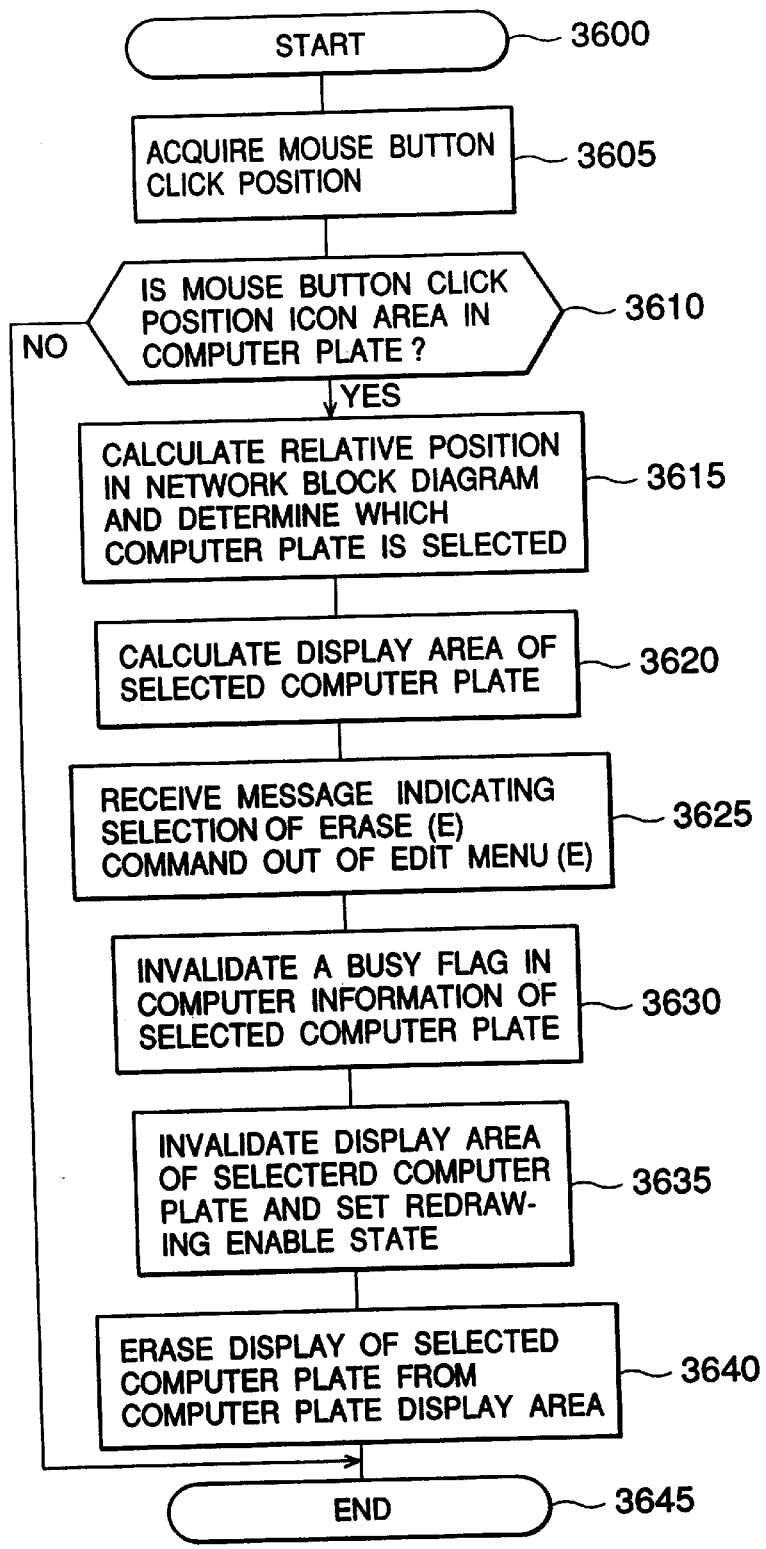
FIG. 36 is a flowchart of internal processing of the computer plate deletion operation in FIG. 35.

FIG. 36 is a flowchart of internal processing indicating how the computer plate deletion operating procedure in FIG. 35 is carried out in the network block diagram screen module 2100 in FIG. 21.

At step 3600, the processing is started.

At step 3605, the module receives a message indicating that the mouse button is clicked from the system, and acquires the click position.

At step 3610, the module determines whether or not the mouse button click position acquired at step 3605 is within the icon area in the computer plate. If the determination result is false, the computer plate deletion process is terminated; if it is true, control advances to step 3615.

At step 3615, the module calculates the relative position within the network block diagram based on the mouse button click position acquired at step 3605, and determines which computer plate is selected.

At step 3620, the module calculates the display area of the computer plate selected at step 3615 before deletion.

At step 3625, the module receives a message indicating that Erase (E) is selected from the edit menu of the system.

At step 3630, the module changes the busy flag in the computer information array of the computer plate to be deleted (2331 in FIG. 23) to the invalid value.

At step 3635, the module invalidates the computer plate display areas found at step 3620 for requesting the system to perform redrawing processing.

At step 3640, the display of the computer plate in the display area before deletion is erased.

At step 3645, the process is terminated.

We have discussed the operating procedure and internal processing of computer plate deletion with reference to FIGS. 35 and 36, but the description can also be applied to those of printer plate deletion simply by changing the computer plate to a printer plate and updating data in one of printer information arrays 2430 in FIG. 24 rather than the computer information array.

Figure 37:
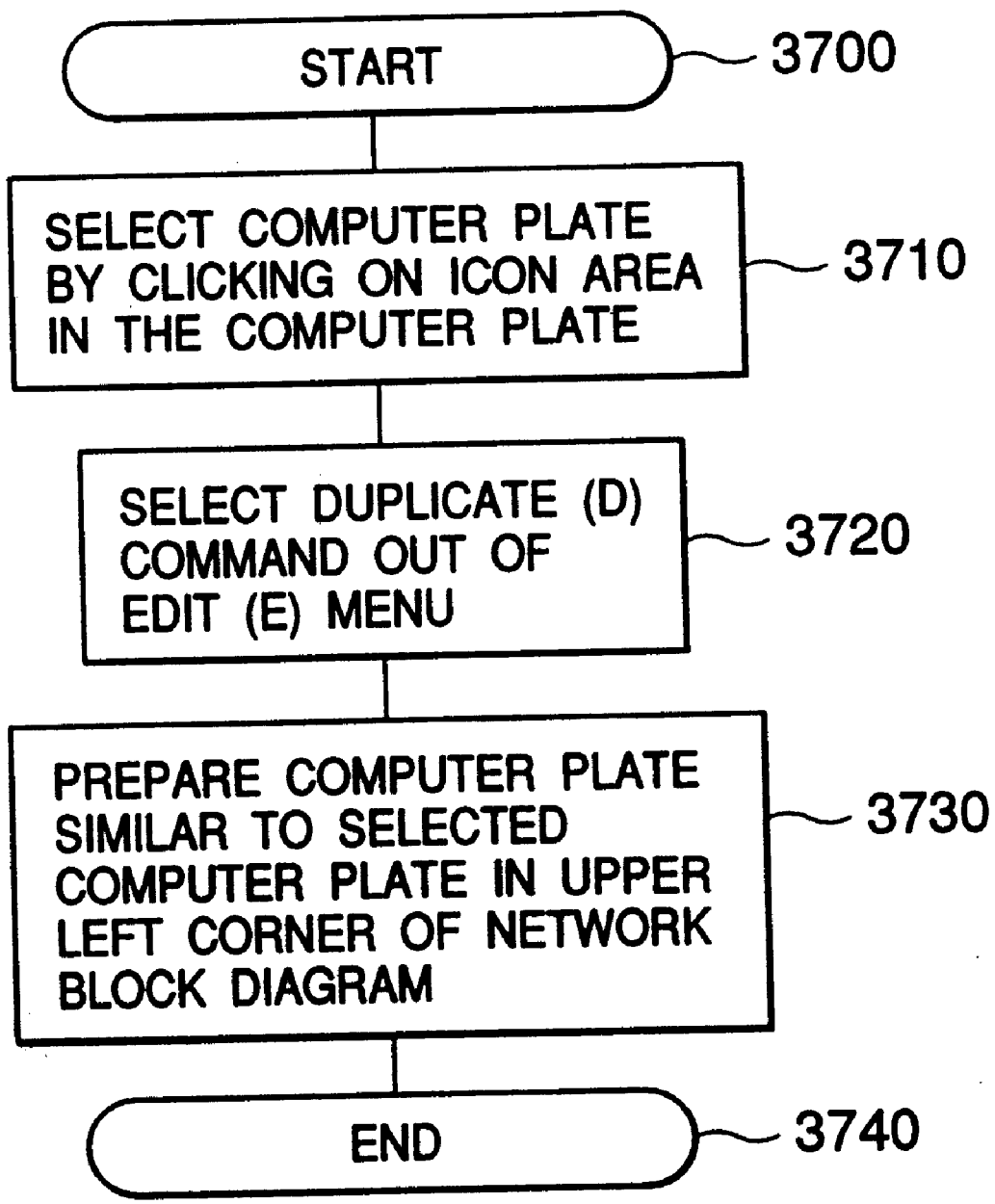
FIG. 37 is a flowchart of a computer plate duplication operating procedure.

FIG. 37 is a flowchart showing an operating procedure when the operator duplicates a computer plate 500 in FIG. 5 on the network configuration screen 400 in FIG. 4.

At step 3700, the procedure is started.

At step 3710, first the operator selects a computer plate to be duplicated by clicking on the computer icon in the computer plate on the network block diagram screen.

At step 3720, the operator selects Duplicate (D) 826 from the edit menu 820 in FIG. 10.

At step 3730, the computer plate selected at step 3710 is duplicated and displayed in the upper left corner of the network screen in response to selection of Duplicate (D) at step 3720.

At step 3740, the procedure is terminated.

Figure 38:
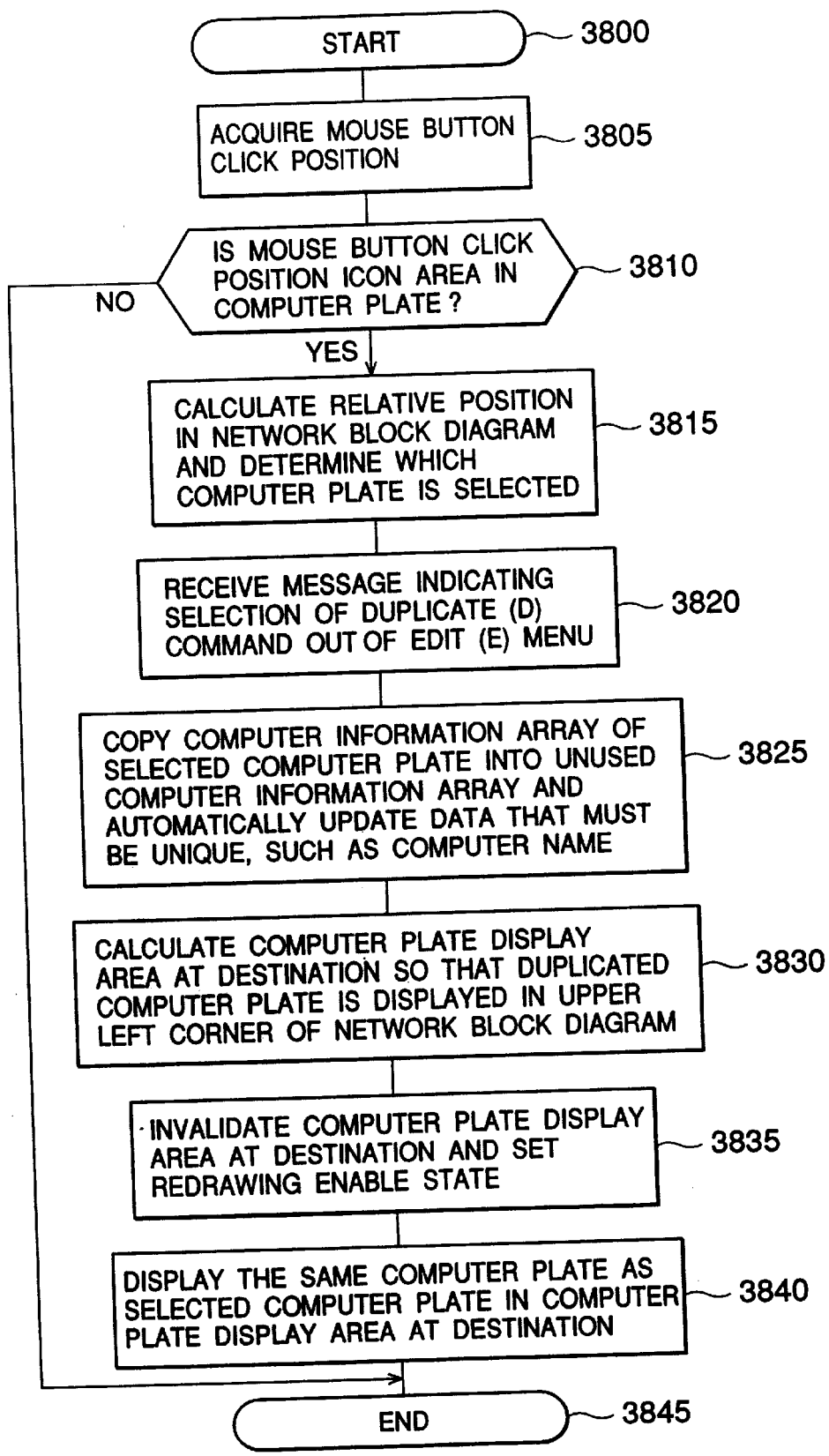
FIG. 38 is a flowchart of internal processing of the computer plate duplication operation in FIG. 37.

FIG. 38 is a flowchart of internal processing indicating how the computer plate duplication operating procedure in FIG. 37 is carried out in the network block diagram screen module 2100 in FIG. 21.

At step 3800, the processing is started.

At step 3805, the module receives a message indicating that the mouse button is clicked from the system, and acquires the click position.

At step 3810, the module determines whether or not the mouse button click position acquired at step 3805 is within the icon area in the computer plate. If the determination result is false, the computer plate duplication process is terminated; if it is true, control advances to step 3815.

At step 3815, the module calculates the relative position within the network block diagram based on the mouse button click position acquired at step 3805, and determines which computer plate is selected.

At step 3820, the module receives a message indicating that Duplicate (D) is selected out of the edit menu from the system.

At step 3825, the module copies the data of the computer plate selected at step 3815 into one of unused computer information arrays 2330 in FIG. 23. At this time, the following is considered: If any function of file server, client, and print server is selected on the computer plate, the module copies file server data into one of the unused file server information arrays 2630 in FIG. 26, client data into one of the unused client information arrays 2830 in FIG. 28, or print server data into one of the unused print server information arrays 3030 in FIG. 30. Then, the module changes the file server information array number 2336, the client information array number 2337, or the print server information array number 2338 to the value pointing to the new information array into which the data is copied. The module also updates the X coordinate position data 2334 and the Y coordinate position data 2335 in FIG. 23 so as to display the computer plate in the upper left corner of the network block diagram screen at the duplication. Further, the module changes the computer name 2331 in FIG. 23, the node number 2740, the link station 2741, the SAP station 2742, the server name 2750, and the IPX number 2751 in FIG. 27, the node number 2904 and the client name 2910 in FIG. 29, and the print server name 3032 in FIG. 30 to unique values because they must not be duplicated in the network.

At step 3830, the module calculates the destination display area of the copied computer plate based on the coordinate data updated at step 3825.

At step 3835, the module invalidates the computer plate display areas found at step 3830 in order to request the system to perform redrawing processing.

At step 3840, the same computer plate as the computer plate selected at step 3815 is displayed.

At step 3845, the process is terminated.

We have discussed the operating procedure and internal processing of computer plate duplication with reference to FIGS. 37 and 38, but the description can also be applied to those of printer plate duplication simply by changing the computer plate to a printer plate and handling data in the printer information arrays rather than in the computer information array.

Figure 39:
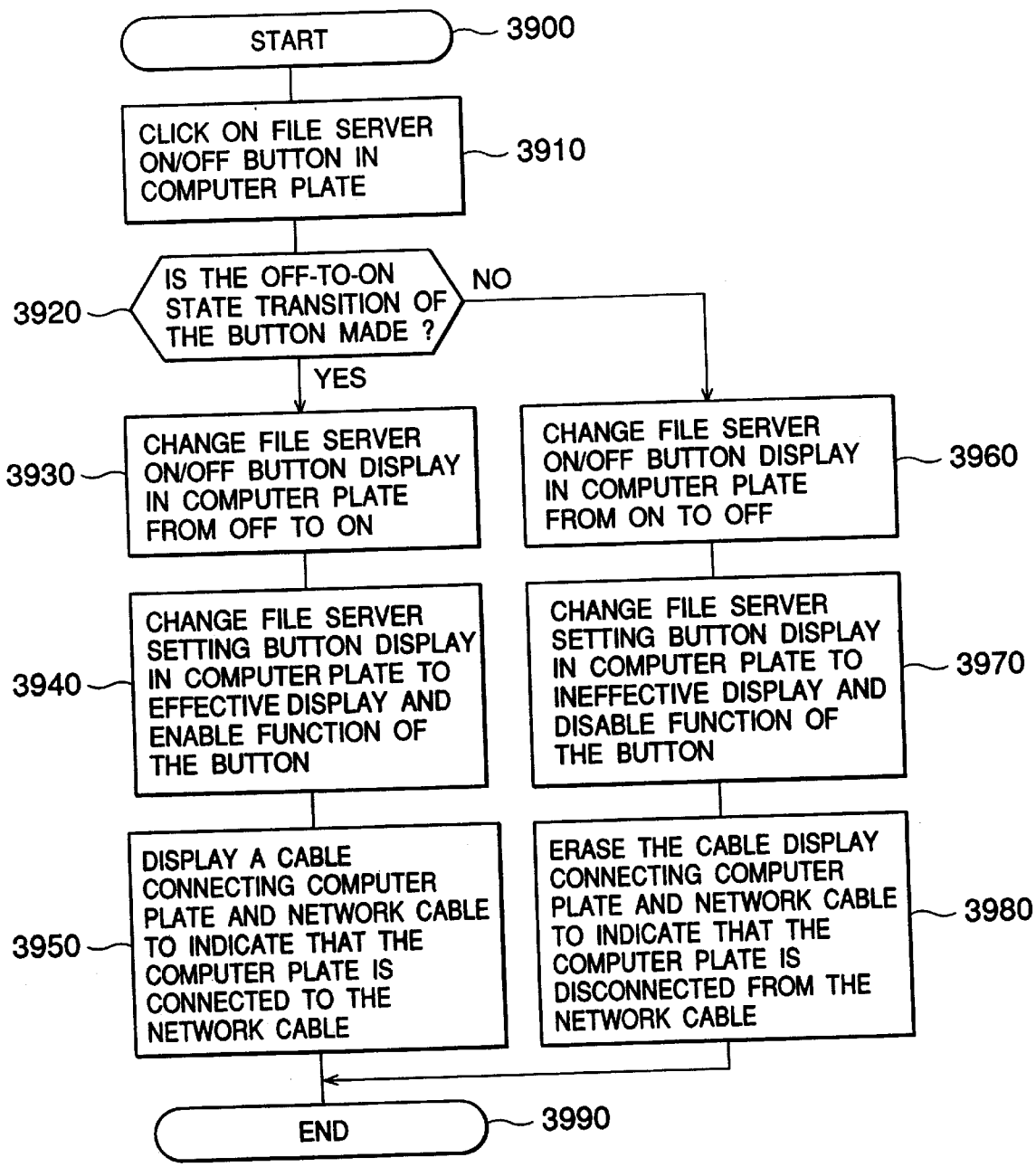
FIG. 39 is a flowchart of file server function selection and selection release operating procedures for a computer plate.

FIG. 39 is a flowchart showing an operating procedure when the operator selects or releases selection of the file server function on a computer plate 500 in FIG. 5.

At step 3900, the procedure is started.

At step 3910, first the operator clicks on the file server On/Off button 520 on the computer plate in FIG. 5. Each time the operator clicks on the file server On/Off button, the Off-to-On or On-to-Off state transition of the button is made.

At step 3920, whether the state transition of the button is made from Off to On or from On to Off by the operator who clicks on the file server On/Off button at step 3910 is determined.

If the Off-to-On state transition is made, control advances to step 3930.

At step 3930, the file server On/Off button display is changed from Off to On.

At step 3940, the characters of the file server setting button 550 in FIG. 5 are changed to a yellow character display, enabling the operator to click on the button 550 for calling the file server setting module.

At step 3950, a connection cable (thin black line) is displayed from the network cable (thick black line) to the computer plate in the network block diagram, as shown in FIG. 4, to indicate that one function of the network system is selected on the computer plate.

At step 3990, the process is terminated.

On the other hand, if the On-to-Off state transition is made at step 3920, control advances to step 3960.

At step 3960, the file server On/Off button display is changed from On to Off.

At step 3970, the characters of the file server setting button 550 in FIG. 5 are changed to a grey character display, disabling the operator from clicking on the button 550 for calling the file server setting module.

At step 3980, the display of the connection cable (thin black line) from the network cable (thick black line) to the computer plate in the network block diagram is erased to indicate that selection of one function of the network system on the computer plate is released.

At step 3990, the process is terminated.

Figure 40:
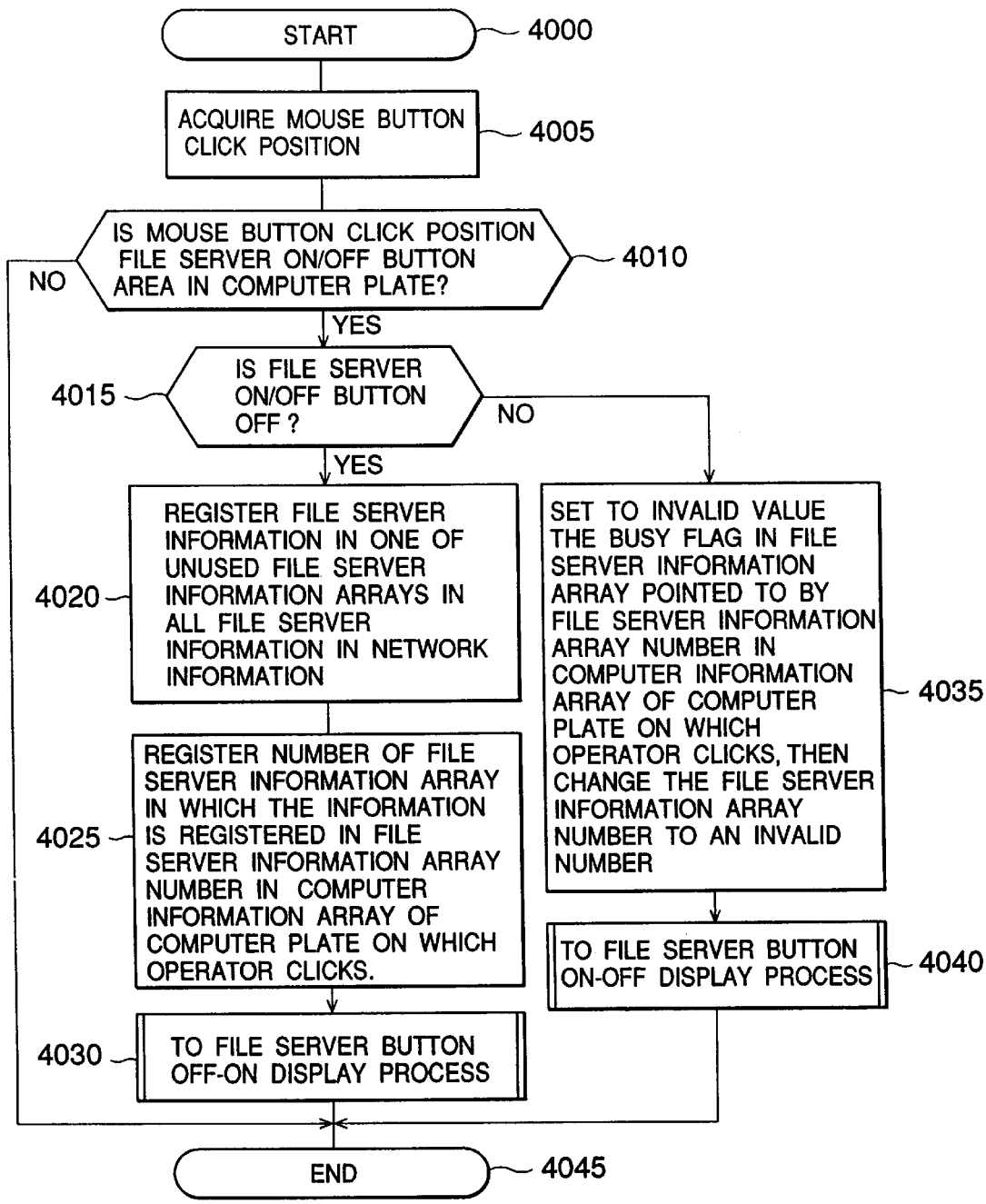
FIG. 40 is a flowchart of internal processing of the file server function selection and selection release operation for the computer plate in FIG. 39.

FIG. 40 is a flowchart of internal processing indicating how the file server function selection and selection release procedures on the computer plate in FIG. 39 are carried out in the network block diagram screen module 2100 in FIG. 21.

At step 4000, the processing is started.

At step 4005, the module receives a message indicating that the mouse button is clicked from the system, and acquires the click position.

At step 4010, the module determines whether or not the mouse button click position, acquired at step 4005, is within the file server On/Off button area in the computer plate. If the determination result is false, the file server function selection and selection release process on the computer plate is terminated; if it is true, control advances to step 4015.

At step 4015, the module determines the, file server On/Off button state when the operator clicks on the button. If the button state is Off, control advances to step 4020.

At step 4020, the module registers the file server data in one of unused file server information arrays 2630 in FIG. 26.

At step 4025, the module registers the number of the file server information array in which the data is registered at step 4020 in the file server information array number 2336 in FIG. 23 in the computer information array of the computer plate on which the operator clicks.

At step 4030, the module executes the file server button Off-On display process. This process will be explained later with reference to FIG. 41.

At step 4045, the process is terminated.

On the other hand, if the button state is On at step 4015, control advances to step 4035.

At step 4035, the module sets to the invalid value the busy flag 2631 in FIG. 26 in the file server information array pointed to by the file server information array number in the computer information array of the computer plate on which the operator clicks, then changes to an invalid number the file server information array number in the computer information array of the computer plate on which the operator clicks.

At step 4040, the module executes the file server button On-Off display process. This process will be explained later with reference to FIG. 41.

At step 4045, the process is terminated.

Figure 41:
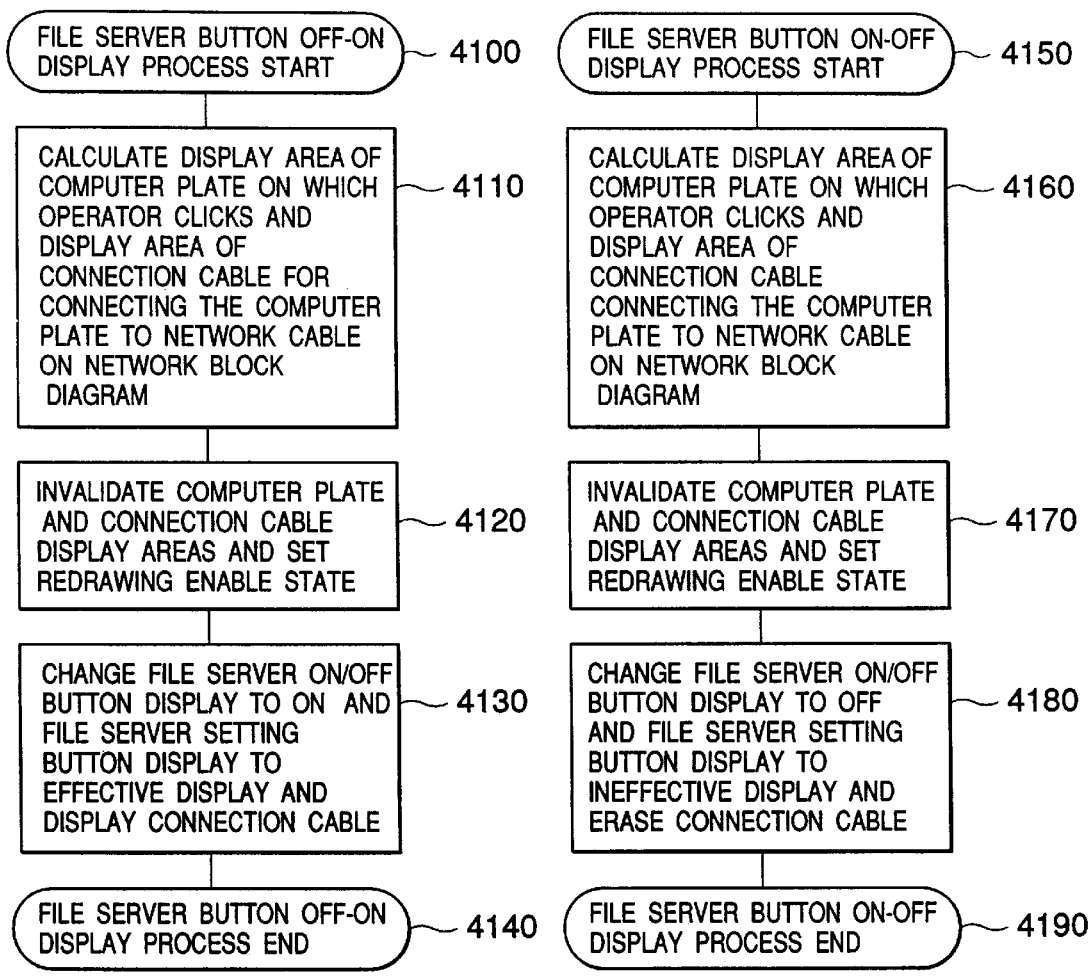
FIG. 41 is a flowchart of internal processing of the file server function selection and selection release operation for the computer plate in FIG. 39.

FIG. 41 shows flows of the file server button Off-On display process 4030 and the file server button On-Off display process 4040 in FIG. 40.

First, the file server button Off-On display process will be discussed.

At step 4100, the process is started.

At step 4110, the module calculates the display area of the computer plate on which the operator clicks and the display area of the connection cable for connecting the computer plate to the network cable on the network block diagram.

At step 4120, the module invalidates the computer plate and connection cable display areas found at step 4110 for requesting the system to perform redrawing processing.

At step 4130, the file server On/Off button display is changed from Off to On and the characters of the file server setting button are changed to a yellow character display, then the connection cable is displayed.

At step 4140, the process is terminated.

Next, the file server button On-Off display process will be discussed.

At step 4150, the process is started.

At step 4160, the module calculates the display area of the computer plate on which the operator clicks and the display area of the connection cable connecting the computer plate to the network cable on the network block diagram.

At step 4170, the module invalidates the computer plate and connection cable display areas found at step 4160 for requesting the system to perform redrawing processing.

At step 4180, the file server On/Off button display is changed from On to Off and the characters of the file server setting button are changed to a grey character display, and the connection cable is then erased.

At step 4190, the process is terminated.

We have discussed the operating procedures and internal processing of file server function selection and selection release on the computer plate with reference to FIGS. 39 to 41, but the description can also be applied to those of client or print server function selection and selection release simply by handling data in the client or print server information array rather than in the file server information array.

Figure 42:
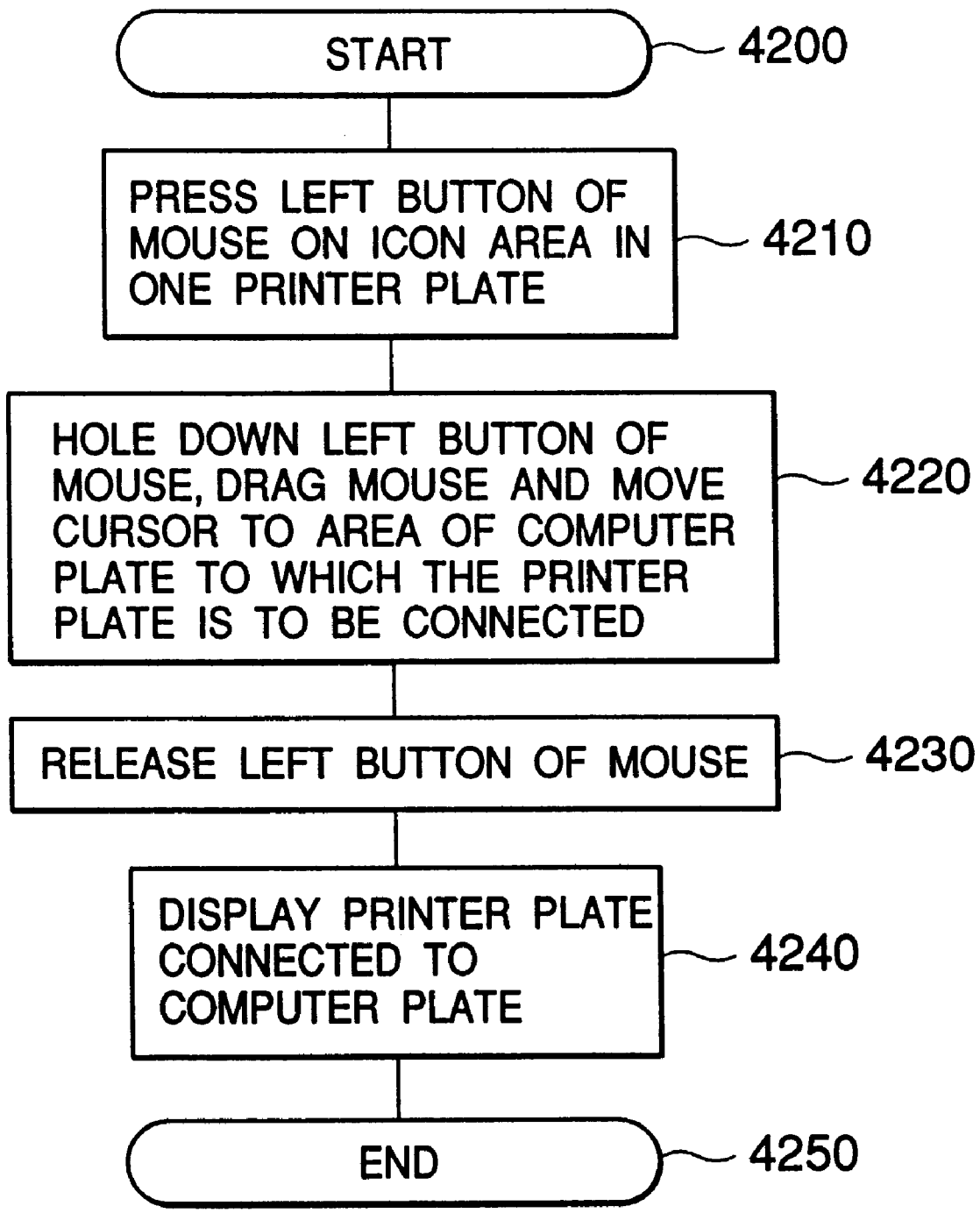
FIG. 42 is a flowchart of a printer plate connection operating procedure to a computer plate.

FIG. 42 is a flowchart showing an operating procedure when the operator connects a printer plate 600 in FIG. 6 to a computer plate 500 in FIG. 5.

At step 4200, the procedure is started.

At step 4210, first the operator presses the left button of the mouse on the printer icon in one printer plate on the network block diagram screen.

At step 4220, the operator holds down the left button of the mouse while moving the mouse cursor to the computer plate to which the printer plate is to be connected on the network block diagram.

At step 4230, the operator releases the left button of the mouse after moving the mouse cursor.

At step 4240, the printer plate connected to the computer plate is displayed as shown in FIG. 4. At this time, the printer plate itself is displayed as shown in FIG. 7.

At step 4250, the procedure is terminated.

Figure 43:
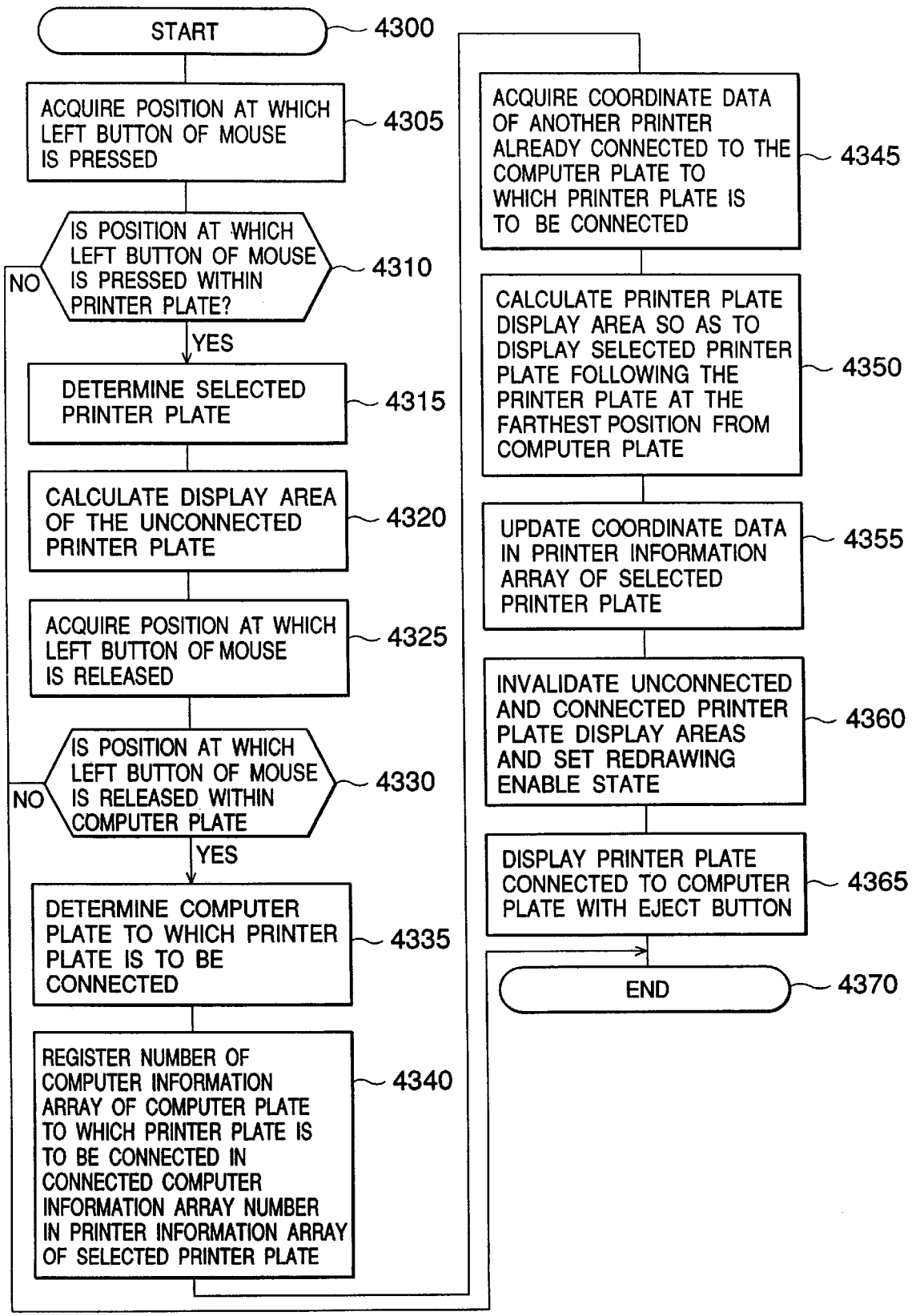
FIG. 43 is a flowchart of internal processing of the printer plate connection operation to the computer plate in FIG. 42.

FIG. 43 is a flowchart of internal processing indicating how the printer plate connection operating procedure to the computer plate in FIG. 42 is carried out in the network block diagram screen module 2100 in FIG. 21.

At step 4300, the processing is started.

At step 4305, the module receives a message indicating that the left button of the mouse is pressed from the system, and acquires the press position.

At step 4310, the module determines whether or not the position at which the left button of the mouse is pressed, acquired at step 4305, is within the icon area in the printer plate. If the determination result is false, the printer plate connection process to the computer plate is terminated; if it is true, control advances to step 4315.

At step 4315, the module calculates the relative position within the network block diagram based on the position at which the left button of the mouse is pressed, acquired at step 4305, and determines which printer plate is selected.

At step 4320, the module calculates the display area of the unconnected printer plate selected at step 4315.

At step 4325, the module receives a message indicating that the left button of the mouse is released from the system, and acquires the release position.

At step 4330, the module determines whether or not the position at which the left button of the mouse is released, acquired at step 4325, is within the computer plate. If the determination result is false, the printer plate connection process to the computer plate is terminated; if it is true, control advances to step 4335.

At step 4335, the module calculates the relative position within the network block diagram based on the position at which the left button of the mouse is pressed, acquired at step 4325, and determines which computer plate is selected.

At step 4340, the module registers the number of the computer information array of the computer plate selected at step 4335 in the connected computer information array number (2436 in FIG. 24) in the printer information array of the printer plate on which the operator presses the left button of the mouse.

At step 4345, if a printer plate is already connected to the computer plate selected at step 4335, the module acquires coordinate data from the printer information array of the printer plate.

At step 4350, the module calculates what position of the computer plate the printer plate selected at step 4305 is to be connected, based on the coordinate data acquired at step 4345 to find the display area of the connected printer plate. The module calculates the printer plate connection position so that the top of the printer plate to be connected is contiguous to the bottom of the display position of the already existing printer plate farthest from the computer plate. At the calculation, the module considers that the connected printer plate display area also contains an area of the eject button 630 in FIG. 7 indicating that the printer plate is connected to the computer plate.

At step 4355, the module updates the coordinate data in the printer information array of the printer plate selected at step 4305 in accordance with step 4350.

At step 4360, the module invalidates the unconnected and connected printer plate display areas found at steps 4320 and 4350 in order to request the system to perform redrawing processing.

At step 4365, the display of the printer plate in the old display area is erased and the connected printer plate in the new display area is displayed.

At step 4370, the process is terminated.

Figure 44:
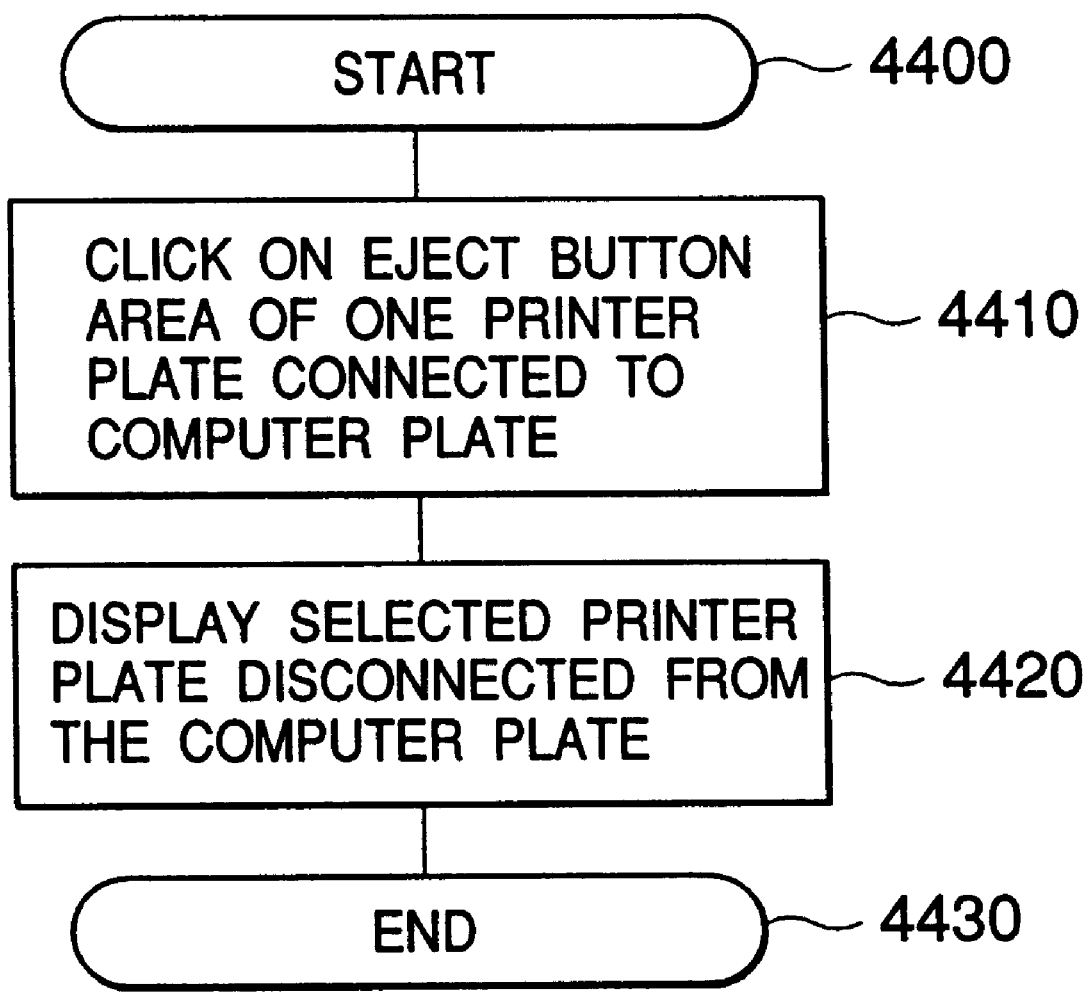
FIG. 44 is a flowchart of a printer plate disconnection operating procedure from a computer plate.

FIG. 44 is a flowchart showing an operating procedure when the operator disconnects a printer plate 600 in FIG. 7 from a computer plate 500 in FIG. 5.

At step 4400, the procedure is started.

At step 4410, first the operator clicks on the eject button of one printer plate connected to the computer plate on the network block diagram screen.

At step 4420, the printer plate having the eject button on which the operator clicks is disconnected from the computer plate on the display of the network block diagram. At this time, the display of the printer plate itself changes to that as shown in FIG. 6.

At step 4430, the procedure is terminated.

Figure 45:
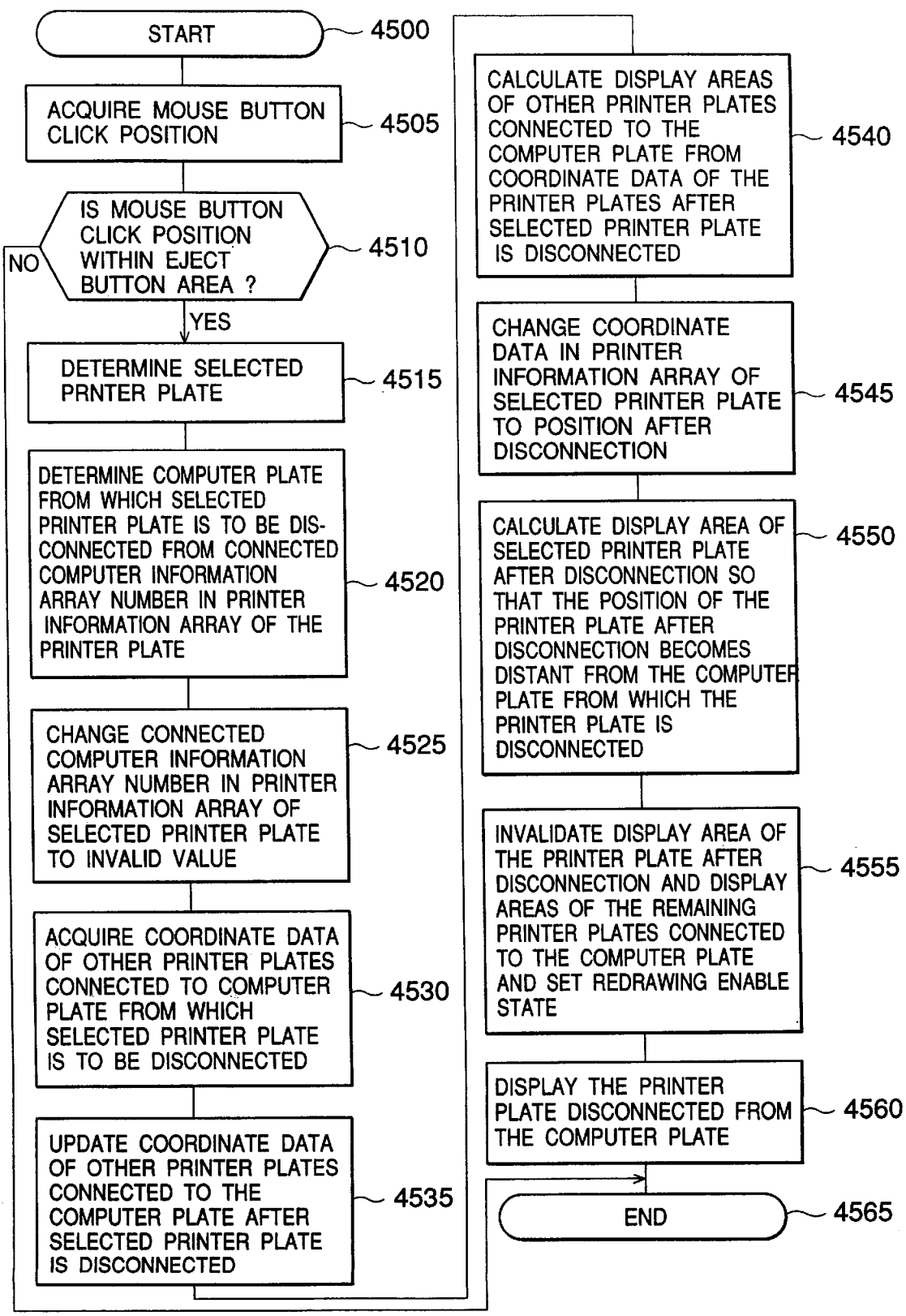
FIG. 45 is a flowchart of internal processing of the printer plate disconnection operation from the computer plate in FIG. 44.

FIG. 45 is a flowchart of internal processing indicating how the printer plate disconnection operating procedure from the computer plate in FIG. 44 is carried out in the network block diagram screen module 2100 in FIG. 21.

At step 4500, the processing is started.

At step 4505, the module receives a message indicating that the mouse button is clicked from the system, and acquires the click position.

At step 4510, the module determines whether or not the mouse button click position, acquired at step 4505, is within the eject button area of the printer plate connected to the computer plate. If the determination result is false, the printer plate disconnection process from the computer plate is terminated; if it is true, control advances to step 4515.

At step 4515, the module calculates the relative position within the network block diagram based on the mouse button click position acquired at step 4505, and determines which printer plate is selected.

At step 4520, the module determines the computer plate from which the printer plate is to be disconnected from the connected computer plate information array number in the printer information array of the printer plate selected at step 4515.

At step 4525, the module changes to an invalid value the connected computer plate information array number in the printer information array of the printer plate selected at step 4515.

At step 4530, the module acquires coordinate data in the printer information arrays of other printer plates connected to the computer plate from which the printer plate is to be disconnected, based on step 4520.

After the printer plate selected at step 4515 is disconnected from the computer plate, at step 4535 the module updates the coordinate data in the printer information arrays of other printer plates connected to the computer plate from which the printer plate is disconnected so that the printer plates connected following the printer plate selected at step 4515 are shifted upward by one printer plate display area.

At step 4540, the module calculates the display areas of other printer plates connected to the computer plate from which the printer plate is disconnected, based on the coordinate data updated at step 4535.

At step 4545, the module updates the coordinate data in the printer information array of the printer plate selected at step 4515 after disconnection so that the printer plate is moved downward and right by one printer plate display area and a half from the computer plate selected at step 4520.

At step 4550, the module calculates the display area of the printer plate selected at step 4515 after disconnection based on the coordinate data updated at step 4545.

At step 4555, the module invalidates the display areas of the remaining printer plates connected to the computer plate after disconnection of the printer plate, found at step 4540 and the display area of the printer plate after disconnection, found at step 4550 in order to request the system to perform redrawing processing.

At step 4560, the display of the printer plate disconnected from the computer plate is erased from the display area of the remaining printer plates connected to the computer plate.

At step 4565, the process is terminated.

Next, the document output function using network installation parameters will be described in detail with reference to FIGS. 46 to 56.

Figure 46:
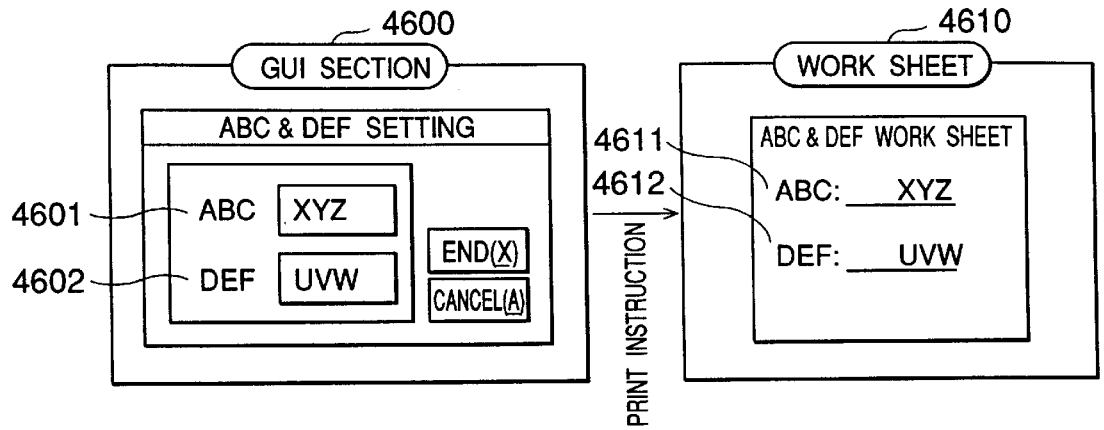
FIG. 46 is a drawing showing an outline of a documentation function of network installation information.

The document output function using network installation parameters is applied to the GUI section 210 in the network installation system as shown in FIG. 2; it is provided by the document output module 6623 in FIG. 66 as a function of printing setup values on paper, based on parameters set on the network block diagram in the GUI section 210 (documentation function) as shown in FIG. 46. In the figure, numeral 4600 is a GUI section and numeral 4610 is a work sheet of print paper. Assume that a value of "XYZ" is set in a parameter ABC 4601 and a value of "UVW" is set in a parameter DEF 4602 in the GUI section. When a print instruction is executed at this time, "XYZ" as the setup value in the parameter ABC as in 4611 and "UVW" as the setup value in the parameter DEF as in 4612 are printed on the work sheet.

Figure 47:
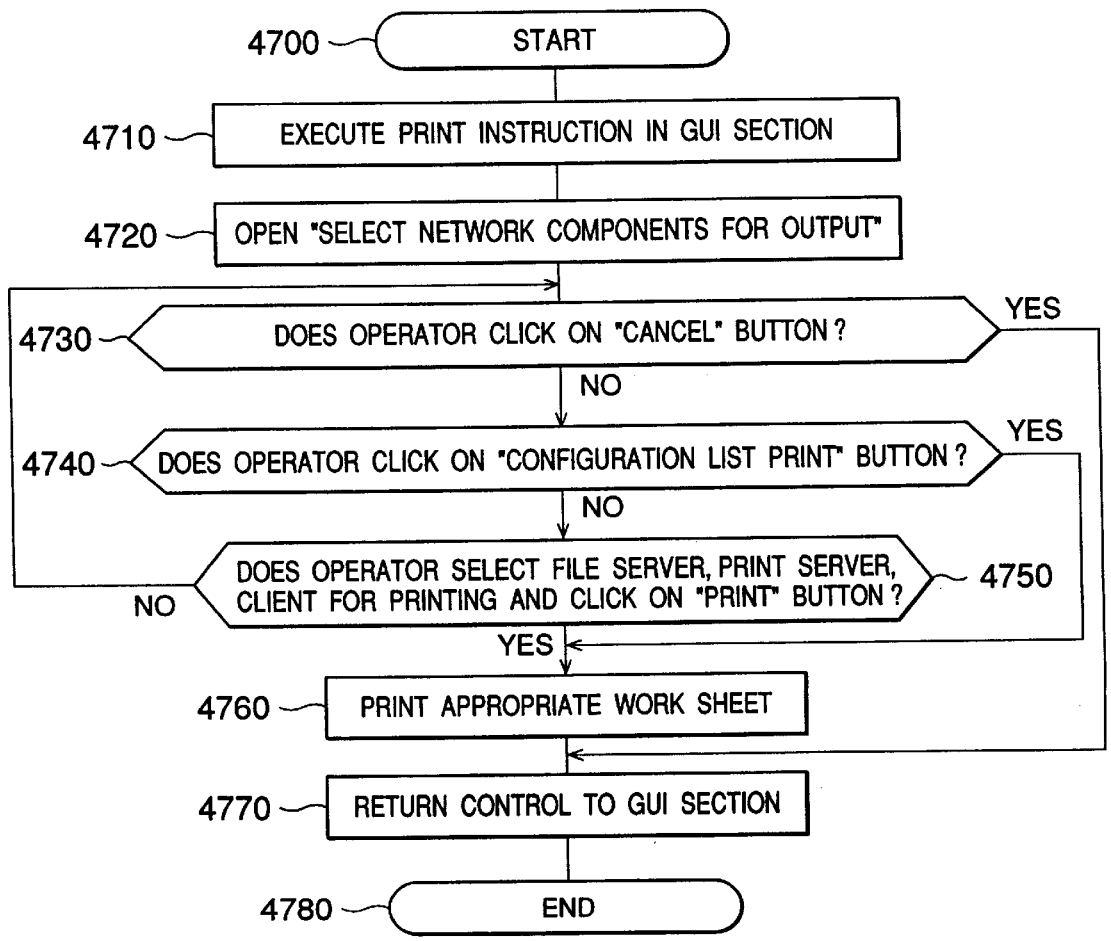
FIG. 47 is a process flowchart of the documentation function of network installation information.

Next, a process flow of the documentation function of network installation information will be discussed with reference to FIG. 47.

The embodiment uses the print function of the MS-Windows (MS-Windows is a registered trademark of Microsoft in USA) print manager for the documentation function, but it can also be provided by an original program.

At step 4700, the process is started. At step 4710, a print instruction is executed on the network block diagram in the GUI section. At step 4720, a SELECT NETWORK COMPONENTS FOR OUTPUT screen is opened for the operator to select file servers, clients, or print servers for printing. If the operator clicks on a CANCEL button to stop the documentation function at step 4730, control is returned to the network block diagram in the GUI section at step 4770 and the process is terminated at step 4780. If the operator does not click on the CANCEL button at step 4730, control goes to step 4740. If the operator clicks on a CONFIGURATION LIST PRINT button at step 4740, an appropriate work sheet is printed using the print function of the MS-Windows print manager at 4760, control is returned to the network block diagram in the GUI section at step 4770, and the process is terminated at step 4780. If the operator does not click on the CONFIGURATION LIST PRINT button at step 4740, control goes to step 4750. When the operator selects a file server, client, or print server and clicks on a print button at step 4750, an appropriate work sheet is printed using the print function of the MS-Windows print manager at 4760, control is returned to the network block diagram in the GUI section at step 4770, and the process is terminated at step 4780.

The documentation function process flow is now complete.

Next, an interface of the SELECT NETWORK COMPONENTS FOR OUTPUT screen opened at step 4720 in FIG. 47 will be discussed with reference to FIG. 48.

Figure 48:
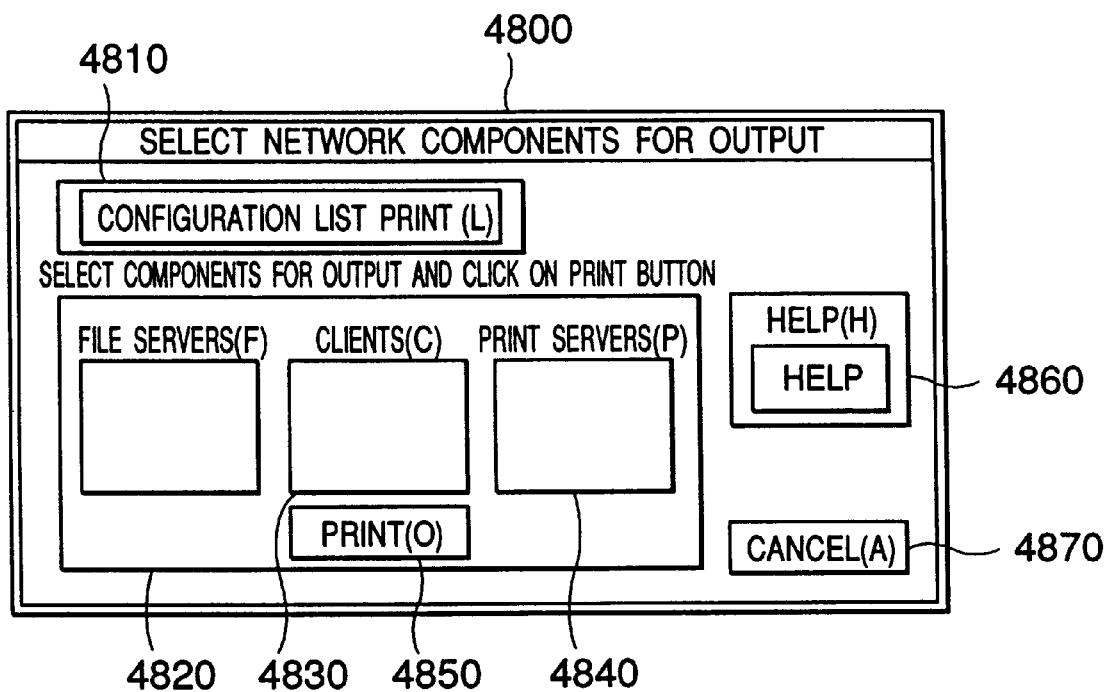
FIG. 48 is a drawing of a SELECT NETWORK COMPONENTS FOR OUTPUT screen.

In FIG. 48, numeral 4800 is a SELECT NETWORK COMPONENTS FOR OUTPUT window. When a print instruction in the print menu on the network block diagram in the GUI section is executed, the window is opened.

Numeral 4810 is the CONFIGURATION LIST PRINT button. When the operator clicks on the button, a list of entries such as the file server, printer server, and client names already set on the network block diagram in the GUI section is printed on a work sheet, one example of which is shown in FIG. 49.

Numeral 4820 is a file server list box which lists the file server names already set on the network block diagram in the GUI section for the operator to select the file servers for printing. The list box enables the operator to select as many list entries as required. When the operator clicks on the PRINT button 4850 after selecting list entries, information on the selected file servers is printed on work sheets, an example of which is shown in FIGS. 50 and 51.

Numeral 4830 is a client list box which lists the clients names already set on the network block diagram in the GUI section for the operator to select the clients for printing. The list box enables the operator to select as many list entries as required. When the operator clicks on the PRINT button 4850 after selecting list entries, information on the selected clients is printed on a work sheet, an example of which is shown in FIG. 52.

Numeral 4840 is a print server list box which lists the print server names already set on the network block diagram in the GUI section for the operator to select the print servers for printing. The list box enables the operator to select as many list entries as required. When the operator clicks on the PRINT button 4850 after selecting list entries, information on the selected print servers is printed on work sheets, an example of which is shown in FIGS. 53 to 56.

Numeral 4850 is the PRINT button. When the operator clicks on the button, information on the file servers, print servers, and clients selected in the list boxes 4820, 4830, and 4840 is printed on work sheets.

Numeral 4860 is a help button. When the operator clicks on the button, an online help screen concerning the SELECT NETWORK COMPONENTS FOR OUTPUT screen is opened.

Numeral 4870 is a CANCEL button. When the operator clicks on the button, the documentation function is stopped, the SELECT NETWORK COMPONENTS FOR OUTPUT window 4800 is closed, and control is returned to the network block diagram in the GUI section.

An example of the network configuration list work sheet is given with reference to FIG. 49.

The work sheet 4900 is output when the operator clicks on the CONFIGURATION LIST PRINT button 4810 on the SELECT NETWORK COMPONENTS FOR OUTPUT window 4800 in FIG. 48.

Numeral 4910 is a name showing the work sheet type.

Numeral 4920 is a handwriting field of the person in charge of designing the network configuration on the network block diagram in the GUI section.

Numeral 4930 is a field for indicating the network name set on the network block diagram in the GUI section. Numerals 4931 to 4939 are fields for indicating information appropriate to the network 4930 set on the network block diagram in the GUI section.

Numerals 4940 and 4950 are table areas for listing information on all file servers set on the network block diagram in the GUI section. Numerals 4941 to 4944 and 4951 to 4958 are entries of the information appropriate to all file servers set on the network block diagram in the GUI section.

Numerals 4960 is a table area for listing information on all clients set on the network block diagram in the GUI section. Numerals 4961 to 4964 are entries of the information appropriate to all clients set on the network block diagram in the GUI section.

Numerals 4970 is a table area for listing information on all print servers set on the network block diagram in the GUI section. Numerals 4971 to 4974 are entries of the information appropriate to all print servers set on the network block diagram in the GUI section.

An example of the file server work sheets is given with reference to FIGS. 50 and 51.

The work sheets 5000 and 5100 are output when the operator selects a file server for printing out of the file server list box 4820 and clicks on the PRINT button 4850 on the SELECT NETWORK COMPONENTS FOR OUTPUT window 4800 in FIG. 48. In the embodiment, information on one file server is indicated on a pair of work sheets 5000 and 5100.

Numerals 5010 and 5110 are each a name showing the work sheet type.

Numerals 5020 and 5120 are each a handwriting field of the person in charge of designing the network configuration on the network block diagram in the GUI section.

Numerals 5030 and 5130 are each a field for indicating the network name set on the network block diagram in the GUI section. Numerals 5031 and 5131 are each a field for indicating the file server name of the current print-out file server set on the network block diagram in the GUI section. Numerals 5032 to 5038 are fields for indicating information appropriate to the current file server 5031 set on the network block diagram in the GUI section.

Numeral 5040 is a table area for listing disk board information of the current print-out file server 5031 set on the network block diagram in the GUI section. Numerals 5041 to 5048 are entries of the disk board information appropriate to the current file server 5031 set on the network block diagram in the GUI section.

Numeral 5050 is a table area for listing disk information of the current file server 5031 set on the network block diagram in the GUI section. Numerals 5041 to 5048 are entries of the disk information appropriate to the current file server 5031 set on the network block diagram in the GUI section.

Numerals 5060, 5065, 5070, 5075, 5080, 5085, and 5090 are table areas for listing disk partition information of the current file server 5031 set on the network block diagram in the GUI section. Numerals 5061, 5062, 5066, 5067, 5071, 5072, 5076, 5077, 5081, 5082, 5086, 5087, 5091, and 5092 are entries of the disk partition information appropriate to the current file server 5031 set on the network block diagram in the GUI section.

Numeral 5140 is a table area for listing LAN board hardware setup information of the current file server 5031 set on the network block diagram in the GUI section. Numerals 5141 to 5148 are entries of the LAN board hardware setup information appropriate to the current file server 5031 set on the network block diagram in the GUI section.

Numeral 5150 is a table area for listing LAN board software setup information of the current file server 5031 set on the network block diagram in the GUI section. Numerals 5151 to 5155 are entries of the LAN board software setup information appropriate to the current file server 5031 set on the network block diagram in the GUI section.

Numeral 5160 is a table area for listing LAN board token ring setup information of the current file server 5031 set on the network block diagram in the GUI section. Numerals 5161 to 5164 are entries of the LAN board token ring setup information appropriate to the current file server 5031 set on the network block diagram in the GUI section.

An example of the client work sheet is given with reference to FIG. 52.

The work sheet 5200 is output when the operator selects a client for printing out of the client list box 4830 and clicks on the PRINT button 4850 on the SELECT NETWORK COMPONENTS FOR OUTPUT window 4800 in FIG. 48. In the embodiment, information on one client is indicated on a work sheet 5200.

Numeral 5210 is a name showing the work sheet type.

Numeral 5220 is a handwriting field of the person in charge of designing the network configuration on the network block diagram in the GUI section.

Numeral 5230 is a field for indicating the network name set on the network block diagram in the GUI section. Numeral 5031 is a field for indicating the client name of the current print-out client set on the network block diagram in the GUI section. Numerals 5232 to 5237 are fields for indicating information appropriate to the current client 5231 set on the network block diagram in the GUI section.

Numeral 5240 is a table area for listing LAN board hardware setup information of the current client 5231 set on the network block diagram in the GUI section. Numerals 5241 to 5149 are entries of the LAN board hardware setup information appropriate to the current client 5231 set on the network block diagram in the GUI section.

Numeral 5250 is a table area for listing LAN board software setup information of the current client 5231 set on the network block diagram in the GUI section. Numerals 5251 and 5252 are entries of the LAN board software setup information appropriate to the current client 5231 set on the network block diagram in the GUI section.

An example of the print server work sheets is given with reference to FIGS. 53 to 56.

The work sheets 5300, 5400, 5500, and 5600 are output when the operator selects a print server for printing from the print server list box 4840 and clicks on the PRINT button 4850 on the SELECT NETWORK COMPONENTS FOR OUTPUT window 4800 in FIG. 48. In the embodiment, information on one file server is indicated on a set of four work sheets 5300, 5400, 5500, and 5600.

Numerals 5310, 5410, 5510, and 5610 are each a name showing the work sheet type.

Numerals 5320, 5420, 5520, and 5620 are each a handwriting field of the person in charge of designing the network configuration on the network block diagram in the GUI section.

Numerals 5330, 5430, 5540, and 5630 are each a field for indicating the network name set on the network block diagram in the GUI section. Numerals 5331, 5431, 5531, and 5631 are each a field for indicating the print server name of the current print-out print server set on the network block diagram in the GUI section. Numerals 5332 to 5336 are fields for indicating information appropriate to the current print server 5331 set on the network block diagram in the GUI section.

Numeral 5340 is a table area for listing printer information of the current print-out print server 5331 set on the network block diagram in the GUI section. Numerals 5341 to 5343 are entries of the printer information appropriate to the current print server 5331 set on the network block diagram in the GUI section.

Numeral 5350 is a table area for listing network connection information for each printer of the current print server 5331 set on the network block diagram in the GUI section. Numerals 5351 to 5356 are entries of the network connection information for each printer appropriate to the current print server 5331 set on the network block diagram in the GUI section.

Numeral 5440 is a table area for listing net port information for each printer of the current print server 5331 set on the network block diagram in the GUI section. Numerals 5441 and 5442 are entries of the net port information for each printer appropriate to the current print server 5331 set on the network block diagram in the GUI section.

Numeral 5450 is a table area for listing serial port setup information for each printer of the current print server 5331 set on the network block diagram in the GUI section. Numerals 5451 to 5455 are entries of the serial port setup information for each printer appropriate to the current print server 5331 set on the network block diagram in the GUI section.

Numeral 5540 is a table area for listing print job environment information for each printer of the current print server 5331 set on the network block diagram in the GUI section. Numerals 5541 to 5544 are entries of the print job environment information for each printer appropriate to the current print server 5331 set on the network block diagram in the GUI section.

Numerals 5640 and 5650 are each a table area for listing print queue information for each printer of the current print server 5331 set on the network block diagram in the GUI section. Numerals 5641 to 5643 and 5651 and 5652 are entries of the print queue information for each printer appropriate to the current print server 5331 set on the network block diagram in the GUI section.

In the embodiment, the setup contents in the GUI section are used as the entries of the network block diagram, but if the information is network environment information, such as network user group information, directory information, or application information, the documentation function can be used, likewise.

The document output function using network installation parameters enables the following:

Since a report of the configuration and environment information in a network is prepared based on the information in the GUI section, information can be provided while the network configuration and environment are being determined when network installation is planned or designed.

Further, if a part of the network configuration or environment is changed, a report can be immediately prepared in response to the change contents.

In addition, the prepared report, which contains the information set in the GUI section, provides a report with few mistakes.

Thus, negotiations with customers are enabled based on the report and customer service quality can be improved.

Next, the new addition function of network component information will be described with reference to FIGS. 57 to 65.

The new addition function of network component information is applied to the GUI section 210 and the parameter file section 120 in the network installation system as shown in FIG. 2.

In the embodiment, addition of expansion boards such as LAN boards as new network components will be described in detail.

Figure 57:
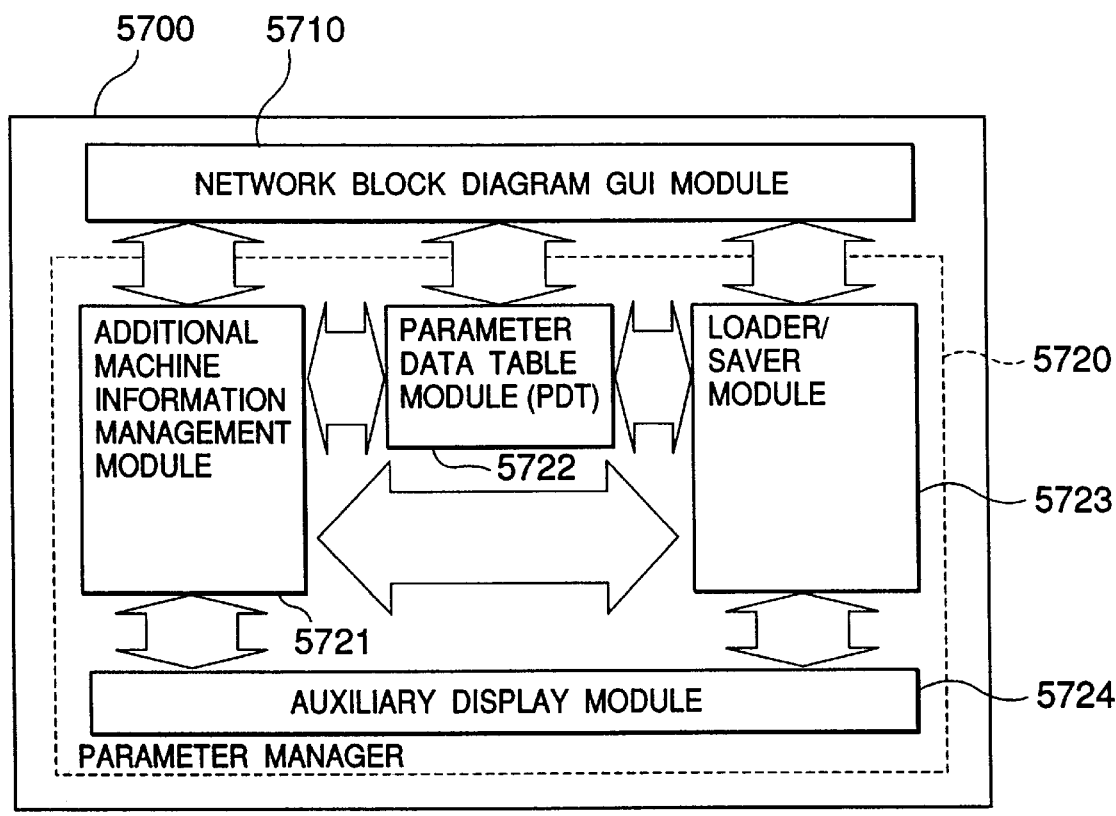
FIG. 57 is a block diagram of the GUI section in the network installation system.

In FIG. 57, the module relationship diagram in FIG. 66 is roughly classified into a network block diagram GUI module 5710 for screen display, etc., and a parameter manager 5720 for handling parameter data in parameter files, etc., from the viewpoint of the new addition function of network component information. The parameter manager 5720 is further divided into the modules: An additional machine information management module 5721 for managing parameter information of new machines to be added, a parameter data table (PDT) module 5722 for managing parameter values that can be set and their combination information, a loader/saver module 5723 for recording and reading parameter files, and an auxiliary display module 5724 for executing auxiliary screen display.

The modules in the parameter manager 5720 are discussed below:

The parameter manager 5720 is a module for performing parameter file input/output management and batched management of all data in ill network installation parameters.

The additional machine information management module 5721 reads a new machine information definition file (HDF) and adds or deletes network installation parameter information for the new machine, to or from the PDT 5722.

The PDT module 5722 manages the relationships among the network installation parameters required for the conversion. The loader/saver module 5723 references the PDT 5722 and makes cross conversion between data for loading/saving parameter files. The PDT 5722 consists of functions for integrating data stored in tables of character strings and numeric values and parameter files displayed on the user interface, and initializing and updating the data tables.

The loader/saver module 5723 is a module for managing parameter file input/output and making cross conversion between data stored in the parameter files and data in the module.

The auxiliary display module 5724 is a library module for displaying user interface screens used by the parameter manager. It is used when dialog display for file selection, etc., is required with the parameter load/save function or the new parameter addition function.

Figure 58:
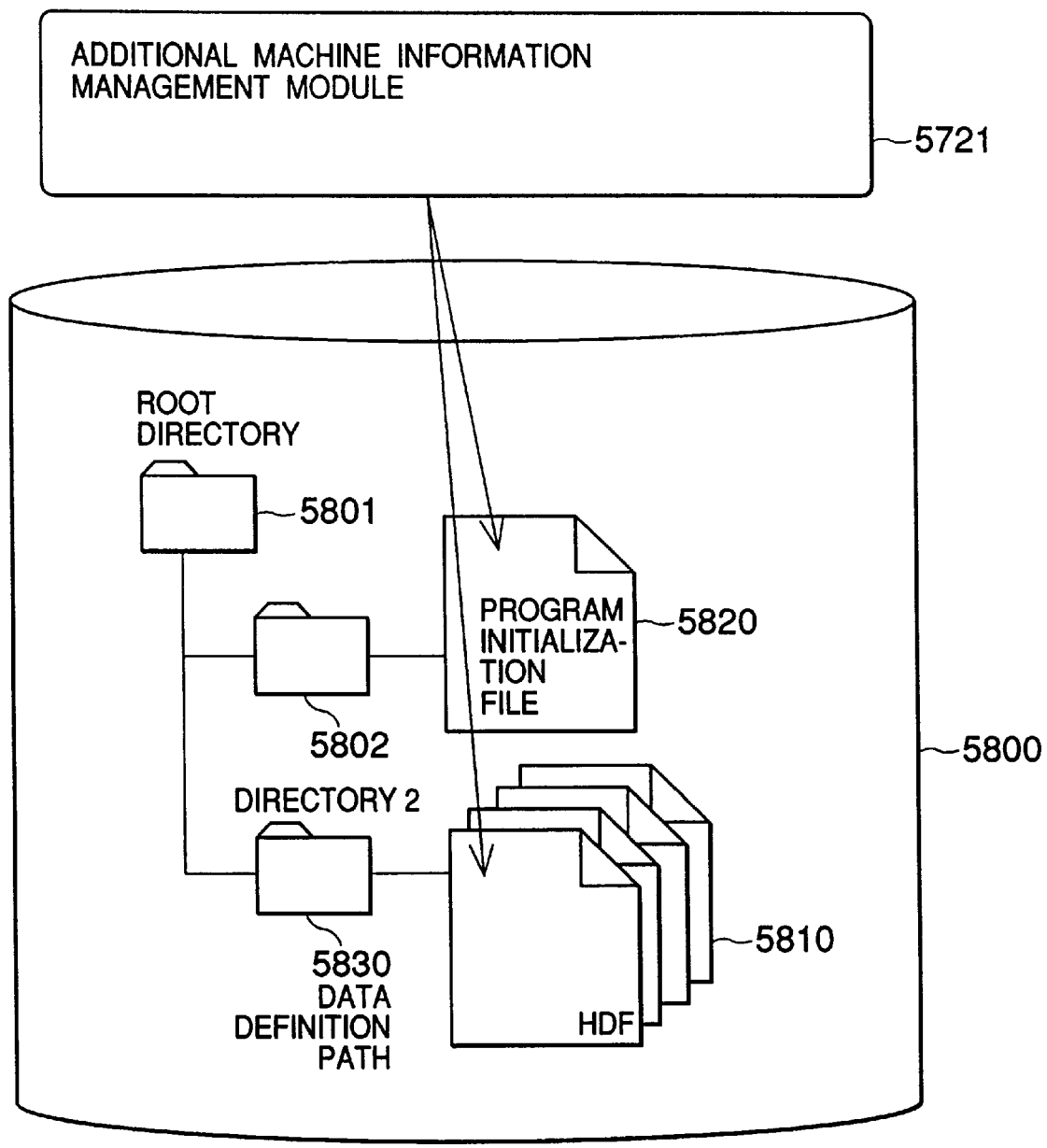
FIG. 58 is a diagram showing the relationships among files referenced by an additional machine information management module.

FIG. 58 is a diagram showing the relationships among files referenced by the additional machine information management module. The function of the additional machine information management module is described in detail below with reference to FIG. 58:

Network component information is added by reading a hardware information definition file in which machine information is defined (described below) from the outside. The external files are hardware information definition files (HDFs) 5810 and a program initialization file 5820. A data definition path 5830 is set as a directory for storing the HDFs 5810.

The HDFs 5810 are files which store information definitions of network installation parameters of added network components.

The program initialization file 5820 defines the file names of the HDFs read at the time of starting, and a data definition path, which is the HDF store directory path. The program initialization file 5820 is retrieved in order of the path on which the execution module in the GUI section exists and the path defined in the environment variable PATH.

The data definition path 5830 is an HDF store directory path, which is specified in the program initialization file 5810. The default data definition path, which is applied if the path is not specified in the program initialization file 5810, is a path on which the GUI program exists.

FIGS. 59 and 60 are examples of entries defined in HDFs. FIG. 59 is a table which lists the entries defined in a disk device HDF. FIG. 60 is a table which lists the entries defined in a LAN board HDF. Addition of board information of a file server (FS) disk driver, FS LAN board driver, and workstation (WS or client) LAN driver is shown for example.

FIG. 61 shows an example of the program initialization file. Program initialization file format 6100 is discussed with reference to FIG. 61. The program initialization file is an environment setting file for saving data definition path settings 6101, 6102 and HDF names 6103, 6104, 6105, 6106 added as additional machine information. The program initialization file is updated when execution of the GUI section is terminated. The program initialization file format is as follows:

On the first line 6101, [DataPath] is described to indicate the beginning of a data definition path area.

On the second line 6102, the full path name is described following DataPath=as data definition path specification.

On the third line 6103, [AdditionalData] is described to indicate the beginning of an HDF name setting area.

On the fourth line and later 6104, 6105, and 6106, HDF names are specified. On the fourth line 6104, one HDF name is described following Additional1=, and on the fifth line 6105, another HDF name is described following Additional2=. Likewise, another HDF name is described following Additionaln=(where n is an integer indicating the order of the HDF to be specified).

Figure 62:
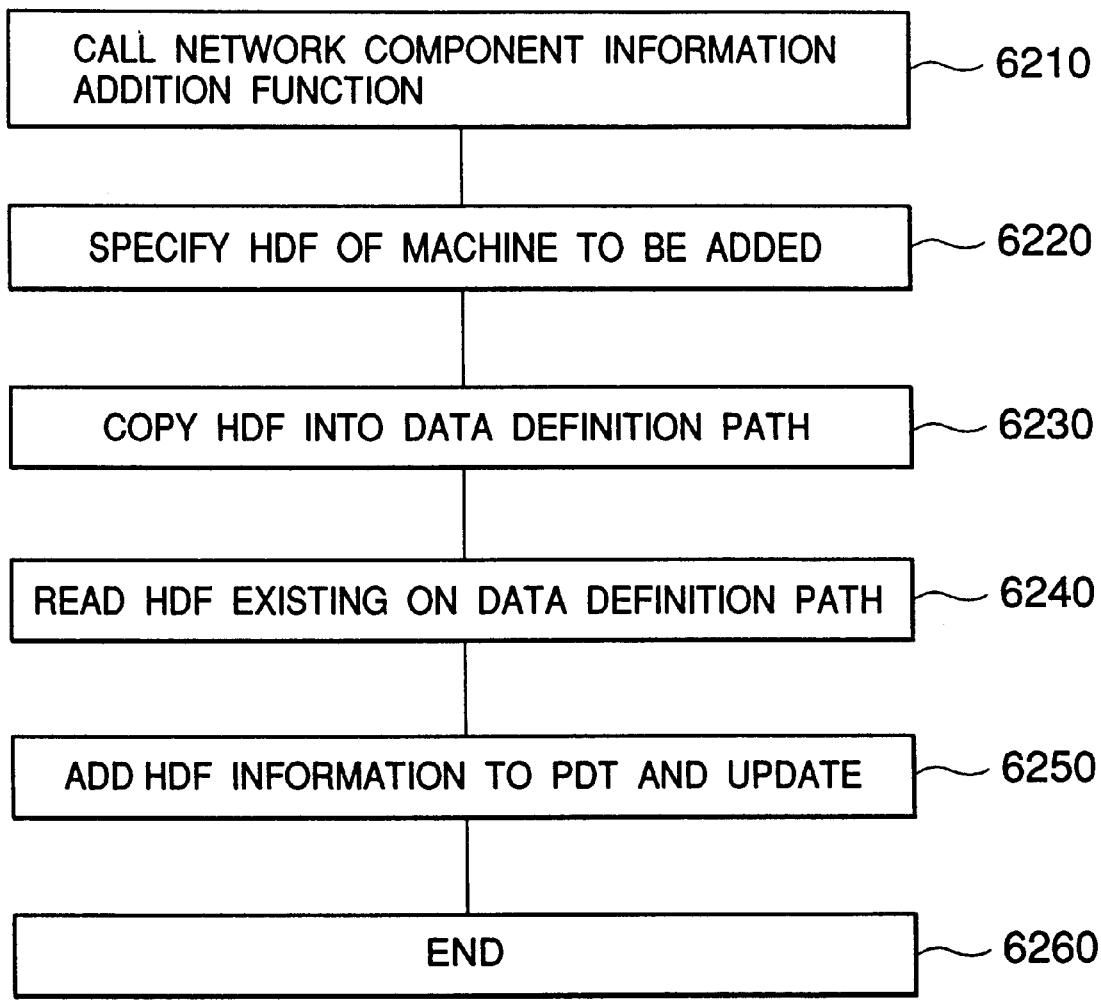
FIG. 62 is a flowchart showing an addition processing procedure of network components.

FIG. 62 is a flowchart showing a process outline of the network component information addition function.

When the network component information addition function is called on a board registration menu on the network block diagram in the GUI section at step 6210, the user or calling program specifies the HDF of the machine to be added at step 6220. Then, the HDF is copied into the data definition path at step 6230, the HDF existing on the data definition path is read at step 6240, and the PDT is updated at step 6250. The process is described in detail below:

At step 6210, the network component information addition function is called from the operation menu of the GUI section.

At step 6220, a dialog screen is opened for the user or calling party to specify an HDF and the user or calling party specifies the HDF.

At step 6230, the HDF specified by the user or calling party is copied into data definition path, whereby the HDF can be reread whenever necessary.

At step 6240, the HDF specified by the user or calling party is read from the data definition path.

At step 6250, information of the read HDF is added to the PDT for updating.

The network component information addition process is now complete at step 6260.

When execution of the GUI section terminates, the read HDF information is saved in the program initialization file. When the GUI section is next started, the program initialization file is referenced and the additional board information is automatically added to the PDT.

Figure 63:
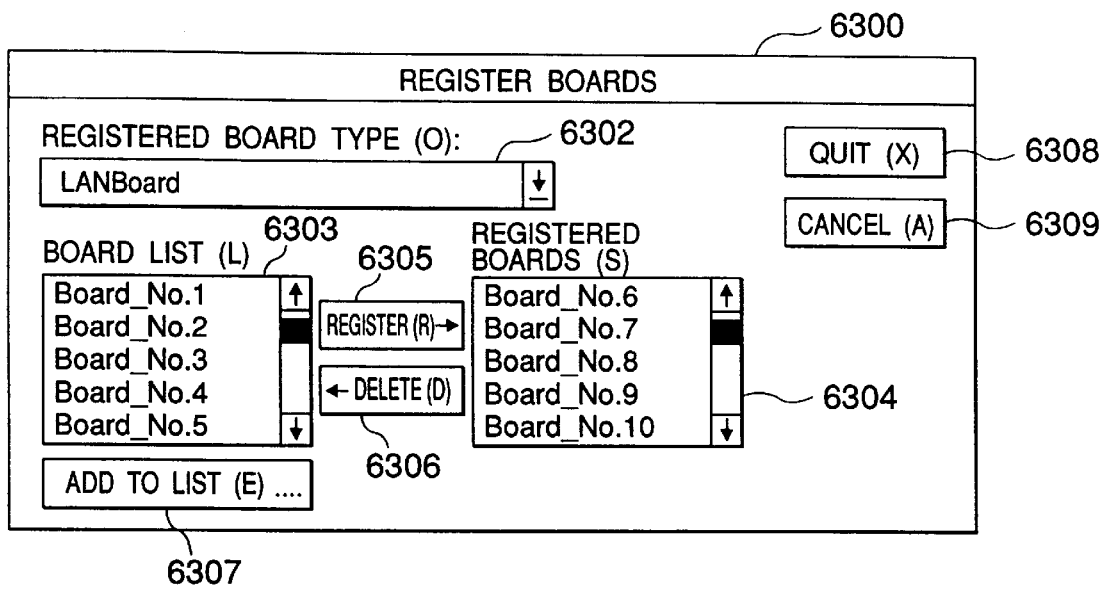
FIG. 63 is a drawing showing a register boards dialog screen.

Next, a dialog operation method for specifying the HDF at step 6220 in FIG. 62 will be discussed. FIG. 63 shows a REGISTER BOARDS dialog 6301 for specifying an HDF set in the PDT.

A combo box 6302 on the top of the dialog provides a drop down menu for specifying the type of board information to be registered. In the example, the type of additional network component information is selected from among "workstation LAN board," "file server LAN board," and "file server disk board."

The file names of HDFs which exist on parameter definition path and can be added to the PDT are listed in a list box 6303 on the left of the dialog.

The file names of HDFs which have been added to the PDT and can be used to set network installation parameters are listed in a list box 6304 on the right of the dialog.

When no entries in the dialog boxes are selected, two buttons 6305 and 6306 placed between the two list boxes become ineffective.

When one or more entries in the left list box 6303 are selected, the REGISTER button 6305 becomes effective. When the operator clicks on the REGISTER button, the selected entry moves from the left list box to the right list box, indicating that the network component information is added to the PDT.

When one or more entries in the right list box 6304 are selected, the DELETE button 6306 becomes effective. When the operator clicks on the DELETE button, the selected entry moves from the right list box to the left list box, indicating that the network component information is deleted from to the PDT.

An ADD TO LIST (E) . . . button 6307 under the left list box is a button for copying the HDF into the data definition path and adding its entry to the left list box. When the operator clicks on the ADD TO LIST button, an ADD TO BOARD LIST dialog shown in FIG. 64 is opened.

When the operator clicks on a QUIT button 6308, HDF read from the data definition path and data addition to the PDT are started and the cursor changes to a sandglass icon.

If the operator clicks on a CANCEL button 6309, HDF read and data addition to the PDT are not performed.

Figure 64:
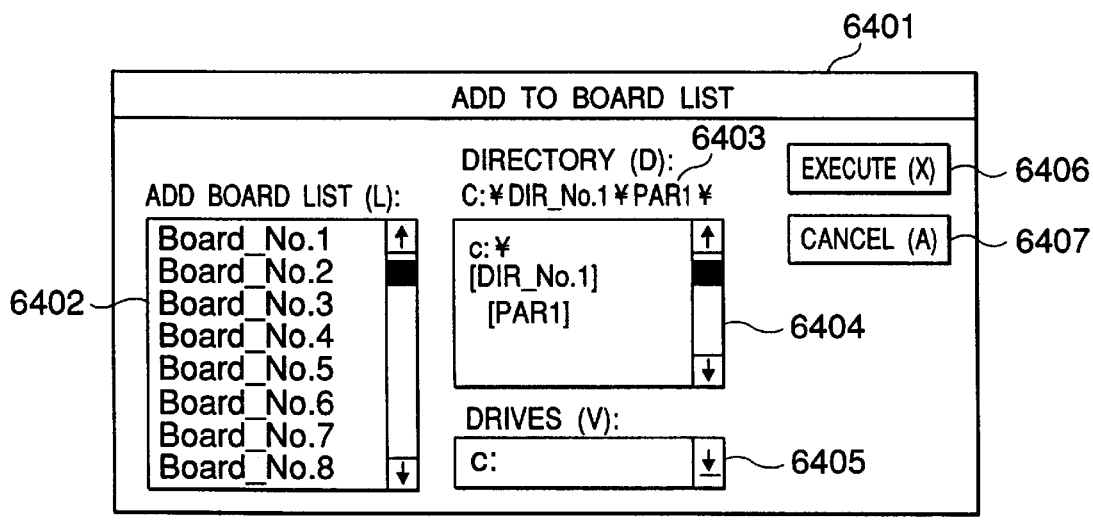
FIG. 64 is a drawing showing an add to board list dialog screen.

When the operator clicks on the ADD TO LIST (E) . . . button 6307 n the REGISTER BOARDS dialog in FIG. 63, the ADD TO BOARD LIST dialog 6401 shown in FIG. 64 appears.

The file names of the HDFs existing in the specified directory are listed in a left list box 6402 on the left of the dialog. When the operator clicks on the file name of the HDF in the list, the selected entry is reverse-displayed. If no entries are selected in the list box 6402, an EXECUTE (X) button 6406 is displayed as an ineffective button and does not function. Also, more than one entry can be selected at a time in the list box 6402. A combo box 6405 on the bottom of the dialog provides a menu for specifying an HDF copy source drive. The available drives are listed on the menu. The parent and child directories of the current directory of the specified drive are listed in a list box 6404 in the center of the dialog. The current drive, directory path name is displayed in a static control 6403 in the upper center of the dialog.

When the operator clicks on the EXECUTE button 6406, the selected HDF in the list box 6402 is copied into the data definition path, then control returns to the REGISTER BOARDS dialog in FIG. 63.

When the operator clicks on a CANCEL button 6407, HDF copy is not executed and control returns to the REGISTER BOARDS dialog.

Figure 65:
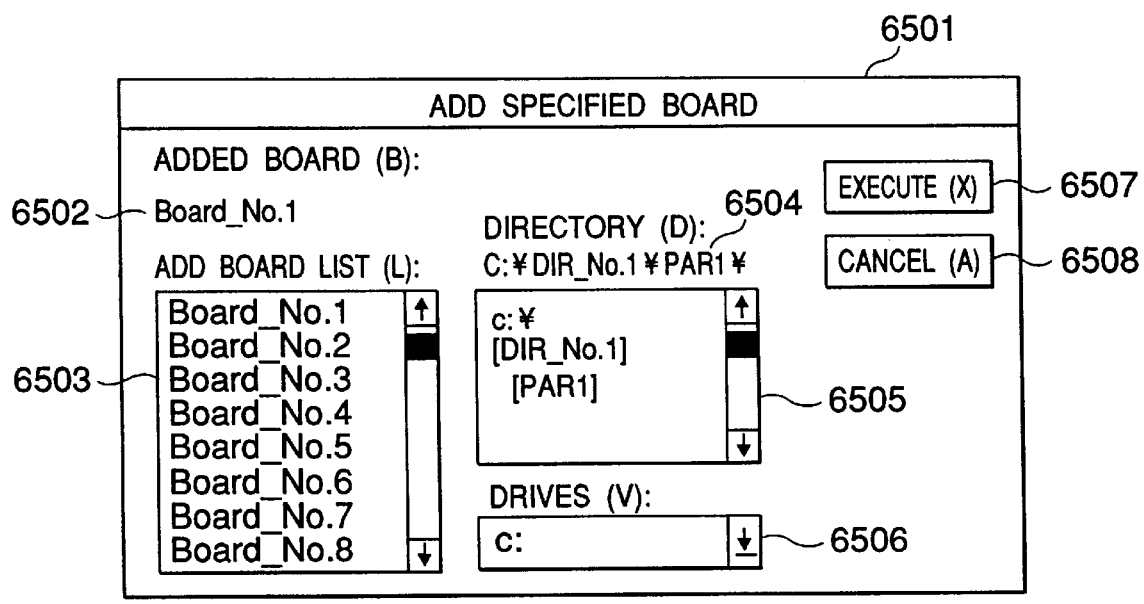
FIG. 65 is a drawing showing an add specified boards dialog screen.

When the GUI section execution module reads the network installation parameters, if it cannot find new board information used in the network installation parameters within the data definition path, an ADD SPECIFIED BOARDS dialog 6501 shown in FIG. 65 is opened. The file name of the HDF of the specified board not existing in the data definition path is displayed in a static control 6502. The file names of the HDFs existing in the current directory are listed in a list box 6503 on the left of the dialog. If the HDF of the specified board exists in the current directory, only the file name of the HDF is selected in the list box 6503, and the selection state cannot be changed in the list box. If the HDF does not exist in the current directory, no entries can be selected and an EXECUTE button 6507 is displayed as an ineffective button.

A static control 6504, a list box 6505, and a combo box 6506 have the same functions as 6404, 6405, and 6506 in FIG. 64.

When the operator clicks on the EXECUTE button 6507, the HDF corresponding to the specified board is copied into the data definition path. When the operator clicks on a CANCEL button 6508, HDF copy is not executed and control returns to the network installation parameter read process.

The new addition function of network component information enables the following:

The function enables easy addition and deletion of new network component information to and from the GUI section, and the setting operation and environment of the components can be made similar to those on the conventional GUI section interface.

Since component definition information is provided for each component, the GUI section for immediately handling setup change or version upgrading of the components can be provided.

Thus, setup information of new components can be easily added and deleted to and from the GUI section, facilitating operator's setting operations and enabling drastic reduction of the setting time. Also, an environment can be provided for the operator to easily set components so as to meet customer demands and therefore customer service quality can be improved.

What is claimed is:

1. A support system for constructing an integrated network, said support system having a user interface section and an execution section, wherein said user interface section comprises:

memory means for storing plural installation data each of which corresponds to each of network functions of information processors to be connected to said integrated network, acceptance means for accepting specifications of corresponding relationships, as to each of the information processors, between the information processor and the network function of the information processor, edit means, as to each of the plural installation data in said memory means, for editing the installation data according to the specification of corresponding relationship, accepted by said acceptance means, between the information processor corresponding to the installation data and the network function of the information processor, and match means for matching plural edited installation data edited by said edit means; and wherein said execution section comprises:

determination means for determining a construction of said integrated network to which said information processors are connected, based on matched installation data matched by said matching means, and register means for registering at least one of the plural edited installation data edited by said edit means in a memory medium.

2. A support system defined in claim 1, wherein said user interface section provides the matched installation data to said execution section through a recording medium.

3. A support system defined in claim 1, wherein said user interface section and said execution section can be detached into two distant locations.

4. A support system defined in claim 1, wherein said user interface section further comprises a data communication means with the execution section for providing the matched installation data for said execution section.

5. A support system defined in claim 4, wherein said execution section further comprises a data communication means with the user interface section for accepting the matched installation data from the user interface section.

6. A support system defined in claim 5, wherein said data communication means with the user interface section accepts the matched installation data through a data communication medium such as a recording medium.

7. A support system defined in claim 5, wherein said user interface section and said execution section share a memory to store the matched installation data.

\* \* \* \* \*